US012366785B2

(12) United States Patent
Maslov et al.

(10) Patent No.: US 12,366,785 B2
(45) Date of Patent: Jul. 22, 2025

(54) ELECTROCHROMIC DEVICES, METHODS OF MANUFACTURING AND OPERATION THEREOF

(71) Applicant: Vitro Flat Glass LLC, Cheswick, PA (US)

(72) Inventors: Boris Maslov, Newport Beach, CA (US); Dmitri Kossakovski, La Crescenta, CA (US); Ivan Alexandrovich Sokol, Novosibirsk (RU); Pavel Anatolyevich Zaikin, Novosibirsk (RU)

(73) Assignee: Vitro Flat Glass LLC, Cheswick, PA (US)

( * ) Notice: Subject to any disclaimer, the term of this patent is extended or adjusted under 35 U.S.C. 154(b) by 631 days.

(21) Appl. No.: 17/769,921

(22) PCT Filed: Oct. 18, 2019

(86) PCT No.: PCT/RU2019/000749
§ 371 (c)(1),
(2) Date: Apr. 18, 2022

(87) PCT Pub. No.: WO2021/075999
PCT Pub. Date: Apr. 22, 2021

(65) Prior Publication Data
US 2022/0390805 A1    Dec. 8, 2022

(51) Int. Cl.
*G02F 1/153*    (2006.01)
*G02F 1/1514*   (2019.01)

(52) U.S. Cl.
CPC .. *G02F 1/1533* (2013.01); *G02F 2001/15145* (2019.01); *G02F 2001/1536* (2013.01)

(58) Field of Classification Search
CPC ........ G02F 1/1533; G02F 2001/15145; G02F 2001/1536
See application file for complete search history.

(56) References Cited

U.S. PATENT DOCUMENTS 4,810,067 A      3/1989  Demiryont
6,178,034 B1 *   1/2001  Allemand ............. G02F 1/1503
                                                          359/269

(Continued)

FOREIGN PATENT DOCUMENTS

EP    1109945 A1    6/2001
JP    627305 A      2/1994
(Continued)

OTHER PUBLICATIONS

Alesanco et al., "All-in-One Gel-Based Electrochromoic Devices: Strengths and Recent Developments", Materials, 2018, pp. 1-27, vol. 11:414.

(Continued)

*Primary Examiner* — George G. King
(74) *Attorney, Agent, or Firm* — The Webb Law Firm

(57) ABSTRACT

Electrochromic devices and components thereof and systems and methods for controlling electrochromic devices are disclosed. Further, electrochromic materials, electrochromic compositions and electrochromic layers useful for the devices and systems can be in the form of a gel. The present disclosure also provide methods to fabricate electrochromic devices and components thereof, electrochromic compositions, layers and gels.

13 Claims, 19 Drawing Sheets

(56) References Cited

U.S. PATENT DOCUMENTS

| | | |
|---|---|---|
| 6,249,369 B1 | 6/2001 | Theiste et al. |
| 6,262,832 B1 | 7/2001 | Lomprey et al. |
| 6,433,914 B1 | 8/2002 | Lomprey et al. |
| 6,445,486 B1 | 9/2002 | Lomprey et al. |
| 6,710,906 B2 | 3/2004 | Guarr et al. |
| 7,031,043 B2 | 4/2006 | Roberts et al. |
| 8,294,974 B2 | 10/2012 | Das et al. |
| 9,091,895 B2 | 7/2015 | Bergh et al. |
| 10,809,587 B2 | 10/2020 | Brown et al. |
| 2009/0040588 A1 | 2/2009 | Tonar et al. |
| 2012/0019889 A1 | 1/2012 | Lamine et al. |
| 2014/0024792 A1 | 1/2014 | Sotzing |
| 2015/0070745 A1 | 3/2015 | Pradhan |
| 2015/0353819 A1 | 12/2015 | Vasiliev et al. |
| 2015/0362818 A1 | 12/2015 | Greer |
| 2018/0136530 A1 | 5/2018 | Yamamoto et al. |
| 2018/0196323 A1 | 7/2018 | Wang et al. |
| 2018/0208834 A1 | 7/2018 | Goto et al. |
| 2018/0373107 A1 | 12/2018 | Ballet et al. |
| 2019/0145161 A1 | 5/2019 | Agrawal et al. |
| 2021/0103194 A1* | 4/2021 | Kloeppner ............ G02F 1/1533 |

FOREIGN PATENT DOCUMENTS

| | | | | |
|---|---|---|---|---|
| JP | 2003270670 A | | 9/2003 | |
| JP | 2006145723 A | | 6/2006 | |
| JP | 2010072070 A | * | 4/2010 | |
| JP | 2018070475 A | * | 5/2018 | |
| JP | 2018118933 A | * | 8/2018 | ........... C07C 217/92 |
| JP | 2019502145 A | | 1/2019 | |
| KR | 101535100 B1 | | 7/2015 | |
| KR | 1020190010783 A | | 1/2019 | |
| RU | 2642558 C1 | | 1/2018 | |
| WO | 03003480 A1 | | 1/2003 | |
| WO | 2017165834 A1 | | 9/2017 | |

OTHER PUBLICATIONS

Bader et al., "Spatial Localization of the Electronic Pair and Number Distributions in Molecules", Journal of the American Chemical Society, 1975, pp. 7391-7399, vol. 97:26.

* cited by examiner

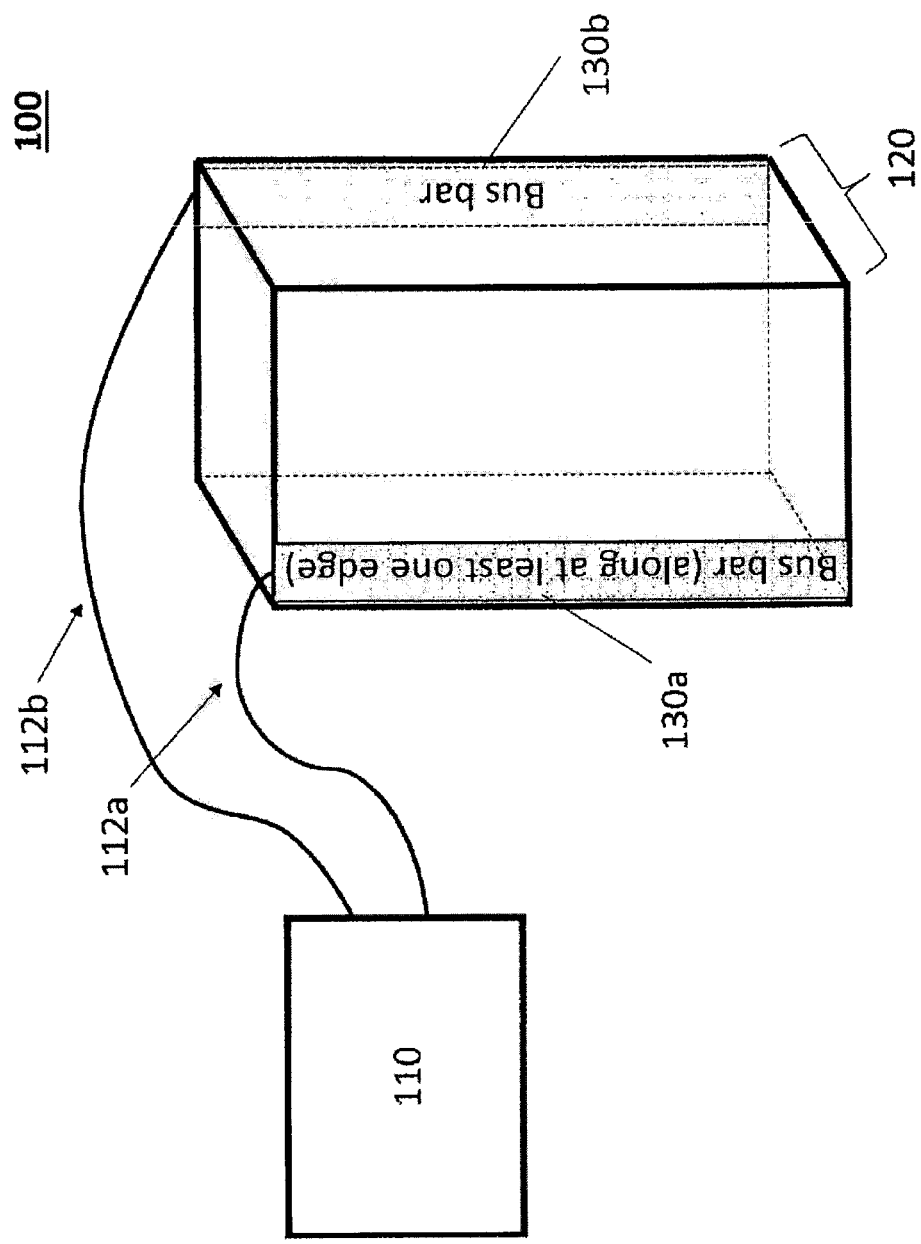

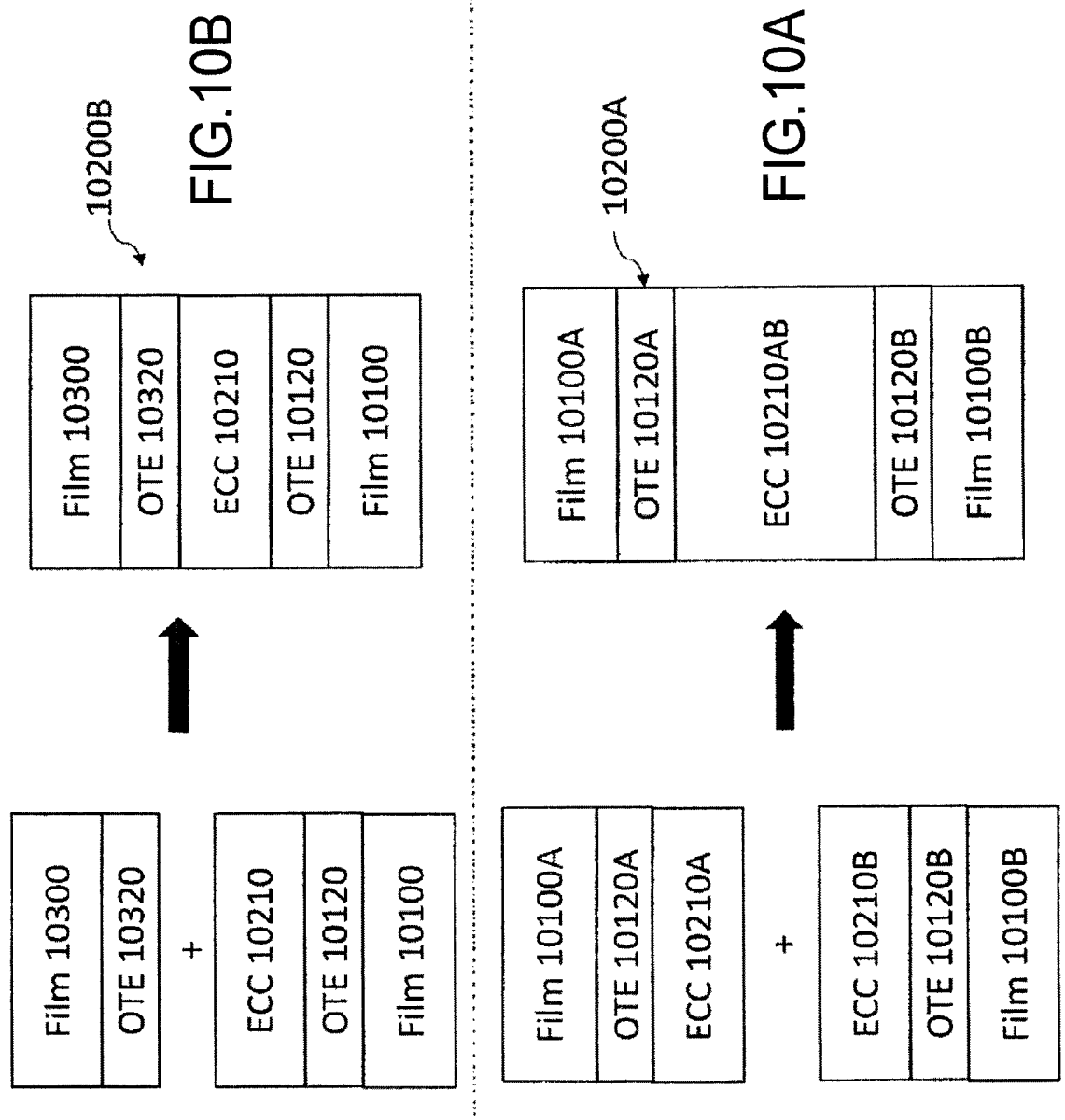

1,1'-dimethyl-4,4'-bipyridinium diperchlorate (1) — $ClO_4^-$ $ClO_4^-$ 1,1'-dimethyl-4,4'-bipyridinium bis(hexafluorophosphate) (2) — $PF_6^-$ $PF_6^-$ 1,1'-dimethyl-4,4'-bipyridinium bis(tetrafluoroborate) (3) — $BF_4^-$ $BF_4^-$ 1,1'-dibenzyl-4,4'-bipyridinium bis(tetrafluoroborate) (4) — $BF_4^-$ $BF_4^-$ 1,1'-dimethyl-4,4'-bipyridinium bis(trifluoromethanesulfonylimide) (5) — $(CF_3SO_2)_2N^-$ $(CF_3SO_2)_2N^-$ 1,1'-dimethyl-4,4'-bipyridinium bis(fluorosulfonylimide) (6) — $(FSO_2)_2N^-$ $(FSO_2)_2N^-$ 1,1'-dibenzyl-4,4'-bipyridinium bis(trifluoromethanesulfonylimide) (7) — $(CF_3SO_2)_2N^-$ $(CF_3SO_2)_2N^-$ 1,1'-diheptyl-4,4'-bipyridinium bis(trifluoromethanesulfonylimide) (8) — $(CF_3SO_2)_2N^-$ $(CF_3SO_2)_2N^-$ 1,1''-(butane-1,4-diyl)bis(1-methyl-4,4'-bipyridinium) tetrakis(tetrafluoroborate) (9) — $4\,BF_4^-$ 1',1'''-(butane-1,4-diyl)bis(1-methyl-4,4'-bipyridinium) tetrakis(tetrafluoromethanesulfonylimide) (10) — $4(CF_3SO_2)_2N^-$ 1,1'-diphenyl-4,4'-bipyridinium bis(tetrafluoromethanesulfonylimide) (11) — $(CF_3SO_2)_2N^-$ $(CF_3SO_2)_2N^-$ 1,1'-bis(4-fluorophenyl)-4,4'-bipyridinium bis(trifluoromethanesulfonylimide) (12) — $(CF_3SO_2)_2N^-$ $(CF_3SO_2)_2N^-$

FIG. 12A

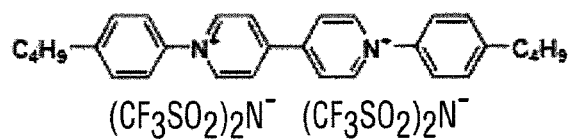

(CF₃SO₂)₂N⁻  (CF₃SO₂)₂N⁻

1,1'-bis(4-butylphenyl)-4,4'-bipyridinium bis(trifluoromethanesulfonylimide) (13)

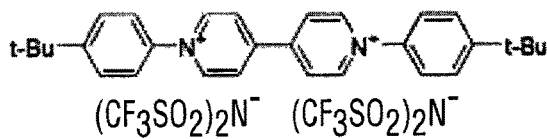

(CF₃SO₂)₂N⁻  (CF₃SO₂)₂N⁻

1,1'-bis(4-tert-butylphenyl)-4,4'-bipyridinium bis(trifluoromethanesulfonylimide) (14)

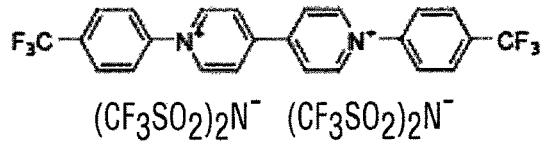

(CF₃SO₂)₂N⁻  (CF₃SO₂)₂N⁻

1,1'-bis(4-trifluoromethylphenyl)-4,4'-bipyridinium bis(trifluoromethanesulfonylimide) (15)

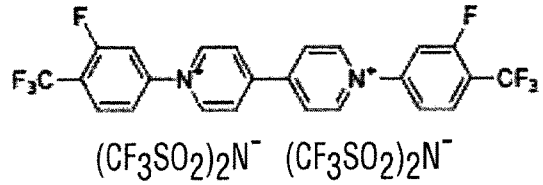

(CF₃SO₂)₂N⁻  (CF₃SO₂)₂N⁻

1,1'-bis(4-trifluoromethyl-3-fluorophenyl)-4,4'-bipyridinium bis(trifluoromethanesulfonylimide) (16)

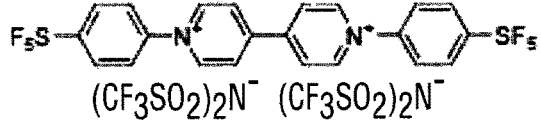

(CF₃SO₂)₂N⁻  (CF₃SO₂)₂N⁻

1,1'-bis(4-(pentafluoro-λ6-sulfanyl)phenyl)-4,4'-bipyridinium bis(trifluoromethanesulfonylimide) (17)

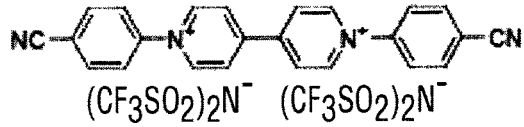

(CF₃SO₂)₂N⁻  (CF₃SO₂)₂N⁻

1,1'-bis(4-cyanophenyl)-4,4'-bipyridinium bis(trifluoromethanesulfonylimide) (18)

(CF₃SO₂)₂N⁻  (CF₃SO₂)₂N⁻

1-methyl-1'-phenyl-4,4'-bipyridinium bis(trifluoromethanesulfonylimide) (19)

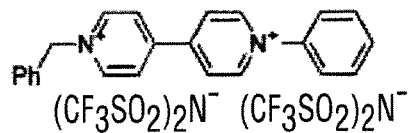

(CF₃SO₂)₂N⁻  (CF₃SO₂)₂N⁻

1-benzyl-1'-phenyl-4,4'-bipyridinium bis(trifluoromethanesulfonylimide) (20)

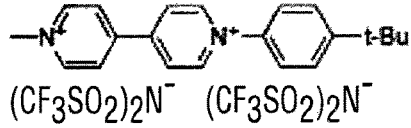

(CF₃SO₂)₂N⁻  (CF₃SO₂)₂N⁻

1-methyl-1'-(4-tert-butylphenyl)-4,4'-bipyridinium bis(trifluoromethanesulfonylimide) (21)

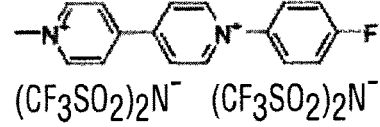

(CF₃SO₂)₂N⁻  (CF₃SO₂)₂N⁻

1-methyl-1'-(4-fluorophenyl)-4,4'-bipyridinium bis(trifluoromethanesulfonylimide) (22)

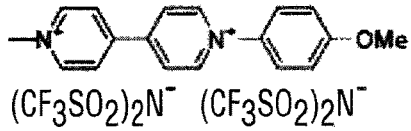

(CF₃SO₂)₂N⁻  (CF₃SO₂)₂N⁻

1-methyl-1'-(4-trifluoromethylphenyl)-4,4'-bipyridinium bis(trifluoromethanesulfonylimide) (23)

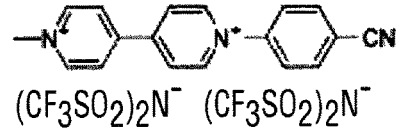

(CF₃SO₂)₂N⁻  (CF₃SO₂)₂N⁻

1-methyl-1'-(4-cyanophenyl)-4,4'-bipyridinium bis(trifluoromethanesulfonylimide) (24)

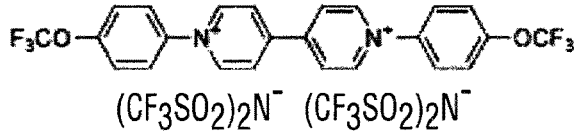

(CF₃SO₂)₂N⁻  (CF₃SO₂)₂N⁻

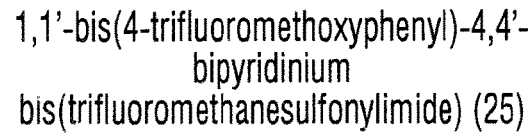

1,1'-bis(4-trifluoromethoxyphenyl)-4,4'-bipyridinium bis(trifluoromethanesulfonylimide) (25)

FIG.12B

2(CF$_3$SO$_2$)$_2$N$^-$ 1-methyl-1'-(p-tolyl)-4,4'-bipyridinium bis(trifluoromethanesulfonylimide) (26)

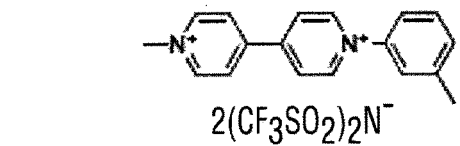

2(CF$_3$SO$_2$)$_2$N$^-$ 1-methyl-1'-(m-tolyl)-4,4'-bipyridinium bis(trifluoromethanesulfonylimide) (27)

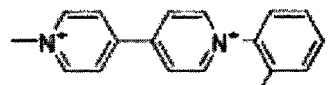

2(CF$_3$SO$_2$)$_2$N$^-$ 1-methyl-1'-(o-tolyl)-4,4'-bipyridinium bis(trifluoromethanesulfonylimide) (28)

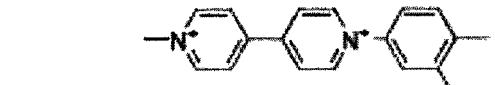

2(CF$_3$SO$_2$)$_2$N$^-$ 1-methyl-1'-(3,4-dimethylphenyl)-4,4'-bipyridinium bis(trifluoromethanesulfonylimide) (29)

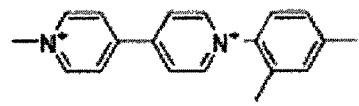

2(CF$_3$SO$_2$)$_2$N$^-$ 1-methyl-1'-(2,4-dimethylphenyl)-4,4'-bipyridinium bis(trifluoromethanesulfonylimide) (30)

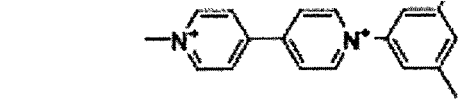

2(CF$_3$SO$_2$)$_2$N$^-$ 1-methyl-1'-(3,5-dimethylphenyl)-4,4'-bipyridinium bis(trifluoromethanesulfonylimide) (31)

2(CF$_3$SO$_2$)$_2$N$^-$ 1-methyl-1'-(2,5-dimethylphenyl)-4,4'-bipyridinium bis(trifluoromethanesulfonylimide) (32)

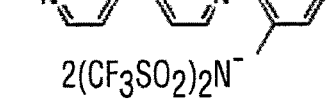

2(CF$_3$SO$_2$)$_2$N$^-$ 1-methyl-1'-(3,4,5-trimethylphenyl)-4,4'-bipyridinium bis(trifluoromethanesulfonylimide) (33)

2(CF$_3$SO$_2$)$_2$N$^-$ 1-methyl-1'-(2,4,6-trimethylphenyl)-4,4'-bipyridinium bis(trifluoromethanesulfonylimide) (34)

2(CF$_3$SO$_2$)$_2$N$^-$ 1-methyl-1'-(4-trifluoromethoxyphenyl)-4,4'-bipyridinium bis(trifluoromethanesulfonylimide) (35)

2(CF$_3$SO$_2$)$_2$N$^-$ 1-phenyl-1'-(2",2",2"-trifluoroethyl)-4,4'-bipyridinium bis(trifluoromethanesulfonylimide) (36)

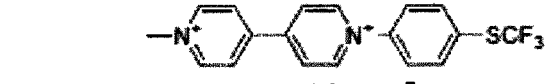

2(CF$_3$SO$_2$)$_2$N$^-$ 1-methyl-1'-(4-trifluoromethylthiophenyl)-4,4'-bipyridinium bis(trifluoromethanesulfonylimide) (37)

FIG.12C

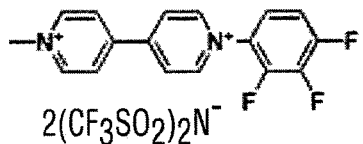

2(CF₃SO₂)₂N⁻
1-methyl-1'-(2,3,4-trifluorophenyl)-4,4'-bipyridinium bis(trifluoromethanesulfonylimide) (38)

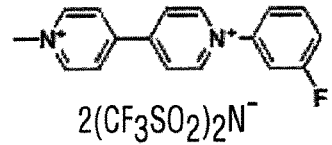

2(CF₃SO₂)₂N⁻
1-methyl-1'-(3-fluorophenyl)-4,4'-bipyridinium bis(trifluoromethanesulfonylimide) (39)

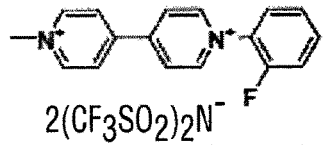

2(CF₃SO₂)₂N⁻
1-methyl-1'-(2-fluorophenyl)-4,4'-bipyridinium bis(trifluoromethanesulfonylimide) (40)

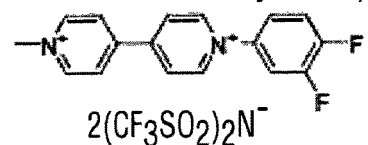

2(CF₃SO₂)₂N⁻
1-methyl-1'-(2-difluorophenyl)-4,4'-bipyridinium bis(trifluoromethanesulfonylimide) (41)

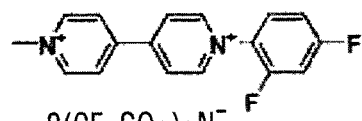

2(CF₃SO₂)₂N⁻
1-methyl-1'-(2,4-difluorophenyl)-4,4'-bipyridinium bis(trifluoromethanesulfonylimide) (42)

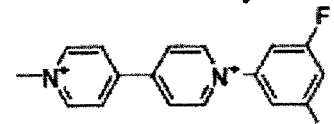

2(CF₃SO₂)₂N⁻
1-methyl-1'-(3,5-difluorophenyl)-4,4'-bipyridinium bis(trifluoromethanesulfonylimide) (43)

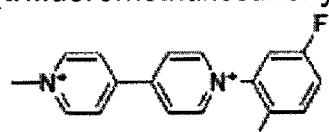

2(CF₃SO₂)₂N⁻
1-methyl-1'-(2,5-difluorophenyl)-4,4'-bipyridinium bis(trifluoromethanesulfonylimide) (44)

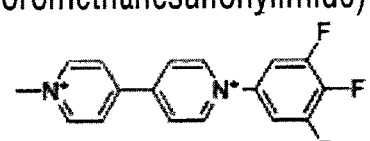

2(CF₃SO₂)₂N⁻
1-methyl-1'-(3,4,5-trifluorophenyl)-4,4'-bipyridinium bis(trifluoromethanesulfonylimide) (45)

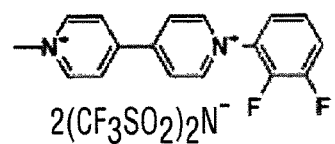

2(CF₃SO₂)₂N⁻
1-methyl-1'-(2,3-difluorophenyl)-4,4'-bipyridinium bis(trifluoromethanesulfonylimide) (46)

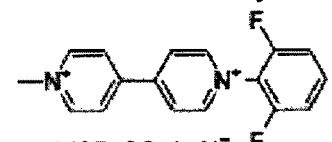

2(CF₃SO₂)₂N⁻
1-methyl-1'-(2,6-difluorophenyl)-4,4'-bipyridinium bis(trifluoromethanesulfonylimide) (47)

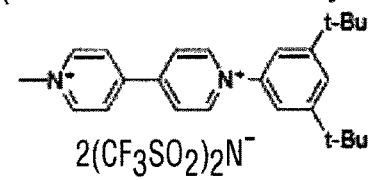

2(CF₃SO₂)₂N⁻
1-methyl-1'-(3,5-di-tert-butylphenyl)-4,4'-bipyridinium bis(trifluoromethanesulfonylimide) (48)

FIG.12D

ELECTROCHROMIC DEVICES, METHODS OF MANUFACTURING AND OPERATION THEREOF

CROSS-REFERENCE TO RELATED APPLICATION

This application is the United States national phase of International Application No. PCT/RU2019/000749 filed Oct. 18, 2019, the disclosure of which is hereby incorporated by reference in its entirety.

TECHNICAL FIELD

The present invention relates to electrochromic materials, devices, methods of their manufacturing and methods of their operation.

BACKGROUND

Electrochromism is the physical phenomenon found in certain compounds, compositions or assemblies which can reversibly change optical properties such as color or light transmittance due to electric current arising with an application of a voltage called a control voltage. Electrochromism provides the basis for operation of various electrochromic devices, such as smart glass in the form of windows, mirrors and displays. Various types of optical materials and structures can be used to construct compositions with electrochromic properties, with the specific structures being dependent on the specific purpose of the electrochromic device.

A variety of patents and patent applications disclose electrochromic materials and devices. Such patents and patent applications include, for example, US 2015/0353819 describes electrochromic compositions and devices; RU2642558C1 describes manufacturing and operation of organic electrochromic devices manufactured by UV-curing of polymer matrices containing organic active electrochromic materials; U.S. Pat. Nos. 6,262,832, 6,433,914, 6,445,486, 6,710,906, 7,031,043 and 8,294,974 disclose various electrochromic materials and devices. A review article discloses all-in-one gel-based electrochromic devices. See Alesanco et al., Materials 2018, 11, 414, pp. 1-27.

However, there is a continuing need for electrochromic materials, devices, methods of their manufacturing and methods of their operation.

SUMMARY OF THE DISCLOSURE

Advantages of the present disclosure include electrochromic devices and components thereof and systems and methods for controlling electrochromic devices. Additional advantages of the present disclosure include electrochromic materials, electrochromic compositions and electrochromic layers. In certain aspects of the present disclosure, the electrochromic composition and layers can be in the form of a gel. The present disclosure also provides methods to fabricate electrochromic devices and components thereof, electrochromic compositions, layers and gels.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIG. 1A illustrates an electrochromic device in accordance with an implementation of the present disclosure.

FIG. 10A and FIG. 10B illustrate configurations of a variable transmittance layer used for an EC device in accordance with an embodiment of the present disclosure.

FIGS. 12A, 12B, 12C and 12D list and show viologens that can be used in compositions, layers, gels and devices of the present disclosure.

DETAILED DESCRIPTION OF THE DISCLOSURE

Figure 1B:
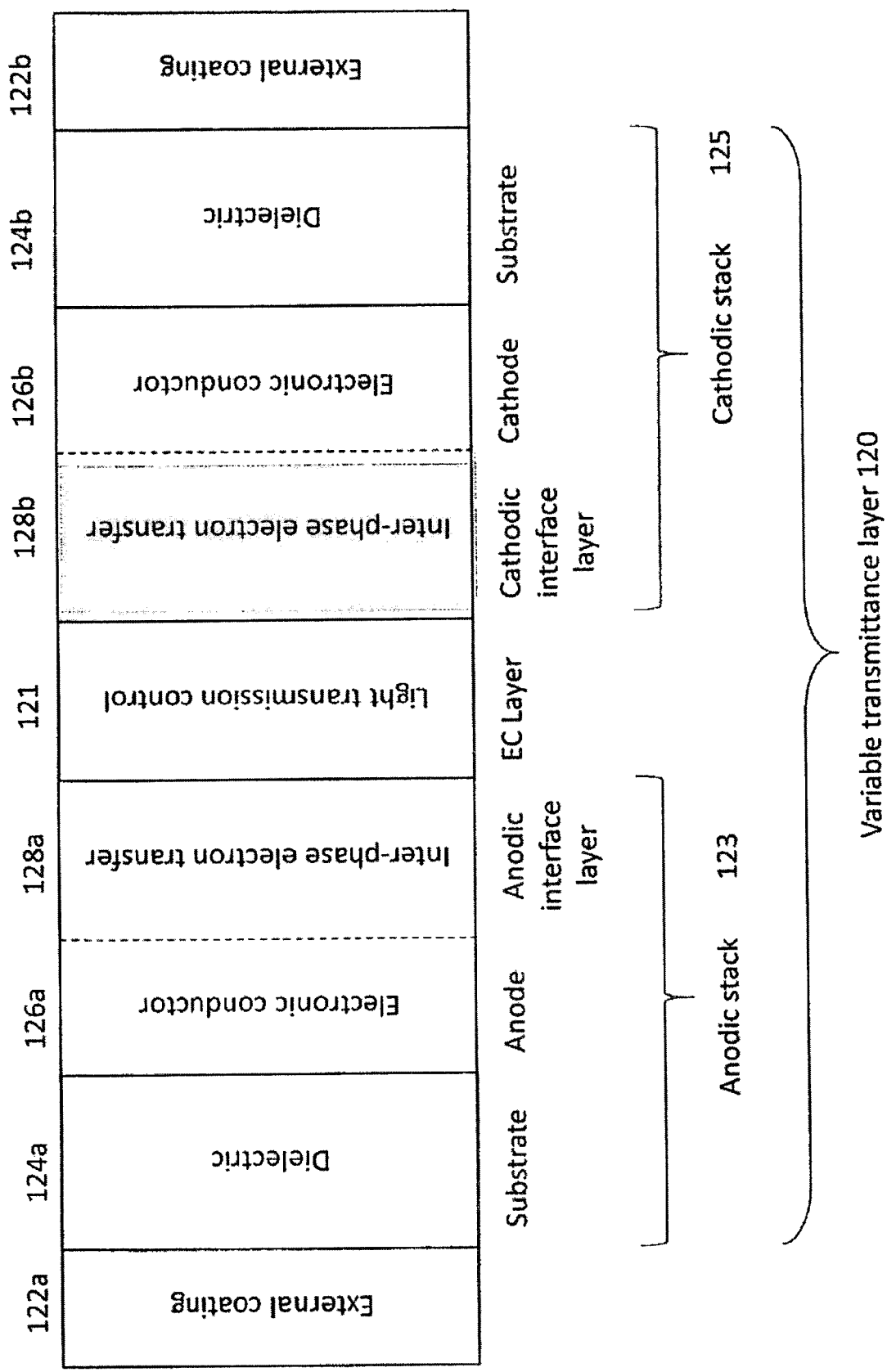
FIG. 1B illustrates an example of the structure of the variable transmittance layer of an electrochromic device in accordance with an implementation of the present disclosure.

The following naming conventions will be used throughout this disclosure:

Chemical potential (μ)—the energy that can be absorbed or released due to a change of the particle number of the given species, e.g. in a chemical reaction or phase transition. The chemical potential of a specie in a mixture is defined as the rate of change of free energy of a thermodynamic system with respect to the change in the number of atoms or molecules of the specie that are added to the system. Thus, it is the partial derivative of the free energy with respect to the amount of the species, all other species' concentrations in the mixture remaining constant:

$$\mu_i = \left(\frac{\partial G}{\partial N_i}\right)_{T,P,Q,N_{j\neq i}}.$$

The molar chemical potential is also known as partial molar free energy. When both temperature and pressure are held constant, chemical potential equals the partial molar Gibbs free energy. In ideal mixtures or solutions the chemical potential can be expressed as $\mu_i^* = \mu + RT \ln x_i$, where $x_i$ is the mole fraction of the $i^{th}$ component and $\mu_i^*$ is the molar free energy of the component in its pure form at that temperature and pressure. For non-ideal mixtures and solutions the chemical potential is $\mu_i = \mu_i^* + RT \ln a_i = \mu_i^* + RT \ln \gamma_i x_i$, where $a_i$ is the relative activity of the $i^{th}$ component and $\gamma_i$ is the activity coefficient.

Electrochemical potential ($\bar{\mu}$)—a thermodynamic measure of chemical potential that does not omit the energy contribution of electrostatics: $\bar{\mu}_i = \mu_i + z_i F\varphi$, where $z_i$ is the charge of $i^{th}$ component, F is the Faraday constant and $\varphi$ is local electrostatic potential.

Concentration—the abundance of a constituent divided by the total volume of a mixture.

Activity—a measure of the "effective concentration" of a specie in a mixture, in the sense that the species' chemical potential depends on the activity of a real solution in the same way that it would depend on concentration for an ideal solution. The absolute activity of a substance is denoted by $\lambda = \exp(\mu/RT)$, and the relative activity is defined as $a = \exp(\mu - \lambda^0/RT)$, where μ is chemical potential $\mu^0$ is the molar free energy of the material in some defined standard state for which the activity is taken as unity (standard chemical potential).

Rate-limiting process (step)—the slowest process of a consecutive reaction in means of the least rate coefficient.

Redox couple—a pair of molecules (ions) which differ in one or more electrons.

Redox reaction—a chemical reaction in which the reactants exchange electrons between each other. The processes of gaining and expelling electrons are termed reduction and oxidation, respectively. Each redox reaction comprises both reduction and oxidation occurring simultaneously. The reactants undergoing reduction are termed oxidant, whereas those being oxidized are termed reductant. The redox reaction can be formally split into, at least, two half-reactions representing separately the oxidation and reduction. The oxidized and reduced forms of a single participant in a half-reaction comprise a redox couple. Each half-reaction is attributed with a standard (redox) potential, measured versus the standard hydrogen electrode as a reference system.

Reversible redox reaction—the term is used in three different contexts: Chemically reversible redox reaction—a redox reaction that can proceed in two directions, i.e. from reactants to products and in reverse direction. Thermodynamically reversible redox reaction—a redox reaction that is at the equilibrium at every moment. From the initial to the final state, it proceeds through a series of equilibrium states, thus proceeding infinitesimally slow and requiring an infinite length of time. An infinitesimal change in the direction of the driving force causes the direction of the process to reverse. Electrochemically reversible redox reaction—a redox reaction or the electrode reaction for which the surface concentrations of both species of the redox couple obey the Nernst equation at any potential difference applied at the electrode-electrolyte interface. In this case the charge transfer at the interface is much faster than all coupled mass transport processes.

Interface—the two-dimensional plane separating two phases. The general thermodynamic requirement for the stability of an interface between two phases is a positive Gibbs energy of formation, because otherwise the interface would either fluctuate or disappear. Since the molecular forces on either side of an interface possess a specific anisotropy the structure of the utmost surface layers differs from that inside the phases.

Electroactive substance—a substance that undergoes a change of oxidation state during an interphase charge transfer upon application of an electric field between the phases.

Electrode (Engineering/Electronics)—an element made of an electronic conductor through which electrical current enters or leaves an object or region. In the simplest case a pure solid metal; however, the electronic conductor may be also an alloy (e.g., an amalgam), carbon (e.g., graphite, glassy carbon, carbon nanotubes), a semiconductor (e.g., boron-doped diamond, a metal oxide, metal salt, doped silicon, germanium alloys) or any other material which conducts electrical current by the drift of free electrons.

Optically transparent electrode (OTE)—an electrode (engineering) that is transparent to visible light. OTEs can include thin films of metals or semiconductors deposited on transparent substrate (glass, quartz, plastic, etc.). Further, OTEs can be made from transparent oxides, commonly called Transparent Conductive Oxides (TCO). Alternatively, OTEs can be in a form of fine wire meshes or grids. OTEs can act as electric current distribution manifolds, bringing current to and from every area of an EC layer (ECL), for example. Ideally, OTEs do not substantially distort (absorb and scatter) transmitted light.

Ideally polarizable electrode—an electrode, whose electronic and ionic conductor phases does not possess a common component capable of changing its charge and being transferred between phases and therefore not able to reach a thermodynamic equilibrium. The criterion is applicable only under a number of conditions: potential ranges, time scales, etc.

Ideally nonpolarizable electrode—an electrode having unhindered exchange of common charged particles between its electronic and ionic conductor phases. The criterion is applicable only under a number of conditions: potential ranges, time scales, etc.

Electrocatalytic electrode—an electrode at which an electrochemical process is subject to catalysis, i.e. in most cases its rate is increased.

Reference electrode—an electrode of an electrochemical cell which potential is chosen as the zero value of the electric potential scale. In a three-electrode cell with aqueous electrolyte is usually represented by a separate electrode of $2^{nd}$ kind (e.g., saturated calomel electrode, SCE or AgCl electrode) due to their potential remaining practically constant during an experiment. In non-aqueous (organic) systems pseudo-reference (e.g. Ag metal) electrodes are commonly used with an in situ redox reference, which redox potential is practically independent of the electrolyte properties (e.g., ferrocene). The principle of the three-electrode cell assumes that the current flowing through the reference electrode is close to zero. In a 2-electrode cell the counter electrode is used as a reference electrode.

Standard hydrogen electrode—the primary standard of electrochemistry, an electrode, the standard potential of which is defined as the value of the standard potential of a cell reaction that involves the oxidation of molecular hydrogen to solvated (hydrated) protons.

Working electrode—an electrode at which a given electrode process is examined. This term is usually used in context of analytical electrochemistry.

Counter electrode—an electrode that represent a second electrolyte-electrode interface in a cell having a working electrode and thus allowing to connect the cell to an external circuit and allowing the processes of the working electrode to proceed.

Cathode—in an electrochemical cell, a cathode is the electrode where reduction occurs and electrons flow from electrode to electrolyte.

Anode—in an electrochemical cell, an anode is the electrode where oxidation occurs and electrons flow from electrolyte to electrode.

Anodic/cathodic/electrodic stack—a stack of layers including at least one anode layer or at least one cathode layer. Such a stack can carry the functions of mechanical support (substrate), surface electronic conductivity and interfacial charge transfer. Interlayer adhesion between a substrate and a surface conductor may be promoted by additional layer(s) if needed. An anodic stack acts as anode at charging conditions, a cathodic stack acts as cathode at charging conditions (and vice versa at discharging). The functions of the layers may be combined, i.e. one layer may carry several functions. Similarly, one function may be carried by several layers.

Electrochemical cell—A combination of at least two electrodes in contact with an ionic conductor (solution, in common case). An electrochemical cell may operate as a galvanic cell if the reactions occur spontaneously and chemical energy is converted into electrical energy or as an electrolysis (or electrolytic) cell in which electrical energy is converted into chemical energy.

Galvanic cell—an electrochemical cell in which reactions occur spontaneously at the electrodes when they are connected externally by a conductor. It means that the reaction occurring must have negative Gibbs energy difference ($\Delta G < 0$).

Electrolysis cell (electrolytic cell)—an electrochemical cell, the Gibbs reaction of which is positive ($\Delta G > 0$) and hence no reaction occurs until the cell is externally supplied with electrical energy.

Charge/discharge of an electrochemical cell—the process that is accompanied by flow of electric current, which causes the equilibrium potential difference between cathode and anode to increase/decrease. At charge an electrochemical cell is working as an electrolytic cell and at discharge it is working as a galvanic cell.

Cell reaction—a chemical reaction occurring spontaneously in a galvanic cell. The Gibbs energy change of the reaction is converted into electrical energy and heat.

Half-reactions (electrode reactions)—chemical processes (oxidation or reduction) taking place spatially separated at the electrodes in such a way that they are interconnected by the ion transport through the ionic conductor separating two electrodes.

Open-circuit potential (OCP)—in general, a voltage that is measured between a couple of electrodes of a system when no potential or current is being applied. For an electrochemical cell, the potential of the working electrode relative to the reference electrode when no potential or current is being applied to the cell. In case of a reversible electrode system is also referred to as the equilibrium potential. Otherwise it is called the rest potential or the corrosion potential, depending on the studied system.

Equilibrium electrode potential—the value of electrode potential determined exclusively by a single redox system Ox/Red in the absence of current under complete equilibration. The rates of Ox to Red reduction and of Red to Ox oxidation are equal under these circumstances. The value of equilibrium electrode potential is determined by the Nernst equation.

Exchange current density—at an equilibrated electrode, where the net current value equals zero, a value that corresponds to the magnitude of the anodic current density component balanced with the cathodic one.

Nernst equation—a fundamental equation in electrochemistry that describes the dependence of the equilibrium electrode potential on the composition of contacting phases: $E_{cell} = \Delta G/nF = E^0 - (RT/nF) \Sigma_i v_i \ln a_i$, where $a_i$ are activities of the species involved.

Charge transfer coefficient ($\alpha$)—a coefficient that gives the ratio of the change of the height of the energy barrier the electron has to surmount during charge transfer with respect to the change of electrode potential E. A value of $\alpha = 0$ implies no influence of the electrode potential change on the barrier height, $\alpha = 1$ implies that the change of electrode potential causes an exactly equal change of barrier height. The symmetrical energy barrier results in $\alpha = 0.5$. Typically, $\alpha$ is in the range of 0.3 to 0.7.

Butler-Volmer equation—the fundamental equation of electrode kinetics that describes the relationship between the current density and the electrode potential:

$$j = j_0 \left[ -\frac{a_{Ox}}{a_{Ox\,initial}} \exp\left(-\frac{\alpha F \eta}{RT}\right) + \frac{a_{Red}}{a_{Red\,initial}} \exp\left(\frac{(1-\alpha)F\eta}{RT}\right) \right],$$

where j is the current density, $a_i$ are the activities at the interface, $\alpha$ is the charge transfer coefficient, F is the Faraday constant, $\eta = (E - E_{formal})$ is the overpotential and $j_0$ is the exchange current density.

Frumkin effect—originating from the Frumkin's theory of slow discharge, the effect of deviation of driving potential value form the overpotential arising from the electroneutrality breaking. The Frumkin correction contributes to the Butler-Volmer equation:

$$j = j_0 \left[ -\frac{a_{Ox}}{a_{Ox\,initial}} \exp\left(-\frac{\alpha F (\eta - \psi_1)}{RT}\right) + \frac{a_{Red}}{a_{Red\,initial}} \exp\left(\frac{(1-\alpha)F(\eta - \psi_1)}{RT}\right) \right],$$

where $\psi_i$ (psi-prime potential) stands for the potential in the point of reactant location relative to the bulk liquid potential. Outer Helmholtz plane potential ($\varphi_{OHP}$) is often considered as the psi-prime potential since OHP is the position of the most probable interfacial charge transfer.

Standard potential—the equilibrium potential of an electrode under standard-state conditions, i.e., in solutions with the relative activities of all components being unity and a pressure being 1 atm (ignoring the deviations of fugacity and activity from pressure and concentration, respectively) at temperature T.

Formal potential ($E_f$)—the value that replaces the standard potential of a cell reaction when the values of activity coefficients are unknown and therefore concentrations used in the equation expressing the composition dependence of cell potential instead of activities.

Half-wave potential ($E_{1/2}$)—the potential corresponding to a half of the limiting current for various wave-shaped electrochemical responses. For a reversible polarographic wave and a solution containing both the oxidized (Ox) and the reduced (Red) species, $E_{1/2}$ deviates from the formal potential:

$$E_{1/2} = E_f + \frac{RT}{nF} \ln\left(\frac{\gamma_{Ox}\sqrt{D_{Ox}}}{\gamma_{Red}\sqrt{D_{Red}}}\right).$$

Onset potential ($E_{onset}$)—in electrochemistry, an ill-defined potential at which a specific process starts as determined by an increase in current in a current-potential curve.

Zeta potential ($\zeta$)—the electrical potential difference between the bulk solution and the "shear plane/slippery plane" or outer limit of the rigid part of the double layer, often represented by OHP.

Overpotential—a deviation of the potential of an electrode from its equilibrium value required to cause a given current to flow through the electrode.

Electrode charge—the total quantity of electricity required to charge the interface up to its equilibrium state at certain potential conditions of no charge exchange between the electronic conductor surface and electrolyte bulk.

Potential of zero charge ($E_{pzc}$)—the potential corresponding to zero electrode charge.

Redox potential—the equilibrium potential of a redox couple as given by the Nernst equation.

Band bending—the consequence of the occurrence of internal electric fields inside semiconductor materials that makes the band edges to appear curved on the energy band diagram of an interface with the semiconductor.

Flat-band potential—in an energy barrier formed for example at metal-semiconductor junctions, metal-insulator-semiconductor junctions and solution-semiconductor interfaces, a potential at which the electric field equals zero at the semiconductor interface, i.e., there is no band bending. In case of solution-semiconductor interfaces, the flat-band potential corresponds to the condition of absence of excess charge and consequently, depletion layer, in the semiconductor.

Applied potential—An electrical potential difference applied externally to a material, device, cell, interface, etc. Being applied to an electrochemical cell, the applied potential is divided into two electrode potentials, each of which is the difference of potential existing between the bulk of the solution (e.g., an EC layer) and the interior of the conducting material of the electrode, an ohmic potential drop through the solution (e.g., the EC layer), and another ohmic potential drop through each electrode. In the context of an electrochromic device, the applied potential can manifest itself as a combination of (1) anodic ohmic potential drop, through the electrode from anode's conductive lead to a specific point on the anodic electrode, (2) potential drop from this specific point of the anodic electrode, across the conductive interface between anode and EC layer, to the corresponding point of EC layer which is in immediate proximity to this specific point on the anode; (3) cathodic ohmic potential drop, through the electrode from cathode's conductive lead to a specific point on the cathodic electrode, (4) potential drop from this specific point of the cathodic electrode, across the conductive interface between cathode and EC layer, to the corresponding point of EC layer which is in immediate proximity to this specific point on the cathode; and (5) potential drop between same anodic and cathodic points of the EC layer.

Electrochemical window—in electrochemical experiments, the range of potentials that is accessible without appreciable current flow, i.e., the potential range in which the electrodes may be considered as ideally polarizable.

Bandgap, $E_g$—an energy difference between the bottom of the conduction band and the top of the valence band in a semiconductor or an insulator. "Wide bandgap" stands for bandgaps >3.0 eV, and "narrow bandgap" indicates values <2.0 eV.

Conduction band—vacant or only partially occupied set of many closely spaced electronic levels resulting from an array of a large number of atoms forming a system in which the electrons can move freely or nearly so.

Valence band—highest energy continuum of energy levels in a solid that is fully occupied by electrons at 0 K.

Fermi energy ($E_F$)—the energy difference between the highest and lowest occupied single-particle states in a quantum system of non-interacting fermions at absolute zero temperature. In context of the band theory is referring to the energy of a level (which is called a Fermi level) that is occupied by an electron with half probability. The Fermi level is virtual and may not be really existing (e.g. being located within the bandgap of a semiconductor or insulator). $E_F$ of a solution ($E_{F,redox}$) is the energy at which the probability of electron detection at the electrolyte side of an interface is 0.5. This level is also virtual and is not represented by a physically existing energy state. $E_F$ is equal to the electrochemical potential of electrons.

Work function—the energy required to remove an electron from the bulk of a phase to a point well outside it. It can be expressed as $\Phi^M = E_\infty - E_F$, where $E_F$ is the Fermi energy and $E_\infty$ is the electron energy at rest at infinite distance.

Steady state (Electrochemistry)—a state of a system that occurs when a variable of interest (e.g., a concentration, a flux, a current, or a potential) does not change with time. A steady state is attained after a passage of time and theoretically requires an infinite length of time because steady states are approached gradually rather than being obtained at a specific instant. Thus "reaching a steady state" can mean coming to within some specified percentage of the steady state.

Solvent—is a substance that dissolves a solute (a chemically distinct liquid, solid or gas), resulting in a solution.

Solvation sheath (shell)—the solvent interface of any chemical compound that constitutes the solute.

Reorganization energy ($\lambda$)—in the Marcus theory, the change of energy of a system resulting from changes in bond lengths in the reacting molecules (inner component, $\lambda_i$), and changes in the radii of solvated ions or in the solvation sphere including orientation of the solvent dipoles (outer component, $\lambda_o$).

Debye length ($\kappa^{-1}$)—a measure of a charge carrier's net electrostatic effect in a solution and how far its electrostatic effect persists:

$$\kappa^{-1} = \sqrt{\frac{\varepsilon\varepsilon_0 k_B T}{e^2 \sum_i c_i z_i^2}}$$

for a solution, where ε is the relative permeability, co is the electric constant, e is the electron charge, $k_B$ is the Boltzmann constant, T is absolute temperature, $c_i$ is the concentration of $i^{th}$ component and $z_i$ is the charge of ith component.

Electrolytes—compounds that dissociate into ions upon dissociation in a solvent and which provide by such dissociation ionic conductivity. Ionically conductive solutions of electrolytes are also sometimes referred to as electrolytes. Compounds that possess in the solid state a rather high ionic conductivity are called solid electrolytes.

Supporting Electrolyte—an electrolyte, the ions of which are not electroactive in the range of applied potentials being used. Typically, concentrations of supporting electrolytes are higher than concentrations of electroactive substances dissolved in the solution.

Electron transfer—the process by which an electron is transported into (or out of) an otherwise closed system, thereby inducing a change in the occupation number of at least one electronic state.

Charge transfer reaction—an interfacial (heterogeneous) reaction that necessarily involves a charge transfer step. The latter can be a neutralization or formation of ions (ion transfer), or alteration of the ionic charge by the gain or loss electrons from or to the metal, respectively.

Double layer—in general, a layer of charges that exists at the interface between two conducting media: one side carries a positive excess charge, which is balanced by a negative excess of equal magnitude on the other side. The resulting potential drop across the interface is the double-layer potential. Two limiting cases exist: at an ideally polarizable interface the two adjacent phases cannot exchange charges; the system then behaves like a capacitor, which can be charged by applying an external potential. At an ideally nonpolarizable interface the two phases can exchange charge carriers, ions or electrons, and in the stationary case the potential difference is determined by the difference of the chemical potential of these carriers in the two phases.

Inner Helmholtz layer—in a double layer, a layer that comprises all species that are specifically adsorbed on the electrode surface. If only one type of molecule or ion is adsorbed, and they all sit in equivalent positions, then their centers define the inner Helmholtz plane (IHP).

Outer Helmholtz layer—in a double layer, a layer that comprises the ions that are closest to the electrode surface but are not specifically adsorbed. They have kept their solvation spheres intact and are bound only by electrostatic forces. If all these ions are equivalent, their centers define the outer Helmholtz plane (OHP).

Slippery plane (shear plane)—an imaginary plane in a double layer structure that separates areas of immobilized and non-immobilized solution species.

Electrochemical impedance spectroscopy (EIS)—experimental technique based on the measurement (under equilibrium or steady-state conditions) of the complex impedance Z of the electrochemical system under study as a function of the frequency, f, or angular frequency, co, of an imposed sinusoidal perturbation of small amplitude.

Equivalent circuit—in electrochemical impedance spectroscopy (EIS), a virtual network of ideal passive electrical components that mimics the full electrical (AC+DC) behavior of an electrochemical system.

Mass transport (mass transfer)—the net movement of mass from one location, usually meaning stream, phase, fraction or component, to another.

Diffusion—the transport of particles caused by the local difference in the chemical potential. The flux of particles is proportional to the gradient of the chemical potential (or concentration, in simplified case).

Convection—one of the modes of mass transport. Contrary to diffusion or migration when transport of the species occurs from one location in solution to another by a molecular mechanism, in the case of convection the movement of whole volume elements of solution takes place. Convection may occur due to density gradients (natural convection). A density gradient may arise at high currents due to the production or depletion of matter, especially in technical electrolysis and in coulometric experiments. Heating or cooling may also cause density gradients. Forced convection may be unintentional, e.g., due to the vibration, but may be induced by stirring, etc.

Migration—A kind of charge/mass transport that is related to ions and the existence of potential gradient in the solution. When current flows through a solution it is carried by ions and this constitutes the migrational transport.

Beer-Lambert-Bouguer Law—a physical law that relates the attenuation of light to the properties of the material through which the light is travelling. According to the Beer-Lambert-Bouguer law, the factor of attenuation (named optical density, D) of a beam of collimated monochromatic radiation in a homogeneous isotropic medium is proportional to the absorption path 1, chemical compound's decadic molar attenuation coefficient ε (which includes the effects of absorption, scattering and fluorescence) and molar concentration C:

$$D = -lg\left(\frac{I}{I_0}\right) = \varepsilon Cl,$$

where I relates to the intensity of passed light and $I_0$—to the intensity of the light entering the attenuating medium. For the solutions, the molar absorption coefficients are used to describe the intensity of light attenuation by the solutes.

Electrochromism (EC) is the physical phenomenon found in certain compounds, compositions or assemblies which can reversibly change optical properties such as color or light transmittance due to electric current arising with an application of a voltage called a control voltage. Systems or materials showing the phenomenon of electrochromism are called "Electrochromic".

Electrochromic material—a material that displays electrochromism. Such materials can be generally classified as type I, II or III. A "type I" material is soluble in both the reduced and oxidized (redox) states, an example being 1,10-di-methyl-4,40-bipyridylium ("methylviologen"), which, on reduction, switches from the colorless di-cation to the blue radical cation. A "Type II" material is soluble in one redox state but form a solid film on the surface of an electrode following electron transfer. An example here is 1,1-di-heptyl-4,4-bipyridylium ("heptyl viologen"). In "type III" materials, such as tungsten oxide, Prussian blue, and electroactive conjugated polymers, both or all redox states are solids, and such systems are generally used as thin films on electrode surfaces. For types II and III, once the redox state has been switched, no further charge injection is needed to retain the new electrochromic state and such systems are said to have "optical memory". For type I electrochromic materials, diffusion of the soluble electrochemically generated product material away from the electrode occurs and it is necessary to keep current flowing until the whole solution has been electrolyzed. Where more than two redox states are electrochemically accessible in a given electrolyte solution, the electrochromic material may exhibit several colors and be termed polyelectrochromic, a frequent property of thin films of electroactive conjugated polymers.

Electrochromic device (EC device)—a device that uses the phenomenon of electrochromism.

All-in-one EC devices—a class of electrochromic devices where all the electrochromic material(s) are incorporated within ionic conductor phase(s) rather than being set apart into separate electrochromic phases having electronic conductivity.

Electrochromic layer (EC layer)—electrochromic material or composition that covers a surface or is disposed between two objects. An EC layer in an all-in-one EC device serves as an ion conducting element which can vary optical properties of an all-in-one EC device upon application of an electric input signal via electrodes of such a device. In certain aspects, an EC layer can be substantially or entirely clear, non-turbid, non-hazy, colorless or a colored medium. It can be in contact with both anodic and cathodic stacks of a variable transmittance layer or in contact with at least one anodic or cathodic stack and at least one auxiliary electrode (e.g., an electrode located outside an optical path of an EC layer) of the opposite function.

Light-absorbing compounds—compounds that provide the attenuation of the electromagnetic radiation flux in visible and/or UV and/or NIR regions, thus (1) creating the desired visual sensation for a human looking through an EC device and/or for an area where it is installed and (2) providing the EC device the ability of regulation of the amount of the incoming electromagnetic radiation energy in aforementioned regions of electromagnetic radiation. These compounds are formed and consumed within an EC layer during normal operation of an EC device and their amounts are varied by electric input signals applied to the EC device.

Auxiliary compounds—components that can be included in an EC composition or layer that facilitate reaction sequences that lead from initial electrochemical processes to formation or consumption of light-absorbing species.

Modifiers—components that can be included in an EC composition or layer to adjust certain properties thereof such as durability, stability, viscosity, fabrication properties, etc.

Matrix—a medium of an optimized EC composition or layer which provides conditions for formation and consumption of the light-absorbing compounds, sufficient solubility of such compounds, their precursors and other soluble components of an EC composition or layer. An optimized matrix can support optical and low haze properties of an EC layer after fabrication; light absorption properties of the light-absorbing compounds (the solvatochromic effect); the interface with electrodic stacks, which facilitates electrochemical steps of the sequences that lead to formation and consumption of the light-absorbing compounds; adhesion of an EC layer to electrodes, which provides the constructional rigidity (durability) to a variable transmittance layer; mass transport rates of electrochemically active compounds and products of the reactions, ions (ionic conductivity) and auxiliary compounds/modifiers; chemical and electrochemical stability at the operational conditions (potentials, currents, chemical composition, etc.) of an optimized EC device; suitable rheology for the fabrication process (together with the composition of modifiers); optical properties (reflection, transmission, refraction) of the electrode-electrolyte interface.

Additional elements—substances that can be included in an EC composition or layer but are not soluble therein such as spacers (e.g., glass beads), ion-selective or porous membranes, reference electrodes (e.g. Pt or Ag wires) or auxiliary electrodes (e.g. Li/graphite electrode).

Electrochromic composition—a mixture including one or more electrochromic materials. An EC composition can also include a matrix "as is" or components that form a matrix such as during casting, post-processing or other processes that can integrate an EC composition into a device in the form of an EC layer. Such components can include one or more of a solvent, polymeric material or components to form a polymeric material, supporting electrolyte, auxiliary compound, modifier, additional element, etc. An EC composition may be present in the form of a solution, dispersion, melt or gel.

AM 1 sunlight—terrestrial global irradiance or solar irradiance at sea level, i.e., traversing the atmosphere, when the direction of the sun is perpendicular to the surface of the earth.

Optical bandpass filter—an optical device that permits the transmission of radiation within a specified wavelength range and does not permit transmission of radiation at higher or lower wavelengths.

Iris or halo effect—a non-uniform distribution of coloration over a variable transmittance layer in a lateral direction generally from an area away from points of external circuitry connection (e.g., electrodes) relative to an area near such connections.

Sol—a colloidal suspension of solid particles in a liquid medium.

Gel—Non-fluid colloidal network or polymer network that is expanded throughout its whole volume by a fluid. A gel can be a substantially dilute cross-linked system. Certain gels can exhibit effectively no flow under steady state at atmospheric pressure (1 atm.) and room temperature (i.e., 20° C.). By weight, gels can be mostly liquid, yet they behave like solids due to a three-dimensional cross-linked network within the liquid.

Substrate—an underlying substance or layer, which can be flexible or rigid. Certain substrates can mechanically support an EC layer.

Variable transmittance layer—an assembly including an EC composition or layer in electrical contact with an anode and cathode and that can be controlled using an external electric circuit. Such an assembly can be an EC layer and one or more electrodic stacks that can be controlled using an external electric circuit. The EC layer can be between two electrodes, e.g., two electrodic stacks, or between a substrate without an electrode and an electrode, etc.

Gel Electrolyte—an electrolyte in a form of gel.

Visible light transmission (VLT, $\tau_v$)—relates to the perceived transmission of light in the visible spectrum (also referred to as visible light) from 380 nm to 780 nm:

$$\tau_v = \frac{\sum_{\lambda=380\,nm}^{780\,nm} \tau(\lambda) D_\lambda V(\lambda) \Delta\lambda}{\sum_{\lambda=380\,nm}^{780\,nm} D_\lambda V(\lambda) \Delta\lambda},$$

where $D_\lambda$ is the relative spectral distribution of illuminant D65 (see ISO/CIE 10526), $\tau(\lambda)$ is the spectral transmittance at wavelength $\lambda$, $V(\lambda)$ is the spectral luminous efficiency for photopic vision defining the standard observer for photometry (see ISO/CIE 10527) and $\Delta\lambda$ is the wavelength interval.

UV and NIR—relate to ultraviolet (UV) electromagnetic spectrum, which ranges from about 10 nm to about 400 nm, and near infrared (NIR), which ranges from about 750 nm to about 1,400 nm.

CIE—International Commission on Illumination.

CIE L*a*b* (CIELAB) space—a color space that expresses color as three values: L* for the lightness from black (0) to white (100), a* from green (−) to red (+), and b* from blue (−) to yellow (+). CIELAB was designed so that the same amount of numerical change in these values corresponds to roughly the same amount of visually perceived change. The nonlinear relations for L*, a*, and b* are intended to mimic the nonlinear response of the human eye. Furthermore, uniform changes of components in the L*a*b* color space aim to correspond to uniform changes in perceived color, so the relative perceptual differences between any two colors in L*a*b* can be approximated by treating each color as a point in a three-dimensional space (with three components: L*, a*, b*) and taking the Euclidean distance between them. There are no simple formulas for conversion between RGB or CMYK values and L*a*b*, because the RGB and CMYK color models are device-dependent. However, the CIELAB coordinates of a color may be calculated from an UV/Vis transmission spectrum.

CIELAB matching—an approach of composing a perceived color from several other colors that uses the linearity of the CIELAB space for human eye. For example, if a pair of light-absorbing compounds is present in a solution, the resulting color perceived by a human would be described by the sum of the a* and b* values of the solutions of single components of the same concentration weighted in accordance with their L* values.

Color path of an EC device—a property of an EC device that describes how the color of the device changes during transient processes of bleaching and darkening.

The present disclosure is directed to electrochromic devices and components thereof and systems and methods for controlling electrochromic devices. The present disclosure is also directed to electrochromic materials and compositions, including electrochromic compositions and layers in the form of a gel. Prior to describing the details of the various aspects of the present disclosure, it may be helpful to explain various mechanisms implicated in an EC device and general components and structure of EC devices of the present disclosure. Such mechanisms and structure are provided below.

General Device Structure

In general, an electrochromic device includes an electrochromic composition (e.g., in the form of an EC layer) disposed between two substrates which can include electrodes thereon. The electrochromic layer is configured to change light transmission (visible, infrared and/or ultraviolet) from one state (e.g., a high light transmission state) to another state (e.g., a low light transmission state) in response to an input signal applied across the electrochromic composition. Such an input signal can be an applied voltage, electrical current, electric field or other input that causes an electrochromic material to change its optical properties. The electrochromic composition can include type I and type II electrochromic materials and their hybrids. In some embodiments, the EC electrochromic composition includes one or more electrochromic materials that can change light transmission from one state to another state in response to an input signal. The electrochromic composition can also include a matrix and one or more of a modifier, additional element, auxiliary compound, or a combination thereof.

In certain aspects of the present disclosure, the electrochromic composition or layer can be in the form of a gel. Such a gel comprises a solid network phase and a liquid phase. Advantageously, such a gel can be disposed on a film and the gel-film composite provided as a stand-alone product. In certain aspects of the present disclosure, an electrochromic composition in the form of a gel can exhibit effectively little to no flow under atmospheric pressure (i.e., 1 atm.) and room temperature (i.e., 20° C.).

To obtain necessary attenuation factors, visible light transmission (VLT) and spectral properties of an EC device, the concentrations, molar absorption coefficients and absorption spectra of the colored species selected and properties of the absorption paths for the EC device should be combined appropriately. An EC layer of an EC device can have several possible configurations:

(1) solution-type (containing type I electrochromic materials), where the electrochromic effect is obtained by varying the concentration profiles of the colored species over the volume of the layer, whereas the thickness of the layer is fixed;

(2) deposit-type (containing type II electrochromic materials), where the electrochromic effect is obtained by the deposition of the colored precipitates in the EC layer on the electrode interfaces;

(3) thin film-type (containing type III electrochromic materials), where the electrochromic effect is obtained by varying the absorption spectrum (and, hence, absorption coefficients) of one or more the pre-casted films of separate phases of type III electrochromic materials;

(4) network-linked type, where the electrochromic effect is obtained by varying the absorption spectrum of chromophore moieties chemically bonded to an immobilized polymer backbone of a gel.

(5) hybrid types (containing several types of electrochromic materials), which combine the properties of the aforementioned types.

In the first type of the EC layer, the concentrations of the colored species along the attenuation path may not be uniform, so the total attenuation for every colored component is proportional to the integral of its concentration over the light propagation path. In the second type the absorption characteristics (absorption coefficients and spectra) are uniform along the attenuation path, so the thickness of the deposit layer determines the intensity of the light attenuation.

An all-in-one EC device typically does not include some kinds of type 3 EC layers.

To achieve a desired visual sensation of an EC device, light-absorbing compounds of an EC composition or layer can be appropriately matched and composed in a way to stimulate human vision system with a desired effect. Human vision perceives electromagnetic radiation of visible range by light-sensitive cells of retina, cones and rods. At relatively high luminance (more than $10^{-3}$ cd/m$^2$) (J. Pokorny et al., *Congenital and Acquired Color Vision Defects*, Grune & Stratton, 1979) the cone cells are responsible for the light perception, giving the ability of color recognition (the photopic/mesopic vision). Concerning the color perception by a human, the requirement to the light-absorbing compounds is to filter the light transmitted through an EC device so that different types of the cone cells are stimulated in accordance with the photopic/mesopic vision sensibility curve.

Composing neutral (grayscale) EC devices: In order to create a grayscale device one need not compose an EC composition or layer with an ideally flat absorption characteristic in visible light range. Instead, minima or maxima of absorption can be situated close to the maxima of the sensitivity of human cone cells and for their intensities to be matched in accordance with the vision sensibility curve. The most convenient way to attain it is to use CIELAB matching.

Light absorption of compounds: To attenuate the electromagnetic radiation flux, a chemical compound exhibits the property of electromagnetic radiation absorption, which is related to the phenomenon of the radiation-induced electronic transitions between the electronic energy states. For any chemical compound there is a set of allowed electronic transitions which determine its behavior concerning interaction with electromagnetic radiation. Generally, the spectrum of UV/visible light/NIR absorption of a compound is composed of a number of individual absorption bands, each of them being attributed to a single radiation-induced electronic transition. The spectrum is continuous due to the peak broadening. Each transition has its intensity, which is defined by its probability and absorption cross section. Each electronic energy level of a compound has vibrational and rotational sub-structures, which determine the shape of the absorption band. To simplify the control methods, fabrication and to optimize the color paths of an EC device switching, it is highly preferred to obtain the desired light absorption characteristics by the minimal number of the light-absorbing compounds. For such a preference, selecting one or more light-absorbing compounds having broad absorption bands (strong light absorption) is preferred. Another advantage of light-absorbing compounds having strong light absorption is that such components may be used in low concentrations, reducing costs and power consumption of an EC device.

Special cases of concentration-absorption relationships: Some compounds may show nonlinear concentration-absorption dependencies due to the processes involving chemical interactions between colored species in solutions. For instance, some compounds tend to form dimers having different absorption characteristics. In this case the dependency of the optical density on the concentration may deviate from the Bouguer-Lambert-Beer law, e.g. taking a parabolic form. The color of the solutions of different concentrations may also differ. These properties may be used to construct multicolored devices and should be taken into account concerning color paths of darkening and bleaching, which are then dependent on the shapes of concentration profiles, especially for Type I/II devices (vide infra). The presence of such a property of light-absorbing compounds may be used to construct more cost- and power-efficient devices if the target VLT values are obtained by more thin and concentrated EC layers. This property may be also used for spectral tuning, such as CIELAB matching if a compound shows a concentration-dependent color shift. In a case when a dimerization spoils the performance of an EC device, e.g. causing unwanted shifts of shade at low VLT values, it may be suppressed via chemical modification.

Color tuning by chemical modification: To compose and/or adjust the desired absorption spectrum chemical modifications of chemical structures of cores of light-absorbing compounds may be carried out. A wide variety of functional groups may be introduced to organic compounds to change their properties, e.g. the absorption of visible light. Upon oxidation or reduction of a precursor compound having absorption in ion-radical form, one of the former frontier orbitals (unoccupied LUMO or fully occupied HOMO) turns into a single occupied SOMO, allowing transitions from/to closely located SOMO−N or SOMO+N orbitals. This phenomenon is responsible for the bandgap of ion-radical species being narrow causing strong absorption in visible range. In context of chemical tuning of light-absorbing compounds the influence of functional groups on the absorption of ion-radicals should not be accompanied by any significant effect on the precursor HOMO-LUMO bandgap width and hence on the absorption of non-radical colorless forms of corresponding electrochromic materials. The introduction of strong chromophore groups (e.g. —$NR_2$, —OR, —$NO_2$, —N=N—, etc.) is then not favorable because they may displace energy levels within the bandgap of a precursor and impart a color to it. Moreover, these groups may strongly affect the chemical properties and worsen the stability of a precursor/ion-radical. Varying the electronic substructure of precursors is better accomplished in this sequence:

(1) Introduction of functional groups conjugated with the aromatic core of a precursor, which have a considerable number of π-orbitals separated by a large bandgap (>3.0 eV): phenyl, naphtyls, biphenyls. This modification causes a strong shift of the color of an ion-radical due to the insertion of several energy levels below and above the bandgap of the precursor and lowering the minimal distance between the levels between which light-induced transitions are allowed.

(2) Modification of the aromatic substituent with inductive (—$CH_3$/alkyl/branched alkyl, —$CF_3$/fluorinated or perfluorinated alkyl/branched fluorinated or perfluorinated alkyl, —F, —$SF_5$, etc.) or weak mesomeric (—$OCF_3$, meta-OR', meta-$NR'_2$, etc., where R' is an alkyl or substituted alkyl, etc.) donors/acceptors. These functional groups shift the positions of energy levels or displace their levels so that the bandgap of the precursor doesn't get significantly narrower. Introducing the groups with very weak effects is used for the finest tuning of the absorption spectrum. Several groups may be introduced to attain the desired effect.

The special case of the modifications is those which provoke or suppress the dimerization of compounds prone to it: e.g., adding an aliphatic linker between two ion-radical light-absorbing cores for provoking the dimerization or introducing bulky substituents (a tert-butyl substituent, for instance) for suppressing the dimerization. The dimerization significantly changes the absorption characteristics and distorts the concentration dependency. It may also cause solvatochromic effects.

Other purposes of chemical modification: The color tuning is not the only purpose of the chemical modification of precursors. The parameters able to be adjusted include: (1) The mass-transport properties, by adding bulky substituents; (2) The oxygen/water stability of ion-radical forms (specific for each case); (3) The redox potentials, by introducing substituents with pronounced electronic effects which shift the whole energy structure but don't make the bandgap significantly narrower; (4) The solubility, especially at low temperatures (specific for the matrix used); (5) The rates of chemical interactions between colored products of anodic and cathodic reactions (for Types I/II).

In general, every substituent makes a complex effect on all the properties at once, but some of the consequences are more intense than others. Thus, a suitable modification strongly depends on the final purpose of the device.

Phenomenon of charge transfer, interfacial equilibrium: A fundamental phenomenon of electrochemical processes is interphase charge transfer. If two phases are brought into contact, they form an interface, at which electrochemical potentials of electrons, also denoted as Fermi level ($E_F$), in both phases tend to equalize. The mechanism of $E_F$ equalization depends on types of materials which form an interface, though that process is always accompanied by electron transfer, which must be isoenergetic. (H. Gerischer in "*Physical Chemistry: An Advance Treatise*", Vol. 9A, H. Eyring. D. Henderson, and W. Jost, Ed., Academic Press, New York. N.Y., 1970; (b) H. Gerischer, Adv. Electrochem. Electrochem. Eng., I, 139 (1961). Hence, for an electron transfer to proceed there should be a couple of occupied and vacant levels (states) of equal energy (within the range of thermal fluctuations, kT) in two phases that form an interface. In certain all-in-one EC devices, initial electrochemical reactions occur at the interfaces between an ionically conducting (mostly, solution) EC layer and electrodes, e.g., metal or semiconductor/dielectric layers of electrodic stacks.

Solution side of an interface: A solution-type EC layer typically comprises a liquid phase. Electric conductivity in liquids except metal melts is provided by the mass transport of ions, so the liquid phase generally contains dissolved ionic compounds (i.e. electrolytes). An EC layer can have interfaces with conductive materials, their conduction being associated with the drift of free electrons. Thus, at the phase boundaries between electrodes and EC layer contacts of ionic and electronic conductors arise. In the bulk liquid ionic conductor, under equilibrium conditions, the time-average forces are the same in all directions and at all points in the bulk electrolyte and there are no net preferentially directed electrical fields. However, the liquid phase is interrupted at the phase boundaries, so the ion-ion and ion-solvent interactions, which are uniform in a bulk liquid, become perturbed and the electroneutrality is broken down at the frontier. The excessive charge in a liquid phase produces the electric field that interacts with charged particles, of which an electrode is made. This interaction induces a charge on the electrode. Thus, a potential difference arises across the electrode interface, which is then electrified. The aforementioned interaction is known to form a specific interfacial structure known as "double layer" or "electric double layer" (hereinafter, EDL). Due to very low thickness of an interface even low potential differences may produce very strong electrical fields (on the order of $10^7$ V·cm$^{-1}$), which affect the charged species in the interfacial region of the liquid. If an electroactive solute is located at the interface, a charge transfer to/from a solution energy state may occur, thus leading to an electrochemical reaction.

Electron transfer to/from a solution: Solutes of small molecule species, have discrete energy spectra. Reversible redox processes of small molecule solutes involve electron transfer from/to energy levels of frontier orbitals of a solute (HOMO, SOMO or LUMO). However, for electroactive solutes, the energies of the solution states depend on whether the state is occupied (Red) or vacant (Ox), owing to the difference of solvent-sheath energies, λ, around the Red and Ox species. Since solvent molecule exchange between the coordination sphere of the redox-active species and the bulk electrolyte is a dynamic process leading to a range of solvent sheath energies, the density of redox states is best described in terms of separate Gaussian distributions. The effective distance of the electrode-electrolyte electron transfer is supposed to have a value of OHP distance (which is considered as the slippery plane), because it's the closest position that an electroactive specie can reach in the absence of the specific adsorption (in this context only redox electrodes are discussed). Thus, the driving potential difference over the interface is the difference between the electrode surface (more complicated for semiconductors) potential and the potential of the OHP. The latter is determined by the electrode type, its potential and the properties of the electrolyte. The electrode may be connected to an external electric circuit, so its Fermi level may be changed; the electrolyte, as the medium that contain mobile charge carriers, is known to be polarized by an applied electric field due to the migration effect. Thus, the electric field is considered to penetrate the medium only to a certain depth, in the bulk medium the electric field strength being zero (figure). The thickness of non-electroneutral layer (and, therefore, of EDL) depends on the ionic strength of the solution and could be roughly estimated as a value of a few Debye lengths. The narrower EDL is, the higher driving potential difference arises between the electrode and the OHP, thus making the electron transfer more probable.

Metal-electrolyte interfacial charge transfer: The conduction (CB) and valence (VB) bands of a metal are overlapped, so there are no forbidden energy levels for an electron. The energy spectrum is continuous and therefore Fermi level reflects the top order of energy that an electron may have (taking into account the thermal distribution around it). If any charge is introduced to or withdrawn from a metal its Fermi level changes due to the variation of the number of electrons in it (ions are considered to be immobilized in comparison with electrons), electrons occupying the levels of lowest possible energies according to the Fermi-Dirac statistics. If a metal is brought in a contact with an electrolyte, which contains electrochemically active solutes, their energy levels appear at the electrolyte side. Some levels are occupied once or twice, some are free. A pair of compounds that represent reduced (donor, Red) and oxidized (acceptor, Ox) forms of a specie form the redox couple. At non-zero densities of Red and/or Ox states at the interface a charge transfer is caused until the Fermi level of the metal and redox Fermi level of the electrolyte are equal. Every electron transfer must be isoenergetic, thus, reduction of solutes may take place if the Fermi level overlaps the regions of non-zero density of Ox states and oxidation may happen if the Fermi level overlaps the regions of non-zero density of Red states. (H. Gerischer in *"Physical Chemistry: An Advance Treatise"*, Vol. 9A, H. Eyring. D. Henderson, and W. Jost, Ed., Academic Press, New York. N.Y., 1970; H. Gerischer, Adv. Electrochem. Electrochem. Eng., I, 139 (1961)).

Semiconductor-electrolyte interface interfacial charge transfer: In contrast to metals, the CB and VB of semiconductors (SCs) are not overlapped, therefore a range of forbidden states is present (the bandgap). An isoenergetic charge transfer may only happen if the energy levels of non-zero densities of acceptor (Ox) or donor (Red) states in the electrolyte match with the energy levels of complementary states in the semiconductor (electrons or holes). Thus, only those solutes with energies near the conduction or valence bands can exchange electrons with a semiconductor electrode (in the absence of such complicating factors as surface states or energy levels between the conduction and valence bands) (Journal of the American Chemical Society/97.26/Dec. 24, 1975). Since concentrations of charge carriers in semiconductors may be $10^6$-$10^8$ times lower than in a metal, the densities of available states in a semiconductor influences its electrochemical behavior: an intrinsic semiconductor (at dark conditions) may possess low concentrations of both electrons at CB and holes at VB, so the rates of charge transfer may be negligible; an n-type semiconductor has relatively high amount of electrons at the CB, so it can keep considerable rates of charge transfer to acceptor (Ox) states; a p-type SC, similarly, may efficiently withdraw electrons from donor (Red) states due to relatively high concentrations of holes at VB. However, degenerately doped semiconductors may demonstrate metal-like behavior if the potential exceeds the flat-band potential ($V_{fb}$) (more negative for n-type, more positive for p-type), so they may be used well both for reduction and oxidation, but only for the solutes, which Ox and Red states energies are higher than $V_{fb}$ (for n-type SC) or lower (for p-type SC) (Journal of the American Chemical Society/97.26/Dec. 24, 1975).

Transparent Conductive Oxide (TCO) electrodes: Transparent Conductive Oxide (TCOs), being degenerately doped semiconductors having quasi-metallic conductivity, possess the wide bandgap (~3.0 eV or more), making them barely interactive with visible light. Most widespread TCOs are n-type, so to keep the ability to oxidize and reduce the solutes at the interface, the range of potentials that provide metal-like electrode behavior are preferred. To obtain better performance and to widen the variety of usable solutes, high work function materials are preferable for anode. Quasi-metallic conductivity gives low ohmic resistivity and specific interfacial properties, so TCOs may combine functions of surface conduction and interfacial charge transfer; however, additional surface conductive layers and/or interfacial layers may still be introduced to the electrodic stacks that contain TCOs.

Semiconductor interface effects: The peculiarities of semiconductors (SC) may be used to control the electrochemical processes on the electrodes of a variable transparency layer. For example, using a sufficiently low work function SC at the cathodic interface (e.g., a bare SC conductive layer or with one or more interfacial layers) may block oxidative processes except those of reduced states of initially electroreduction-sensitive compounds. This allows use of fast discharging of the variable transparency layer by applying strong reverse overpotentials as in, for example, a TYPE II device (described more fully below).

In addition, reverse electrochemical processes of electrochemically generated species on the counter electrodes may be suppressed by using a SC interface (see Type II device below).

Mass transfer, ion transfer: Every interfacial charge transfer converts a reduced specie to an oxidized one in case of electrooxidation and vice versa in case of electroreduction. Once the electrolyte redox Fermi level is shifted via a charge transfer, the concentrations of reagent/product solutes at the interface changes (in comparison to bulk electrolyte), thus causing the concentration gradients and hence the diffusional fluxes. Moreover, electron transfer at the interface leads to the emergence of the uncompensated excessive charge within the electrolyte at the OHP, which contributes to the electric field. Every charged specie interacts with it, causing electromigration. The uncompensated charge in the electrolyte changes the driving voltage over the interface (Frumkin effect, see above). The solution components interact with the electrostatic field induced by the charge, causing the reorganization of the surrounding medium, forcing ions to migrate and solvent dipoles to reorient. The rate of the charge compensation depends on dielectric constant of the solution and on the rates of the ion transfer.

If the charge transfer rate exceeds the rate of mass transfer of a reagent solute, the overall rate of electrochemical reaction (and hence the total electric current) becomes mass-transfer dependent. Thus, the mass transfer of the reagent solutes contributes significantly to the reaction rates. In most cases, the rates of the charge transfer steps are higher than the rates of the mass transfer. The proper mass transfer rates affect optimization of the performance of an EC device: too high rates of mass transfer may lead to excessive electric currents and power consumption (which may lead to the high ohmic drop on the electrodes and hence to the EC device malfunction), whereas too low mass transfer rates may cause extremely long switching times and poor optical characteristics. The rates of mass transfer processes are able to be set by varying the matrix and chemical tuning of solutes structures for a given application.

Concerning ionic compounds, significant contribution to mass-transfer rates are given by the phenomenon of ionic association. Strong ionic association reduces solubility and may drastically worsen the mass-transfer rates. Hence, an EC composition or layer are preferred to include at least one weakly coordinating ion (cation/anion or both, see below).

Convection: If the electrolyte is liquid, the mass transport mechanisms are not limited to the diffusion and migration. Thermal effects of chemical and electrochemical reactions, the operational temperature difference between the parts of an EC device (which may arise due to the various heat release along an optical path by light absorbing compounds, and over the exposed surface), the dependence of the density on the concentrations of the species dissolved, and other factors may cause the bulk flows within an EC layer, thereby causing convection effects (e.g. Rayleigh-Benard cells, color splitting, etc). In an EC device this may cause the transmittance fluctuations and gradients, high operational currents and therefore is desirable to be suppressed by adjusting the rheology of the EC layer.

Charge Conservation: If an electrochemical reaction happens on an electrode-electrolyte interface, the excessive charge that is formed on the electrode must be withdrawn by an external electric circuit (e.g., the control circuitry). To allow the current flow through an EC device the charge receiving portion must be electrically coupled with the first electrode. Because the initial process is a Faradaic charge transfer from an ionic conductor to an electronic one, to preserve the electroneutrality of an EC layer the system must contain a second contact of electronic and ionic conductors that allows the complementary Faradaic charge transfer from the electrode to the EC layer. Therefore, typical all-in-one EC devices can be represented by an electrochemical cell that contains at least two electrodes (anode and cathode) and an EC layer that contains at least one compound that is sensitive to the electrooxidation and one sensitive to electroreduction. However, there is no need for an anode and cathode to be both transparent or to be located within an optical path for light transmittance. In certain aspects of EC devices of the present disclosure, only one electrode is located within an optical path for light transmittance and in contact with an EC composition or layer in order to produce/consume colored species over the composition or layer. In such a case, the second substrate defining the optical path may not have any electrode or electrodic stack or may have the anodic or cathodic electrode as the first substrate (e.g., two optically transparent anodes or two optically transparent cathodes). The second electrode may be located within any auxiliary volume ionically conjugated with the EC composition or layer, for example.

As explained above, the present disclosure is directed to, among other aspects, electrochromic devices and components thereof and systems and methods for controlling electrochromic devices. Referring now to the drawings, FIG. 1A depicts an exemplary electrochromic device 100. As shown in the figure, controller 110 is electrically connected to variable transmittance layer 120 via electrical connections 112a, 112b and bus bars 130a and 130b, respectively. Controller 110 can include circuitry, and optionally software, to apply an input signal to the variable transmittance layer. The variable transmittance layer 120 can include an EC layer disposed between two optically transparent substrates, at least one of which includes an electrically conductive surface forming an electrode. For this particular example, variable transmittance layer 120 includes two optically transparent substrates each of which includes an electrically conductive surface forming electrodes. In this example, bus bars 130a and 130b are on and electrically in contact with each of such electrodes.

There may be more than one connection on each electrode, and different connections can have different functions. For example, some of the connections may have the Signal function while others may have Sense function.

Electrochromic activity of device 100 is provided by the variable transmittance layer 120. The variable transmittance layer may include one electrodic stack, a bare dielectric substrate and an EC layer, or two electrodic stacks and the EC Layer therebetween. An exemplary variable transmittance layer 120 structure is depicted in FIG. 1B. For example, as depicted in FIG. 1B, the variable transmittance layer 120 may include dielectric substrates 124a and 124b, anode 126a, cathode 126b, and an electrochromic layer 121 for controlling light transmission. An anodic interface layer (or anode-side inter-phase electron transfer layer) 128a, and/or a cathodic interface layer (or cathode-side inter-phase electron transfer layer) 128b, can optionally be included in the variable transmittance layer. Further external coatings 122a and 122b, can optionally be on dielectric substrates 124a and 124b, respectively.

The EC layer 121 provides the ability of transmittance alteration when an electric bias is applied between it and the electrodic stacks 123 and 125 that are in contact with it. The control system can include circuitry to apply an input signal though the electrical connections and electrodes in contact with the electrochromic layer. The input signal can include, for example, a certain voltage, e.g., less than about 1.5V, preferably below about 1.3V and more preferably below about 1.2V, such that light transmission of the electrochromic layer changes from one state (e.g., a high light transmission state) to another state (e.g., a low light transmission state).

The functions of these elements are as follows:

The outer surfaces of the substrates of the variable transmittance layer 120 may be optionally covered with one or more functional coatings (e.g., external coatings 122a, 122b) such as, for example, anti-glare, index matching, antireflective coatings, low emissivity (low-e) coatings; radiation filters (UV/NIR blockers, color filters); scratch-resistant or armoring coatings; hydro-, oleo- or omniphobic coatings; adhesives (may hold the index matching functions for a specific material on which the EC device is supposed to be applied); etc.

Dielectric substrates 124a/124b of the electrodic stack of the variable transmittance layer are high optical transparency, low haze structural element. The substrates may be made of glass, plastic (bulk or film) or transparent ceramic in various embodiments. In some embodiments bus bars (described elsewhere herein) are added to the substrate and are electrically connected to the respective electrodes (anode 126a or cathode 126b). In an embodiment, the substrate may include one solid layer, for example a sheet of glass. Alternatively, the substrate may include multiple layers such as, for example, a laminated glass triplex. Such construction could be beneficial for safety. The substrate may also provide other functions.

Glass is a preferred transparent dielectric substrate for many applications. It typically has superior transparency, low haze and structural stability. If it is not compromised structurally, it is impervious to gasses and liquids, making it an excellent barrier to protect sensitive compounds.

There may often be rigorous requirements for operational stability and safety for glass. These functions are typically accomplished by using tempered glass, heat treated glass and/or glass laminated with safety interlayers. Such glass substrates can be used in the EC devices of the present disclosure.

Tempering is heat treatment of glass sheets including in heating them to a temperature above the 560° C., followed by rapid cooling using air flow. Tempering is performed in an oven where glass is transported to by rollers. The imprint of the roller structure typically results in a wavy shape of tempered glass, potentially leading to optical distortions. One way to reduce such unwanted distortions is to laminate two tempered glass sheets together with peaks of one glass sheet matched generally against the valleys of the other sheet. Hence in an aspect of the present disclosure, EC devices can include as one or more optical substrates a first tempered glass sheet laminated to a second tempered glass sheet with peaks of the first tempered glass sheet matched generally against valleys of the second tempered glass sheet.

Tempered glass has higher mechanical strength than regular, annealed, glass. Once tempered glass breaks, it disintegrates into multiple small pieces of glass containing few sharp edges, thereby accomplishing safety function. Majority of automotive side and rear windows are made from tempered glass.

Lamination of glass is another method to accomplish safety function. Two sheets of glass are joined together using an interlayer sheet. The assembly is then treated with temperature and/or pressure, often accompanied by vacuum degassing to remove any air bubbles. Two most common classes of interlayer sheets are made from Polyvinyl Butyral (PVB), and Ethylene-Vinyl Acetate (EVA). Laminated glass, once broken, remains attached to the interlayer, thereby accomplishing safety function.

In some embodiments, transparent plastics are used as substrates for electrochromic devices. Their advantages relative to glass are, for example, low weight, flexibility, if made in form of a film, high volume processing, for example in the roll-to-roll format, etc. On the other hand, plastics also have some disadvantages such as a generally lower optical quality compared to that of glass, lower optical and electrical quality of transparent electrodes, gas and water vapor permeability, probable long-term chemical reactivity with components of an electrochromic composition or, UV susceptibility resulting in degradation, lower temperature stability which can limit processing options, etc.

Plastic substrates suitable for electrochromic devices and applications of the present disclosure can be formed from, but are not limited to, Polyethylene Terephthalate (PET), Polytetrafluoroethylene (PTFE), Perfluoroalkoxyalkane (PFA), Polyethylene naphthalate (PEN), Polycarbonate (PC) and others. In order to reduce or eliminate chemical reactivity of plastics with EC materials surfaces in contact with EC materials may be passivated with an inert material.

In some embodiments, the substrates are transparent ceramics. Transparent conductive electrodes are deposited on the surface of such substrates by the same methods as onto glass.

An optically transparent electrodic stack (e.g., anodic stack 123 and/or cathodic stack 125) in conjunction with an EC layer 121 keeps electrochemical processes at the electrode-electrolyte interface over the area of the variable transmittance layer 120. In the example of FIG. 1A, the electrodic stack includes at least one surface conductive layer, e.g., anode 126a and/or cathode 126b, to keep the surface currents with sufficiently low ohmic drops.

The anodic and cathodic surface conducting layers may be formed of transparent conducting electrodes such as OTEs. OTEs are widely used in the industry today, enabling a variety of devices used across a myriad of applications such as photovoltaics, flat screens, touch screens, heated transparent surfaces, EMI shielding and others. OTEs are typically characterized by their optical and electrical properties.

Optically, desired properties of OTEs relate to transparency (higher values are desired), color (neutral is preferred) and haze (lower values are desired).

Electrically, the property of interest of an OTE is sheet resistance, measured in the units of Ohm/square. Some applications, for example capacitive sensors for touchscreens, need relatively high sheet resistance, on the order of hundreds of Ohms/square. Electrochromic devices are typically low voltage devices that consume considerable currents, and therefore resistive losses need to be minimized, driving the requirements for low sheet resistance preferably below about 100 Ohms/square, e.g., below about 70 Ohms/square, such as less than about 50, 30, 20, 15, 10, 5 Ohms/square.

The main classes of OTE include OTEs made from transparent oxides, commonly called Transparent Conductive Oxides (TCO). Examples of TCOs include, but are not limited to, indium tin oxide (ITO), aluminum doped zinc oxide (AZO), fluorine doped tin oxide (FTO), molybdenum oxide ($MoO_3$), indium zinc oxide (IZO), indium gallium zinc oxide (IGZO), tin zinc oxide (TZO), tin oxide ($SnO_2$), aluminum doped tin oxide (ATO), zinc oxide (ZnO), indium oxide ($In_2O_3$), gallium oxide ($Ga_2O_3$), zinc doped tin oxide (ZTO), indium doped gallium oxide (IGO), gallium-indium doped tin oxide (GITO), gallium doped zinc oxide (GZO), zinc doped indium tin oxide (ZITO), zinc indium oxide (ZIO), gallium doped indium oxide (GIO), copper aluminate ($CuAlO_2$), etc. Most common ones are Indium-doped Tin Oxide, ITO, and Fluorine-doped Tin Oxide, FTO.

Other suitable of OTEs include, for example, thin layers of metals and metal meshes or grids (e.g., meshes or grids of metal nanowires). Thin layers (thinner than the characteristic wavelengths of visible light) of metals (e.g. silver or gold) are transparent and have great electrical conductivity. Sometimes these metals are alloyed with other metals reduce cost and improve chemical stability. Metals may be deposited as thin films or as nanoparticles from vapor or liquid phase. Properly designed metal layers may possess reflective properties in IR range, so an OTE having such layer can be used as a low-emissivity coating in addition to its primary functionality of electrical conductivity.

In some embodiments, hybrid OTEs, made by combining the layers of TCO and metals are used. The advantages of such hybrid construction include reduced overall stack thickness and improved optical properties for a given resistance or lower resistance for a given OTE thickness.

Other suitable materials for OTEs include, for example, carbon materials (e.g., single-walled or multi-walled carbon nanotubes, graphene); conductive polymers; conductive metal-organic or covalent organic frameworks (MOFs/COFs); or conductive metallocomplexes. It will be appreciated that the aforementioned materials may be mixed or stacked in a cathodic or anodic surface conducting layer and that the anodic and cathodic stacks may differ from each other.

Because EC devices have a source of electricity connected to them, one possible functionality to incorporate in such devices is a defogging capability. Defogging of an EC device can be achieved by a configuration including a heating element thermally connected to the device. Defogging can occur either by heating a substrate or external coating thereof of the device, or by heating an OTE of the device itself. If an OTE of the device is heated, it is important to minimize or avoid adverse effects towards electrochromic layer. The adverse effects may stem from elevated temperature, and from electrochemical processes. One way to avoid undesired electrochemical processes is to accomplish heating with alternating current, AC (as opposed to DC driven operation of the electrochromic device) at frequencies exceeding the frequencies corresponding to characteristic diffusion time constants of the electrochromic reaction in the device.

It will be appreciated that in view of the EC applications, OTEs desirably preserve their structural integrity and not react with chemicals from the EC layer 121 within the operation ranges of overpotentials. The issue of structural integrity is especially pronounced for OTEs on flexible substrates. For example, if ITO is deposited on PET, it may crack upon handling/bending. Generally, ITO is stable relative to EC chemistry. However, crack formation may change local stoichiometry of ITO and its dopants, resulting in increased reactivity with EC chemistry, which leads to rapid device degradation. Even without chemical degradation the formation of cracks may render the device inoperable as the distribution of electric potential is no more homogenous across the surface of the device. Such inhomogeneity results in patchy coloration of the device and to other optical defects.

From the chemical compatibility point of view, some OTEs based on metal may not withstand contact with EC components within the operation ranges of overpotentials. For example, silver and copper are corroded away rapidly under such conditions. Other metals and metal alloys are more stable, including gold, palladium, platinum, iridium, Hastelloy and some other metals and alloys. One way to protect metal OTEs in EC applications is to use them in hybrid, multilayer arrangement together with TCOs, e.g., an OTE/metal OTE/OTE layered structure on an optically transparent substrate. For example, such hybrid electrode could include a layer of ITO on a flexible substrate, followed by a thin layer of silver, followed by another layer of ITO, e.g., an ITO/silver OTE/ITO layered structure on an optically transparent substrate. The outer layer of ITO acts as both a part of an OTE and as a protective layer for silver, preventing direct contact between silver and an EC layer.

Another option is to use specialty anodic and/or cathodic interface layers. Such layers may not form a good OTE by themselves, but they would provide protection for the metal layer of OTE without substantially impeding the electric circuit. One option for such layer is to make it from a suspension of carbon nanotubes. However, the purpose of an interface layer is not limited to protecting an OTE (see below).

Where an EC device has two stacks (residing on two substrates), there is no requirement that the stacks and substrates should be identical. Indeed, in certain applications and device structures it may be advantageous to have one stack differ from another. The following are examples of such asymmetric arrangements and the benefits thereof.

Several applications of EC devices are asymmetric in terms of the environment in which they operate. In case of architectural windows, for example, the inside and outside of the window have very different environments. The sun load is acting from the outside, therefore majority of UV and IR load are impinging the surface of the EC device that is facing the outside. Therefore, it may be preferred to have the externally facing substrate differ from the internally facing one. For example, the externally facing substrate may have additional features such as UV absorption and/or IR reflectivity. Such features may be implemented either as a separate layer of the stack belonging to the externally facing substrate, or may be incorporated into the bulk of the substrate (for example, as UV absorbing additives within a plastic substrate). Another light control feature that can be optionally added to the externally facing stack is polarization control. By having the substrate, or one of its layers, act as a polarizer, the overall sun load and glare can be reduced. Hence in an aspect of the present disclosure, an optically transparent substrate, preferably an externally facing substrate, polarizes light or includes a layer thereon that polarizes light.

Another type of possible asymmetry is in two substrates made from different materials. For example, in case of AR goggles, one of the substrates may be a relatively thick polycarbonate lens, while the other one is a lightweight film, e.g. PET.

Figure 1C:
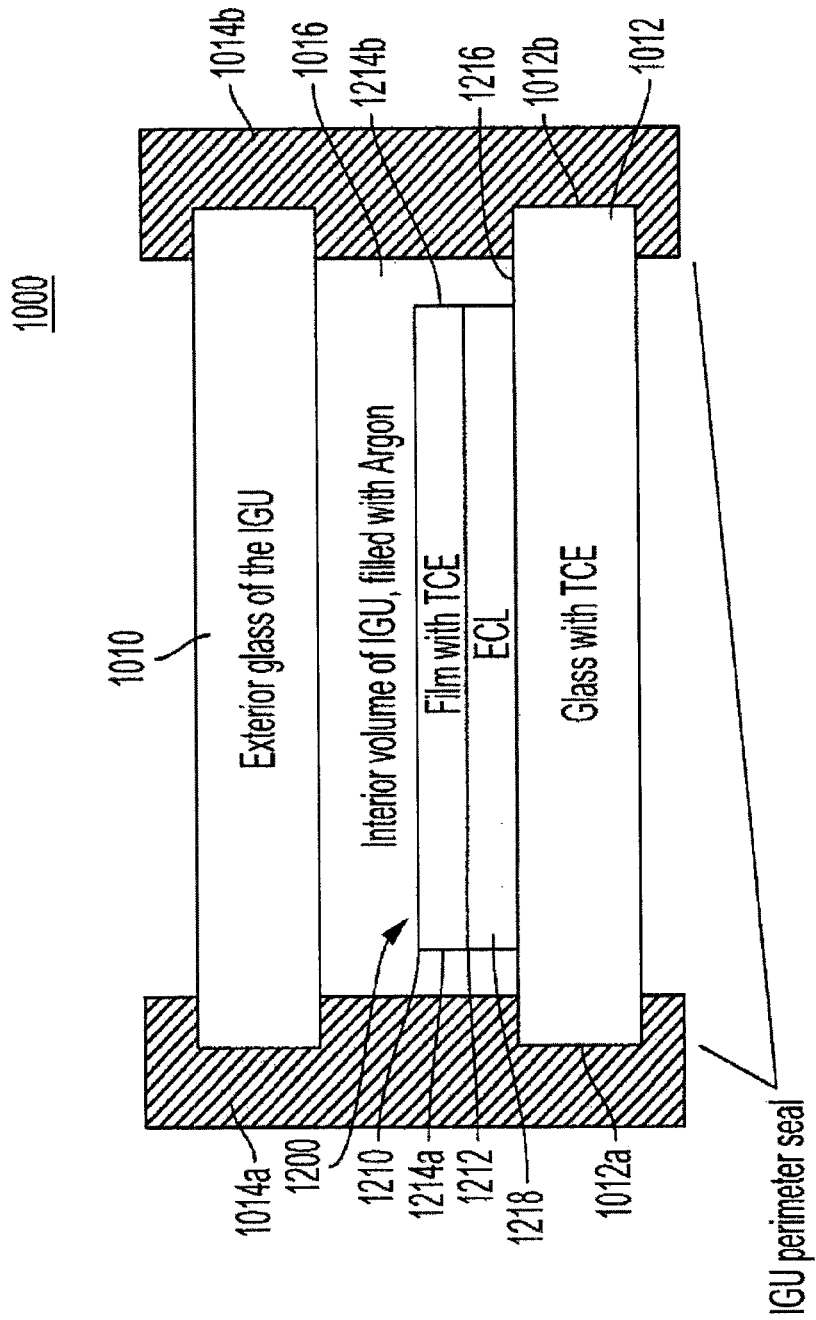
FIG. 1C illustrates exemplary viologens that can be used in practicing aspects of the present disclosure.

In case of windows, one substrate may be glass, while the one may be film-based. Such an arrangement is possible for example in an insulated glass unit (IGU) assembly, where a film-based substrate would face an inner cavity of an IGU containing an inert atmosphere. In this case, since the film-based substrate is facing an inert environment the edge and area sealing requirements may be relaxed if not completely removed. This simplifies device complexity and reduces cost. FIG. 1C and its description below provides additional details of such an IGU.

The surface conductive layer 126a/126b provides an interphase charge transfer to an interfacial layer 128a/128b (respectively) or to a solution where the variable transmittance layer does not include interfacial layers. The anodic and cathodic interface layers 128a/128b adjust the charge transfer behavior at the electrode-electrolyte interface (anodic and/or cathodic) and hence may not have high surface electronic conductivity. The interfacial layers can be formed of, for example, monomeric/polymeric organic semiconductors; inorganic semiconductors; organic dielectrics; inorganic dielectrics; MOFs; carbon materials (e.g., single-walled or multi-walled carbon nanotubes, graphene); physically or chemically adsorbed or bonded molecular layers of electrochemically active compounds (which may act like immobilized redox shuttles); or physically or chemically adsorbed or bonded molecular layers of electrochemically inert compounds that modify the solution properties at the interface (e.g. dielectric permeability, ionic strength, ionic association, etc.).

Interface layers may also be used to modify mechanical, optical or other non-electrical properties of the interface, e.g. interfacial adhesion, index matching or electrode surface wettability. During fabrication of the variable transmittance layer, one or more interfacial layers 128a/128b of electrodic stacks 123/125 may be used pre-assembled or may be partially or fully self-assembled in situ during the fabrication.

Regardless of the type of the EC device, the EC layer 121 can include one or more of light absorbing compounds. The EC layer 121 can further include one or more of auxiliary compounds, modifiers, matrix, solvent, supporting electrolyte, polymer additive(s), and additional components.

As explained above, an electrochromic device can be asymmetrical in that the opposing substrates are made from different materials. For example, one optically transparent substrate can be a glass while an opposing optically transparent substrate can comprise a flexible materials such as a polymer, e.g., a PET film. Alternatively, the EC device can include optically transparent substrates made from two different types of glass, two different thickness, two different chemical compositions and/or differing type of OTEs on the substrates if both have an OTE. In addition to certain electrooptic performance advantages, such a device structure has advantages for integration into window assemblies such as insulated glass units (IGUs).

In general, an insulated glass unit includes a first glass substrate and a second glass substrate which define a chamber having a volume therebetween. The chamber can include an inert atmosphere and the chamber can also include part of, or all of, one or more electrochromic devices. Such a configuration can allow one or more edges of the electrochromic device to be exposed to an inert atmosphere and/or where at least one of the first glass substrate or the second glass substrate of the IGU is not in electrical communication with the electrochromic device.

FIG. 1C illustrates a cross-section of an IGU according to an aspect of the present disclosure. As shown in the figure, two opposing substrates (e.g., first glass substrate 1010 and second glass substrate 1012) are spaced apart and sealed at edges thereof with sealing elements 1014a and 1014b to form an interior chamber (1016) having a volume. The opposing substrates (1010 and 1012) are optically transparent and can be made of the same material or different materials or different thicknesses including, a glass, plastic or any of the other substrates suitable for an EC device. The sealing elements can be formed using methods and materials common in the window industry. Advantageously, interior chamber 1016 can contain an inert atmosphere. An inert atmosphere as used herein is an atmosphere including substantially an inert gas, e.g., nitrogen, argon, etc. or combinations thereof. While FIG. 1C illustrates an IGU with two substrates, e.g., two glass panes, additional substrates can be included in the structure such as three or more glass panes. For example, there can be an assembly with three or more glass panes, each spaced apart, e.g., the third substrate can be spaced apart from the second and defining a second volume with an inert atmosphere.

In an aspect of the present disclosure, one or more EC devices can be formed, in part or in whole, within the interior of an IGU such that the EC device is exposed to, and thus protected by, an inert atmosphere of an IGU having an inert atmosphere. As illustrated in the example of FIG. 1C, the IGU further includes an EC device. In this embodiment, the EC device is formed with a substrate that forms the IGU. In particular EC device 1200 includes a first optically transparent substrate (1210) with a first optically transparent electrode (1212) disposed thereon a second substrate (1012) with a second optically transparent electrode disposed thereon (1216) and an electrochromic composition (1218), e.g., an EC layer, disposed between the first and the second substrates.

Advantageously, since the EC device 1200 is formed in part within the interior chamber of the IGU, at least the first optically transparent substrate (1210) of the device has edges (1214a and 1214b) exposed to the inert atmosphere. Since the interior atmosphere of the IGU is chemically inert it is therefore not necessary to form a seal around the edge of the EC composition so long as the EC composition is not mobile. Alternatively, the edge of the EC composition can be sealed, but the oxygen and moisture barrier requirements for such a seal would be drastically lower as compared to those of an assembly that is exposed to an oxygen atmosphere. In addition, since the second optically transparent substrate (1218) of the device is not part of the structure of the IGU, it can have properties that are not required for a window and can comprise a form and composition of a flexible film, etc.

In the example illustrated in FIG. 1C, the second optically transparent substrate (1012) of the EC device has a second edge that is not exposed to the inert atmosphere (1012a, 1012b) but instead sealed with sealing element 1014a and 1041b respectively. While FIG. 1C illustrates an EC device formed in part with an exterior substrate of the IGU, the EC device can be formed with components within the interior chamber (1016), such as, for example, EC device 1200 which substitutes the exterior substrate of the IGU (1012) for a second optically transparent substrate having an OTE thereon but within the interior chamber (1016) with edges exposed to the inert atmosphere, e.g., an additional substrate within the chamber to form the EC device. In such a configuration, the exterior glass panes of an IGU do not form part of an EC device and thus pane does not participate in the EC functionality, while other panes may contain EC devices.

In addition, more than one EC device can be included in the interior chamber of an IGU. Such multiple devices can operate independently, meaning that their optical state may be varied individually. One reason to operate multiple EC devices independently is to achieve greater dynamic range of tinting. For example, if two EC devices individually have minimum VLT of 10%, then the effective minimum VLT with both devices having their minimum VLT state would be 1%. Another reason to operate multiple EC devices independently is to have them tuned to different colors, and therefore change the visual appearance of the window on demand.

The EC devices formed with IGU further include components to operate the EC device such as a control system or controller electrically connected to the first and second electrodes to apply an input signal to the EC composition.

Figure 2:
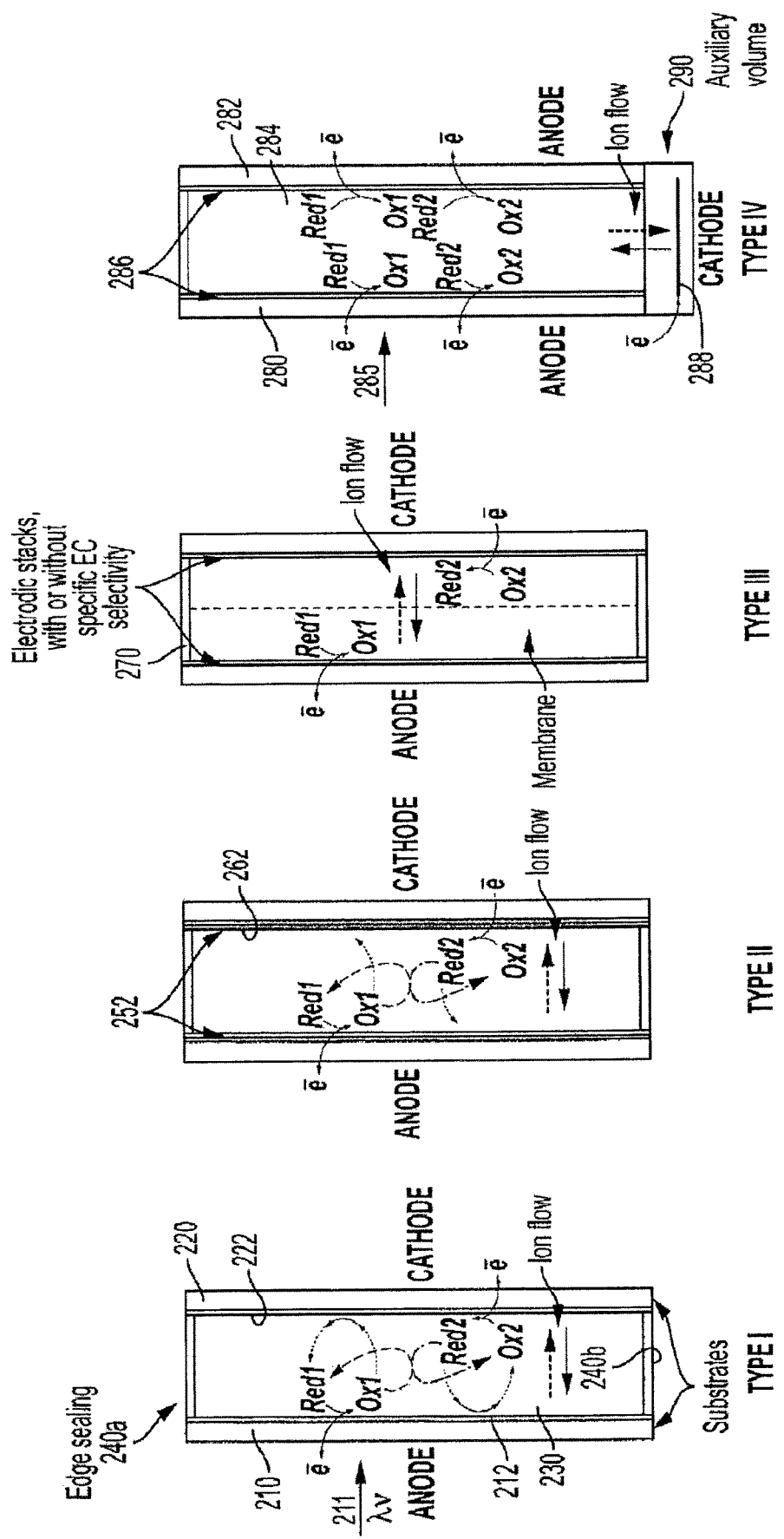
FIG. 2 illustrates designs for several electrochromic devices according to aspects of the present disclosure.

FIG. 2 illustrates several device configurations according to certain implementations of the present disclosure. The devices include a cathode, an anode, and an electrochromic composition in various configurations. For the devices illustrated in FIG. 2, the electrochromic composition is disposed between and in contact with the cathode and the anode and configured to change light transmission from one state to another state (e.g., change visible, infrared light transmission and/or UV light transmission from a high state to a low state transmission) in response to an input signal between the cathode and the anode.

For example and as shown in FIG. 2, a Type I device includes a first substrate (210) having a first electrode (212), e.g., an anode, a second substrate (220) having a second electrode (222), e.g. a cathode, and an electrochromic composition (230) disposed between the first and the second substrates and edge seals, which in this configuration are oppositely configured (240a, 240b). Such edge seals protect the electrochromic composition and can prevent leaking thereof from between the substrates. The first and second electrodes can include interfacial layers. For this example, the electrodes and optional interfacial layers do not have electrochromic selectivity. The first optically transparent substrate (210) and the second optically transparent substrate (220) and the electrochromic composition therebetween (230) define an optical path for light transmittance (211).

As shown for this example, a Type I device is a planar thin-layer cell with an isotropic EC layer sandwiched between two oppositely biased, optically transparent electrodes (anode, cathode). In such an EC device, the diffusional fluxes of the species that are formed on the opposite electrodes have non-zero projections in the normal direction relative to the electrodes. Because the anodic and cathodic reactions occur on the electrodes that are separated only by an EC layer, the ion transfer distances are of order of the EC layer thickness. If species that were formed on the positive biased electrode reach the negative biased one (and vice versa) and their electrochemical behavior is reversible within the operational range of potentials, it is readily converted back to its precursor due to very high reverse overpotential maintained and the back flux of the precursor appears. Due to the very high reverse reaction rates on the counter electrodes, the concentrations of species that were produced in the complementary reaction chain are close to zero (reagent depletion) and highest concentration gradients (and hence the preferred direction of the diffusion mass-transfer) appear in the direction to the so-called consuming boundary, i.e. the counter electrode. As the cell is planar, this is the normal direction relatively to the electrode. It means that the lateral travel of an electrochemically generated solute is in most cases negligible in comparison to the linear size of a variable transparency layer.

So, an EC device of such a construction usually does not allow the full electrochemical conversion of reagents to products. In other words, a Type I EC device is monostable and consumes considerable current in every state except at open-circuit conditions. One additional peculiarity is that two species, which are the members of the anodic and cathodic reaction sequences may react within the EC layer with formation of their precursors (due to the reversibility of all chemical or electrochemical processes), causing chemical self-discharge. Thus, if such an EC device is left open-chained after biasing, it will likely self-discharge in a relatively short period of time. However, the self-discharge processes are only ones that cause normally directed diffusional mass-transfer at open-circuit state (relative to the inner electrode surface), so the lateral transfer may contribute significantly at open-circuit state if the rates of self-discharge processes are low. Another feature of a Type I EC device is that if at least two zones (near the same electrode) of different interfacial ratios of reagents and products of electrochemical reactions are present the potentials of the same electrode at these zones will differ what will cause the electric current through this electrode and will tend to align the differences through the electrochemical reactions.

For a monostable EC device the rates of consumption of light-absorbing species are lower than the rates of their formation. Otherwise, the quasi-stationary concentrations of the light-absorbing species are negligible over the whole EC layer and no transmittance change occurs despite the current still being consumed. Thus, for a Type I EC device, only the mode of operation that is fully transparent at an off state is viable due to the difficulty of obtaining full electrolysis of electrochemically active reagents.

Therefore, for a Type I EC device some preferred characteristics for light-absorbing compounds may be present: if an EC device uses more than one light-absorbing compound and at least one OTE operates in the reagent mass-transfer limiting mode, the diffusion coefficients of electrochemically active precursors reacting on that electrode are to be matched to get the identical distributions of light-absorbing compounds concentrations at transients. If both electrodes operate in reagent mass-transfer limiting mode, all the precursors are to be matched in terms of diffusion coefficients. Otherwise, due to the different current distributions on anode and cathode (due to the diffusional control of the electrodic processes and Ohmic drops on surface conductors), color deviations may arise at transients and/or at intermediate levels of tint (as has been further explained elsewhere herein). As discussed elsewhere herein, chemical modifications of the cores of light-absorbing compounds and their precursors are to be used to modify the diffusion coefficients.

The effects of unequal diffusion rates of reagents described above can be mitigated or avoided by: (1) using a distributed (multi-point) connection of electrodes to the control circuitry to minimize Ohmic drops across the electrodes; and/or (2) setting both electrodes to operate at ion-transfer limiting conditions (via Frumkin effect). The latter is attained by proper adjustment of an electrochromic composition, ionic conductivity of the composition and electrochromic species concentrations. Both approaches listed above can be used for mitigating the "iris" effect. Hence, in an aspect of the present disclosure, EC devices of the present disclosure can include a control system or controller to apply an input signal to an electrochromic composition or layer, wherein the controller is electrically connected to one or more electrodes of the device in contact with the electrochromic composition or layer by distributed, multi-point electrical connections to minimize ohmic drops across the electrodes. In addition, or in the alternative, the controller can be configured to operate both electrodes at ion-transfer limiting conditions of the electrochromic composition or layer. A configuration that includes distributed, multi-point electrical connections to one or more electrodes and/or a controller configured to operate both electrodes at ion-transfer limiting conditions can be included in all EC devices of the present disclosure.

FIG. 2 further illustrates a Type II EC device, which includes a first substrate (210) having a first electrode (252), e.g., an anode, a second substrate (220) having a second electrode (262), e.g. a cathode, and an electrochromic composition (230) disposed between the first and the second substrates and in contact with the first and second electrodes (252, 262). The Type II device also includes edge seals, which in this configuration are oppositely configured (240a, 240b). In this example, one or both of the electrodes can suppress unwanted electrochemical processes in the EC composition, e.g. wherein either or both of the cathode electrode or anode electrode selectively allows substantially only a reduction or an oxidation of the specific components of the electrochromic composition. Such electrodes can have, as a surface exposed to the electrochromic composition, a semiconductor material. In such a configuration, either or both of the cathode or anode comprises a semiconductor material at an interface with the electrochromic composition.

A Type II EC device is similar to a type I EC device except unwanted processes on the electrodes are suppressed, thereby allowing to execute the full electrolysis of species in the electrochromic composition. In a Type II EC device, chemical self-discharge processes remain, so the device is still monostable. However, if the rates of self-discharge processes are negligible, it is possible to operate this type of EC device in both straight and reversal modes (fully transparent or fully darkened at off state). Thus, the device may also be considered and controlled as a bistable device (i.e. substantially zero power consumption in any state, power is consumed only to switch between states).

In a Type II EC device no significant normally directed diffusional fluxes are present if the self-discharge rates are low. Accordingly, the lateral diffusional mass-transfer distance can be considerable in comparison to the transverse linear size of the variable transmittance layer even at biased states, as opposed to the Type I EC device.

FIG. 2 further illustrates a Type III EC device, which includes a first substrate having a first electrode, e.g., an anode, a second substrate having a second electrode, e.g. a cathode, and an electrochromic composition disposed between the first and the second substrates and edge seals, which in this configuration are oppositely configured. The substrates, electrodes, electrochromic composition and edge seals can be configured as described in Type I and Type II devices above.

A Type III device of the present disclosure, however, includes a partially permeable additional element within an EC layer. For example, a Type III device can include a membrane within the EC composition, e.g., EC layer, which is selectively permeable. As shown in FIG. 2, the electrochromic device can include selectively permeable membrane (270) disposed between the cathode electrode and anode electrode.

In such a configuration, the membrane can substantially allow permeation of small ions but substantially prohibits permeation of large ions. For example, the membrane can substantially allow permeation of protons but substantially prohibits permeation of ions larger than protons. Alternatively or in combination, the membrane can substantially allow permeation only of electrochemically inert ionic species of supporting electrolytes, but to not the reactive species.

Under certain selectivity of membrane within the electrochromic composition, an electro-generated solute cannot reach the counter electrode or get in contact with chemically reactive species that form on it. Therefore, no significant self-discharge or reverse electrochemical reaction rates are present. A Type III EC device can allow full electrolysis and hence is bistable. As with a Type II EC device, the tangential diffusional mass-transfer distance is considerable in comparison to the linear size of the variable transmittance layer.

In an aspect of the present disclosure, a selectively permeable membrane can have a center portion and a peripheral portion in which the center portion has a higher permeability than the peripheral portion. Such a membrane can be fabricated by having a thicker peripheral portion or a peripheral portion made from a lower permeable material. In this way, such a membrane included in an EC layer and between electrodes of an EC device would result in an anode/EC layer/cathode variable transmittance layer (VTL) having electrical properties that are substantially different in a center of the VTL than in a periphery of the VTL.

FIG. 2 further illustrates another EC device according to aspects of the present disclosure, e.g., a Type IV EC device, which includes first optically transparent substrate 280, second optically transparent substrate 282 and an electrochromic composition 284 disposed between the first and second conductive surfaces. The first and second optically transparent substrates and the electrochromic composition define an optical path for light transmittance (285). A first electrode biased with one polarity can be place on either or both of the optically transparent substrates. For this example, an anode (286) is placed on the inner surfaces of the first and second substrates facing the EC composition 284. Since this first electrode is within the optical path defined by the substrates, the first electrode is an optically transparent electrode. In a Type IV device, however, a second electrode is located outside of the optical path defined by the optically transparent substrates between the EC composition. For this example, Type IV device includes second electrode, e.g., a cathode, (288) outside of the optical path for light transmission (285). Second electrode 288 can be located below or above the first electrode and separated from the first electrode so as to prevent a short circuit. In the example shown in FIG. 2, second electrode 288 is separated from the first electrode in a lower portion of the first and second substrates, labeled as an auxiliary volume 290, outside the optical path 285 but ionically connected to the electrochromic composition 284. By this configuration, the electrochromic composition is configured to change light transmission from one state (e.g., a high light transmission state) to another state (e.g., a low light transmission state) in response to an input signal between the first and second electrodes.

A Type IV EC device fundamentally differs from the Type I, Type II and Type III EC devices. In a Type IV EC device, the electrode can be located in an auxiliary volume and can be separated by a membrane that is permeable to ions of supporting electrolytes. The device is then bistable. Hence, one of the electrodes need not be transparent, e.g., the second electrode located outside of the optical path need not be optically transparent (i.e., transmits visible light of less than 10%). In addition, the second electrode need not have the shape of the substrate. A wide spectrum of electrodes, e.g. lithium-carbon, may, therefore, be used for the second electrode. In the example of a Type IV device, the rates of ion transfer contribute significantly to the transient processes because the anode and cathode electrodes are separated not only by the thickness of the EC layer, but by a distance of an order of a linear size of the variable transmittance layer. The only path of ion exchange between the auxiliary volume and the EC layer is the membrane that separates them. Thus, when electrochemical processes are running on the electrode(s) of the variable transparency layer the charge compensating ions propagate in lateral direction only from the conjunction and with the finite velocity, so the rates of electrochemical reactions are higher closer to the conjunction. Therefore, transient processes in such a device are accompanied by transmission gradients over the variable transmittance layer. Varying the shape of the conjunction allows to obtain the required look of the transients (e.g. from a top to a bottom of the device).

As explained above, the electrochromic composition of an EC device is configured to change light transmission from one state (e.g., a high light transmission state) to another state (e.g., a low light transmission state) in response to an input signal, such as from a control system or controller. One or more of the electrodes can be electrically connected to such a controller by use of one or more bus bars.

It may be advantageous in certain embodiments to allow bus bars to extend over the edge of a substrate surface having an electrically conductive surface (e.g., an OTE) and optionally to continue, at least partially, on the opposite side of the substrate. An electrical connection can then be made to the back side of the substrate to electrically connect a controller to the electrode. The advantages of such a construction are in simplified manufacturing, improved device robustness and simplified, convenient electrical connections. Hence, an aspect of the present disclosure includes bus bars that electrically connect an OTE on a substrate and continue over an edge of the substrate to an opposite side of the substrate. Such a configuration can include an optically transparent substrate having a first and a second major surface with an edge therebetween, wherein one major surface of the substrate, e.g., the first major surface, includes an optically transparent electrode and a bus bar, e.g., an electrically conductive strip, in direct contact with the optically transparent electrode and disposed over the edge and on the second surface of the substrate.

Figure 3:
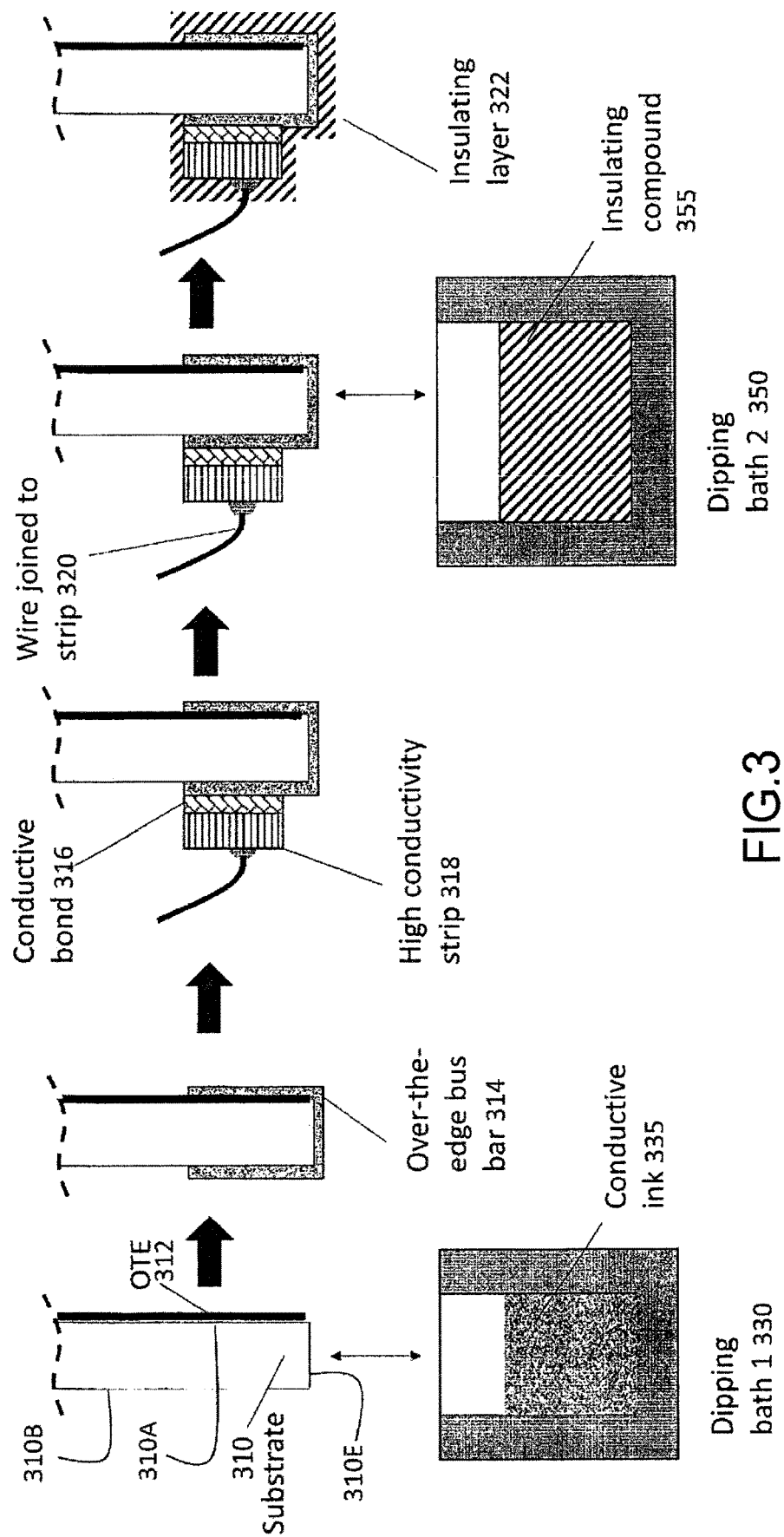
FIG. 3 illustrates a process for providing bus bars over an edge of a substrate which provide electrical contacts to electrodes of an electrochromic device in accordance with an embodiment of the present disclosure.

Various configurations of bus bars are possible. FIG. 3 depicts an example of an over the edge bus bar 314 on an optically transparent substrate (310) (e.g., glass). Substrate 310 has a first major surface 310A with an optically transparent and electrically conductive film thereon (312) (e.g., an OTE) and a second major surface (e.g., an opposite or back surface) (310B) and an edge between the first and second major surfaces (310E). One way to have a bus bar extend to the second major surface 310B of the substrate 310 is to use a flexible conductive tape with a conductive adhesive that folds over the edge 310E of substrate 310, attaching both to the functional side 310B on which OTE 312 is present on one side and to non-functional side 310A of the substrate 310.

Another way to fabricate an over-the-edge bus bar is to dip the edge 310E of the substrate 310 into a bath 330 containing conductive ink 335. The ink 335 wets the edge 310E and creates an electrically conductive strip on the functional surface 310A directly on the OTE 312 and the non-functional 310B surface of the substrate 310, as well as covering the edge 310E of the substrate 310 and thereby electrically connecting the OTE on the functional 310A and non-functional 310B surfaces of the substrate 310. The ink 335 typically has to be dried and/or fired. An example of such ink is CN33-805 Ag compound made by Ferro Corporation which is fired at about 500° C.

After the bus bar 314 is extended over the edge 310E, a portion of bar 314 on the non-OTE side 310B of the substrate 310 may be used for an electrical connection. One option (not illustrated) is to solder multiple wires to multiple locations along the perimeter of bus bar 314 on the back surface 310B of the substrate 310. Another option is to attach a single electrically conductive element such as a highly electrically conductive (e.g. copper) strip 318 to substantially a whole length of the bus bar 314 along the perimeter. The high conductivity of such a strip 318 distributes electrical potential with negligible losses around the perimeter. Therefore, a reduced number of external wire connections would be sufficient to create a device with acceptable quality of electrical potential distribution, and preferably only one wire connection to an electrode would suffice. The reduced number of electrical connections results in reduced manufacturing cost, increased reliability and simplified handling.

The high conductivity of strip 318 is in comparison with conductivity of the over-the-edge bus bar 314 and is accomplished by the thickness of the strip 318 and the intrinsic, high electrical conductivity of the material selected for strip 318. In order to achieve high conductivity and minimize ohmic losses, the thickness of the strip 318 can be higher than that of thickness of an EC composition or layer disposed between electrodes or substrates in a particular EC device. In such a case, it is especially advantageous to have electrical access to the back side of the assembly, because there would be limited available space between the substrates. Hence, in an aspect of the present disclosure, an electrochromic device can include an optically transparent substrate having an over-the-edge bus bar. Such a device can include another optically transparent substrate (with or without a bus bar) and an electrochromic layer between the substrates wherein the electrochromic layer has a thickness and the second conductive element has a thickness that is greater than the thickness of the electrochromic layer.

In some applications, an EC composition or layer disposed between electrodes or substrates in a particular EC device can have a thickness of greater than about 50 microns, e.g., greater than about 100, 150, 200, 250, 300, 500, 700 microns or even greater than about 1 mm, e.g., greater than about 2 mm, 3 mm, 4 mm, etc. and values therebetween. In other embodiments, the EC composition or layer can have a thickness of no more than about 10 mm, or less than about 8 mm and less than 5 mm. The second electrically conductive element can have a thickness greater than that of the EC composition or layer disposed between the electrodes or substrates in the particular EC device.

The attachment between strip 318 and bus bar 314 has an electrical contact between the conductive strip 318 and the bus bar 314, for example by using electrically conductive tape 316.

Alternatively, the strip 318 can be attached to the back side 310B of the substrate 310 before (not illustrated) forming the over-the-edge bus bar 314. In this case, the strip 318 is attached to the substrate 310 using an appropriate bonding adhesive or other way to bond a conductive strip to a substrate. Then the substrate undergoes the same dipping/firing sequence as in the previous sequence, and as a result an electrically conductive strip from the back side 310B to the front 310A is formed, together with the low resistance distribution pathway in the form of the back side strip.

Once the over-the-edge bus bar 314 is formed (either with an additional high conductivity strip or without) it is desirable to insulate the bus bar to protect against corrosion and for improved safety of an EC device. Insulating a bus bar can be achieved by dipping the edge 310E of the substrate into a bath 350 that contains a solution of insulating material 355 to form a coating of the insulating material around the bus bar and any highly conductive strip attached thereto. After dipping to an appropriate depth in the bath, the coating may have to be cured by means of chemical treatment or drying or UV exposure or temperature treatment to form an insulation layer 322. Such insulation may be applied over the solder joints if these are formed before the coating. Alternatively, solder joints may be insulated in a separate step by covering them by an appropriate insulating compound.

Figure 4:
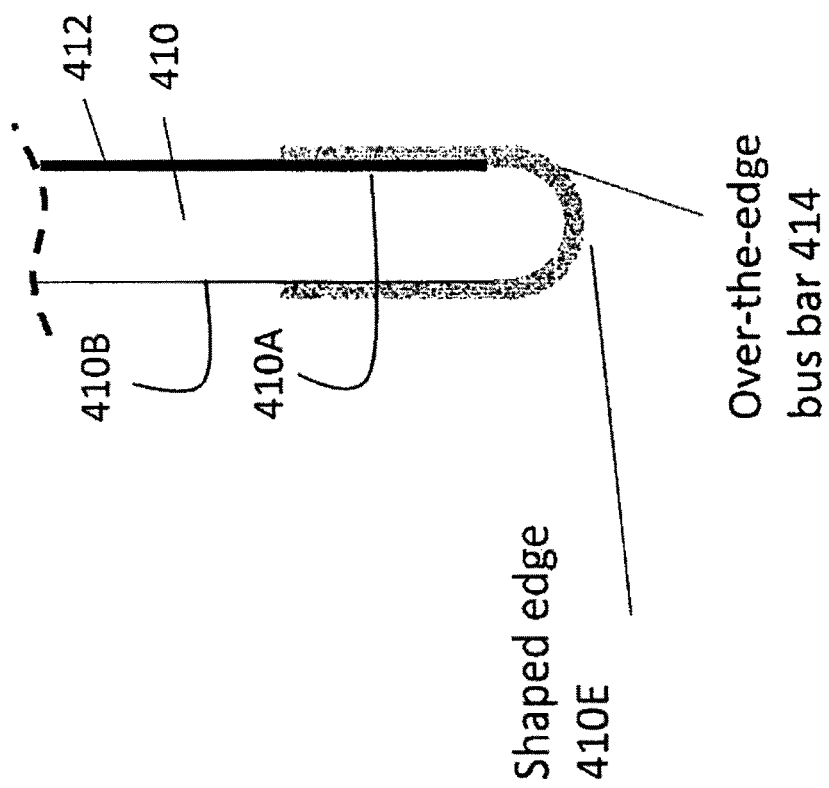
FIG. 4 illustrates an alternate example of an electrode having a bus bar for an electrochromic device in accordance with an embodiment of the present disclosure.

FIG. 4 depicts an alternate example of a bus bar. Depending on the particular application for which the EC device is used, proper shaping of an edge of a substrate, e.g., a glass edge, can be advantageous to minimize mechanical stress, prevent fracture formation and ensure handling safety. Additionally, if the over-the-edge bus bars are added to the assembly, the edge shape of the substrate is preferably smooth, without sharp corners and discontinuities that could otherwise compromise electrical conductivity of a bus bar over the edge of the substrate. The edge of the substrate is preferably shaped to avoid corners. Such shaping of the edge is common in the glass industry and is commonly called "edging". The resultant edge profile may be rounded or elliptical or any other shape that avoids a sharp transition from one major surface of the substrate to another major surface of the substrate.

Such shaping of the edge is also beneficial for subsequent edge sealing of the complete assembly. The sealing compounds have superior bonding to smooth, rounded surfaces, as compared to sharp untreated edges. A similar process used for obtaining the bus bars 314 in FIG. 3 can also be used to obtain a bus bar on a smooth, rounded shaped edge. As an example, FIG. 4 illustrates an over the edge bus bar 414 on optically transparent substrate 410 having a first major surface 410A with an optically transparent and electrically conductive film thereon (412) (e.g., an OTE) and a second major surface (e.g., an opposite or back surface) (410B) and an edge between the first and second major surfaces (410E) in which edge 410E has a smooth, rounded shaped, which can be accomplished through edging. The bus bars described above can be included with any of the electrochromic devices of the present disclosure.

Electrochromic devices of the present disclosure can include a sealing system to minimize adverse degradation of the device. The components of an electrochemical composition or layer can be sensitive to various factors that can affect its operation detrimentally. A variety of barriers can be implemented to reduce or eliminate such adverse effects. The barriers that are generally around the perimeter of the assembly are referred to as "edge seals". Such edge seals prevent ingress of adverse agents through the edge as well contain an EC composition or layer within a predetermined volume. Another type of possible barrier is a protective layer located on a plane of the assembly. Such barrier layers protect against factors acting in the direction generally perpendicular to the EC device plane. There are several functions that are performed by the barriers, and there may be multiple barriers that perform different or redundant functions.

In addition, electrochromic devices can include sealing systems that minimize detrimental effects to a seal by employing a passivation layer disposed between the electrode and the sealing element. The configuration can be assembled such that the passivation layer directly contacts the electrode, the sealing element and the electrochromic composition. An example of a seal arrangement according to such an embodiment is illustrated in FIG. 5A. In this figure, a sealing element 520 (e.g., a primary edge) is disposed between first optically transparent substrate 510a with first electrode 512a on a surface thereon (e.g., an OTE) and a second optically transparent substrate 510b. For this example, second optically transparent substrate 510b has a second electrode (e.g., an OTE) (512b) thereon. Both first and second substrates can be an optically transparent glass. The seal arrangement for this example also includes bus bars 514a and 514b directly on and in electrical contact with the first and second electrodes 512a and 512b, respectively, and sealing element 520 contacts the bus bars 514a, 514b.

The sealing element 520 is a barrier that contains electrochromic composition (ECC) 521, preventing its spread or leakage outside of the designated volume defined, at least in part, by the first and second substrates. Since this seal is in direct contact with ECC 521, it has to be chemically inert relative to ECC 521, otherwise the reactions between ECC 521 and the seal 520 will compromised the seal and/or poison the ECC 521—both factors being detrimental for device operation and long-term stability. As shown for this example, this seal also protects bus bars 514a and 514b from contact with ECC.

Materials suitable to be used a sealing element, such as a primary edge seal, include, without limitation, elastomers, such as fluoropolymers (e.g., Viton by DuPont, various products based on PCTFE, PTFE, PFA and other fluoropolymers), silicones (e.g., CV-1142 by Nusil), acrylic compounds (e.g., LP4115 by Delo Industrial Adhesives), etc., and/or epoxies (e.g., LP655 by Delo Industrial Adhesives or Loctite 1C by Henkel) and/or other compounds. Additionally, thermoplastics may be employed for primary edge seals. For example, 3M's products Hot Melt 3789, Hot Melt 3779 or 3797 may be employed.

The sealing element depicted in FIG. 5A simultaneously makes contact with the first electrode (512a) and electrochromic composition (521) at a certain location. Therefore, there is a line along the perimeter where there is a triple contact of all three substances—seal, OTE and ECC—identified in FIG. 5A as triple contact zone 530. Such a triple contact zone can be undesirable due to potential corrosion effects, especially in the presence of electric current and electrochemical reactions. One way to avoid potential undesired corrosion is to eliminate a triple contact among a seal, OTE and ECC (530).

In an aspect of the present disclosure, a passivation layer can be disposed on the first and/or second electrodes and between the sealing element. The passivation layer can be configured to directly contact the electrode(s), the sealing element and the electrochromic composition and thus prevent a triple contact among the seal, electrode and electrochromic composition.

Figure 5B:
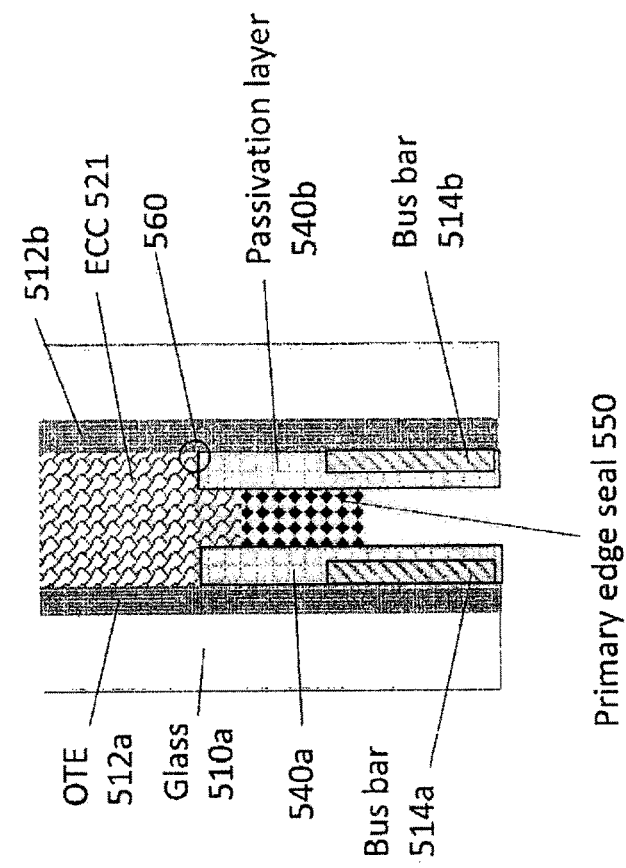
FIG. 5B illustrates an alternative seal arrangement for sealing the electrochromic composition (ECC) in an electrochromic device in accordance with an embodiment of the present disclosure.
Figure 5A:
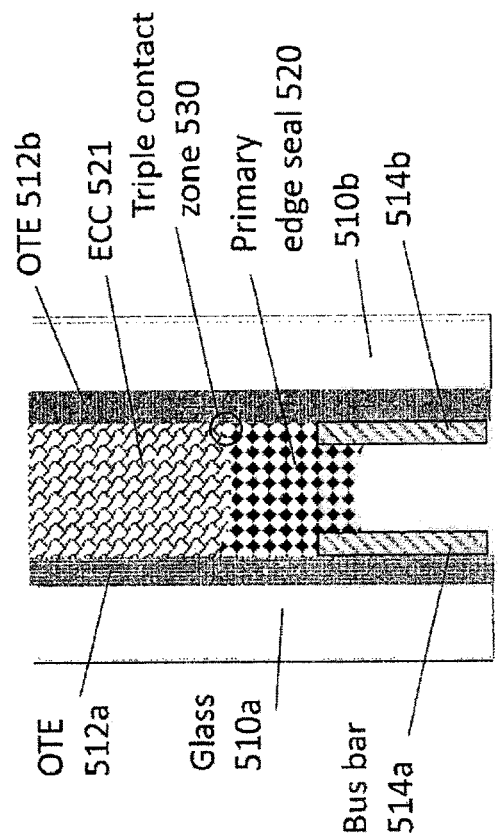
FIG. 5A illustrates a seal arrangement for sealing electrochromic composition (ECC) in an electrochromic device in accordance with an embodiment of the present disclosure.

FIG. 5B illustrates a passivation layer that can prevent a sealing element from simultaneously contacting at any one location an electrode and electrochromic layer. In FIG. 5B, a sealing element 550 (e.g., a primary edge) is disposed between first optically transparent substrate 510a with first electrode 512a on a surface thereon (e.g., an OTE) and a second optically transparent substrate 510b. For this example, second optically transparent substrate 510b has a second electrode (e.g., an OTE) (512b) thereon. In addition, first passivation layer 540a is disposed between the first electrode (512a) and the sealing element (550) and second passivation 540b is disposed between the second electrode (512b) and the sealing element (550). In such a configuration, first passivation layer (540a) directly contacts the first electrode (512a), the sealing element (550) and the electrochromic composition (521) and, as shown in the example of FIG. 5B, second passivation layer (540b) directly contacts second electrode (512b), the sealing element (550) and the electrochromic composition (521). The passivation layers shown in FIG. 5B thus prevent the sealing element (550) from simultaneously contacting at any one location an electrode (512a or 512b) and the electrochromic composition (521).

Instead of the seal forming a triple contact among the seal, electrode(s) and electrochromic composition, the passivation layer can form a triple contact, i.e., the passivation layer simultaneously contacts electrode(s) and electrochromic layer (560). However, since the passivation layer does not carry out the function of the electrodes in an EC device, the passivation layer can be made of materials different from the electrodes and preferably materials that are more resistant to corrosion or that can cause undesirable reactions. Therefore, the passivation layer should be inert relative to the possibility of corrosion in triple contact zone (560). For example, a passivation layer can comprise an inorganic layer such as one based on silicon oxide, e.g., $SiO_2$.

Further, as shown in FIG. 5B, passivation layers 540a and 540b can be extended over bus bars 514a and 514b, respectively, e.g., the bus bars can comprise electrically conductive strips in direct and electrical contact with the first and second electrodes, respectively. A passivation layer does not necessarily need to extend over a bus bar. However, an advantage of extending a passivation layer over a bus bar is to further insulate a bus bars. Such a structure can be achieved by adding, such as by deposition, a passivation layer after a bus bar is formed in a manufacturing sequence.

The passivation layers can be deposited along the perimeter of the substrate as depicted in FIG. 5B. The passivation layers 540a and 540b can be formed at the edge of the substrate and extend away from the edge towards the center of the substrate along the surface of the electrodes at a distance further than a location of the sealing element.

Another function of a sealing element such as an edge seal is to provide mechanical connection between the substrates. If this function is performed by an additional (secondary) seal different from the primary one, then such secondary seal provides strain relief minimizing mechanical stresses on the primary seal. Such arrangement results in increased operational reliability of the primary seal, and, consequently, of an EC device overall. The edge seal that bears the mechanical function is desirably sufficiently robust and flexible to withstand various mechanical loads such as: sheer loads resulting from potential asymmetric expansion/contraction of substrates with temperature; stress or strain in cross-plain direction resulting from installation and during operation; shock and vibe during transportation and installation or integration with other system elements; and any other mechanical stress resulting from operation of the device. Hence, electrochromic devices of the present disclosure can include a secondary seal between the first optically transparent substrate and the second optically transparent substrate and/or around at least part of a perimeter of the first and second substrates. Such a secondary seal would not contact the electrochromic composition or layer between the substrates of the device.

Ingress of substances into the device volume containing the ECC could result in degradation of the device due to the irreversible chemical or electrochemical side processes. Operation at elevated humidity and/or temperature promotes such a degradation. The primary edge seal may not be able to protect the ECC from corrosive substances by itself. Therefore, the device is desirably protected against environmental gases and vapors through the use of additional, secondary seals.

One example of secondary seal material is polysulfide glass sealant, for example products N400G15 or N4005GL from CR Laurence.

Water may be hazardous to the operation of the device. One function of the secondary material is to eliminate the possibility of water penetration into the device. Ingress of water (defined as Water Vapor Transmission Rate, WVTR) is typically measured in the units of gram/meter-square/day (i.e., $g/m^2/d$). Typically, OLEDs require WVTR in the range of $10^{-6}$-$10^{-5}$ $g/m^2/d$. OPV's requirements are in the range of $10^{-4}$-$10^{-3}$ $g/m^2/d$. Organic ECC's requirement is in between these ranges, approximately $10^{-5}$-$10^{-4}$ $g/m^2/d$.

Similarly to sensitivity to water vapor, ECCs are sensitive to oxygen. Typically, oxygen transmission rates, OTR, of barriers are well correlated with WVTR. In most cases a barrier with acceptable WVTR will also have an acceptable OTR.

In addition to chemistry variations, seal materials differ by the type of manufacturing approach. One way to create a seal in place is to deposit a bead of sealing material along the perimeter of the device, such bead bridging the substrates and creating a barrier for in-plane ingress of undesired substances. The bead is then further cured as a result of chemical reaction with a specific curing agent, moisture, temperature, exposure to UV or some combination of these factors.

An alternative way to create a sealing element is to form a standalone gasket separately from the EC device and then to add it to the EC device. Such a gasket can be for example a cord made from a suitable material such as Viton. Such a cord will be placed around the perimeter of the assembled EC device and secured in place with an appropriate adhesive or it may be self-adhesive. The choice between formed-in-place sealing element and standalone sealing element by way of a gasket is driven by the geometrical factors and manufacturability considerations. From the geometrical point of view, one factor is the thickness of EC device and, consequently, the width of the gap that needs to be sealed. Smaller gaps, for example, 1 mm or less, are more suitable to be sealed by a bead that is formed in place. For larger gaps the standalone gasket approach may be preferred.

In addition to protecting an EC device of the present disclosure from edge ingress of harmful substances, additional care needs to be taken to protect EC device from factors that act in cross-plane direction. A variety of barrier layers may be used to accomplish such a protection. Individual barriers may be accomplishing only function (for example, protection against oxygen penetration), or they may be efficient against multiple factors (for example, combining protections against water vapor and UV).

Oxygen and water sensitivity of EC layer has been discussed elsewhere herein in context of edge sealing. If both substrates are made of glass then there is virtually no penetration of oxygen and water vapor through such substrates, so there is no need for additional protection. However, if a substrate made from plastic, for example a PET film, then the task of cross-plane protection is real. Some polymeric substrates may possess poor barrier properties against both oxygen and water vapor, and therefore, if no additional protective actions are implemented, EC device would degrade. In this case one or more barrier layers is to be added to reduce oxygen and water vapor uptake. For instance, a gas/vapor barrier may be made of thin flexible glass. Another option are multilayer barrier coatings developed for the needs of OLED and OPV industries, for example a stack of metal oxide layers made by Vitriflex or a stack of alternating organic/inorganic layers developed by Vitex and 3M.

An EC device may be strongly affected by UV light, which may cause both deviations of chemical/electrochemical processes and photodegradation. There are multiple ways to block the UV radiation. One way to accomplish this is by using the EC device as a part of a multipane glass assembly. The exterior pane(s) of glass ensure UV filtering, so the remaining part of the spectrum that reaches EC layer does not contain UV.

An alternative way to suppress UV radiation is to use UV-blocking films that are attached to glass (or another substrate) with adhesive layers. Yet another way is to deposit UV-blocking layers onto substrate by a suitable deposition method, for example spray deposition, slot die coating, vacuum deposition, growth from solution or any other industry-standard way.

As was discussed in the section about chemical barriers, sealing elements may have dual functionality of chemical and optical barriers. For example, some of the sealing element materials from LP series made by DELO Industrial Adhesives suppress both water vapor permeation and UV radiation.

Alternatively, UV-blocking additives may be added directly to ECC, for example, cinnamates that act as effective UVB absorbers.

Alternatively, lamination layers with UV-blocking additives may be used to fuse ECC with additional glass layers. For example, Poly-vinyl Butyral, PVB, is the most common lamination interlayer in the glass industry today. UV-blocking additives are frequently a part of the PVB film composition. For example, product literature by Kuraray (a manufacturer of PVB) states: "Conventional window glass is impermeable to UV light below 320 mm PVB films between glass plies filter out further UV light. Trosifol® UV Extra Protect is a PVB film that blocks out incidental UV radiation in its entirety."

Additionally, in certain applications infrared (IR) radiation should be reduced or prevented from passing through an ECC in order to reduce the heat release caused by absorption of IR radiation by matter. Thus, in warm climates, IR radiation is preferably diverted away from entering the buildings to improve building energy efficiency. Additionally, IR radiation may worsen the operational temperature regime of an EC device, being absorbed by a deeply colored EC layer. Operation at elevated temperature may affect the electrochemical/chemical behavior and hence reduce the lifespan of the EC device, and therefore the heat release within it should be minimized.

In buildings, IR transmittance is typically regulated by specialty layers applied to glass surfaces, commonly known as low-e layers (low-e glass). Low-e coatings, when applied to outermost pane of a multi-pane glass assembly reflect NIR and long wavelength IR and minimize heat load of the building in a warm climate. The same coatings minimize the amount of IR that reaches the EC layer, and therefore, they reduce the temperature of the EC device.

An alternative to using low-e glass as an IR control mechanism is to configure an OTEs of an ECD to perform similar function. Some OTEs are made as a stack of alternating transparent conductive oxide and metal or metal alloys. Examples of such OTEs include ITO-Metal-ITO films made by Sheldahl Corp. or ITO-Silver Alloy films produced by TDK. Since such OTEs contain thin layer of metals (typically Silver or Gold) they may act as IR reflectors. Therefore, when such OTEs are used in an EC device stack, they could perform a dual function of OTE and low-e element of the assembly. Hence, in an aspect of the present disclosure, an electrochromic device can include and OTE configured to reflect, at least in part, IR radiation.

An EC device according to the present disclosure may include one or more plastic layers in a form of a film or a thicker element. Such layers may be fabricated separately and then added to the device, for example as a film unwound from a carrier reel and attached by adhesive or under heating or pressurizing or a combination of these. Alternatively, the layer may be fabricated in place by appropriate deposition and curing methods. Such a plastic layer may perform one or many barrier functions, for example combining light filtering and gas blocking functions.

Polymer interlayers in laminated glass are a common safety measure that prevents pieces of broken glass from falling/flying away. Instead, such pieces stay adhered to the interlayer. An additional benefit of the interlayer is acoustic insulation—sound waves are scattered at the glass/interlayer interface and within the interlayer itself. A gel-based EC layer possesses the features of safety function and acoustic insulation similarly to regular, non-EC interlayers. If a standard interlayer polymer, PVB or EVA, is included in a matrix of an EC gel, then the safety function is implemented readily. However, other polymers may perform well relative to safety requirements.

Defogging and anti-freezing by using OTE, use AC at frequency higher than diffusion time constant as opposed to DC to prevent electrochemistry (or DC with glass with OTE on both sides)

Assembly

A variety of processes and methods may be used to prepare the components of an device and to put them together in order to secure a robust and cost-efficient assembly. Because these devices closely resemble laminated glass (albeit with an interlayer that has a light control function), the assembly methods are similar to those used in the laminated glass industry.

Cast in Place

One way of integrating an ECC to an EC device is to dispose an EC composition into a pre-formed volume between two optically transparent substrates having electrodes thereon followed by curing the composition. The method is preferable with optically transparent substrates that are not flexible but it is not limited thereto. This method is similar to the approach used to created cast-in-place liquid lamination of glass, for example by Uvekol by Allnex (using UV-curing polymer) or Polylam by Glasslam (using thermal curing). Specifically, such an approach can include the following steps: (i) Wash both substrates to remove contamination. (ii) Optionally, treat one or both substrates to activate their surfaces. Activation in this context means improving wettability by the ECC. The activation may be achieved by plasma treatment (atmospheric or inert gas plasma), exposing a surface of the substrate or electrode thereon to corona discharge, or any other suitable means. (iii) Introduce an EC composition, including polymer forming components such as monomer(s) and initiator(s), into a pre-formed volume between two the substrates to dispose the EC composition between the substrates. (iv) Cure the EC composition in the preformed volume between the two substrates.

Figure 6A:
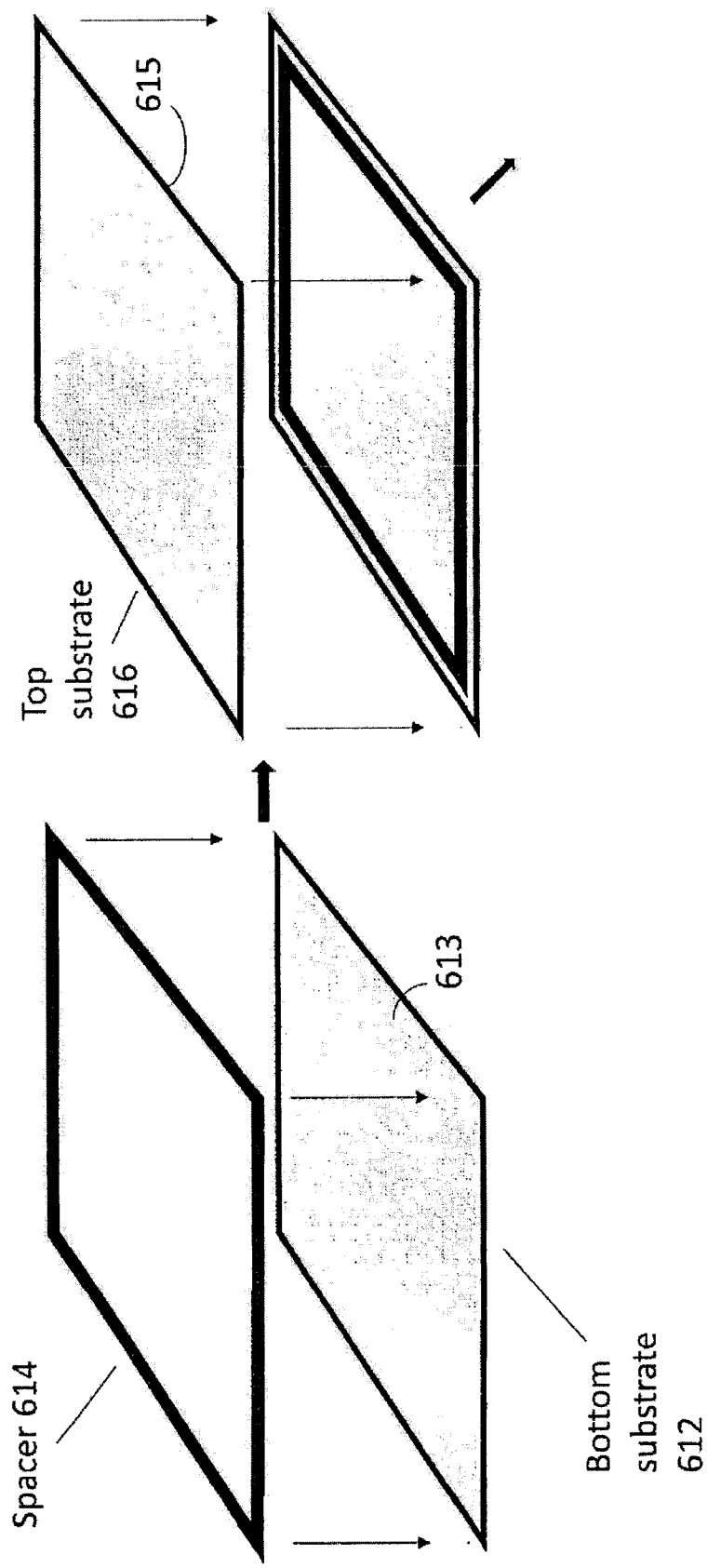
FIGS. 6A and 6B illustrate a method of assembling an EC device in accordance with an embodiment of the present disclosure.
Figure 6B:
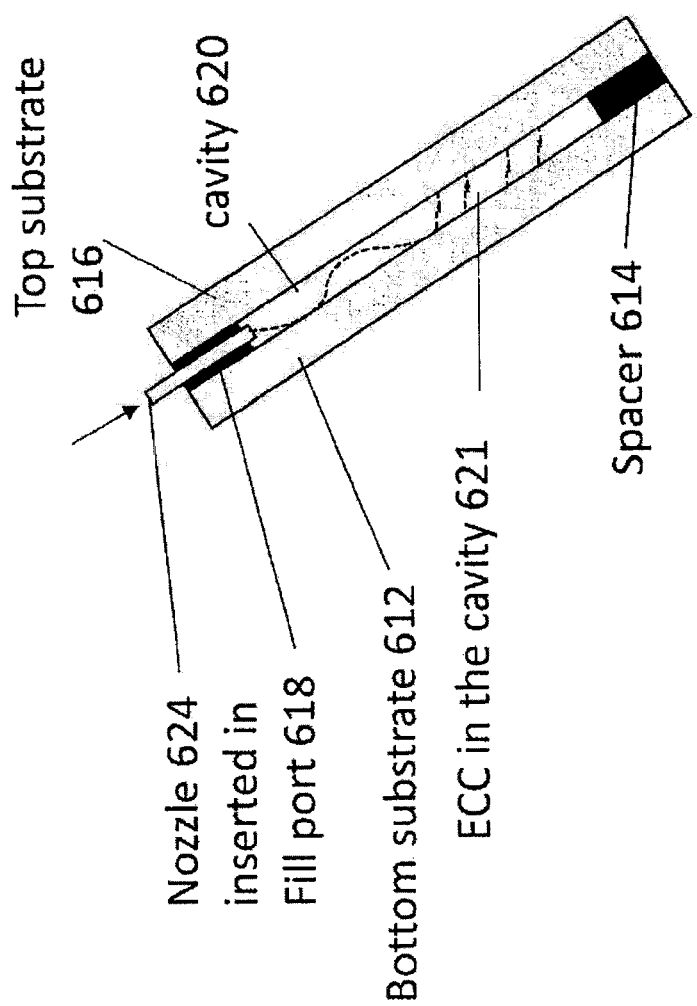

FIG. 6 illustrates a method of assembling an EC device in accordance with an embodiment of the present disclosure. In such a method, a first optically transparent substrate (612), e.g., a bottom substrate, is prepared by placing a spacer/barrier 614 substantially around the perimeter the substrate 612 on a surface 613 thereof. The first optically transparent substrate can include an OTE (not shown for illustrative convenience) on surface 613. Spacer 614 may be a suitable structure such as a gasket, which can adhere to the substrate 612 reliably to prevent leaking of an ECC applied to substrate 612. The spacer thickness will define a thickness of an EC layer formed on substrate 612. The spacer 614 may be unrolled from a roll, added as strips or as frame. The spacer 614 has a thickness typically between, for example, 0.1 and 2 mm, such as between, for example, 0.25 and 0.75 mm. Other thicknesses for the spacer 614 may be used depending on the desired thickness of an EC layer desired a particular application.

A second optically transparent substrate (616), e.g., a top substrate, is then placed onto the spacer 614 and the bottom substrate 612 and a bond is created between the top substrate 616 and the spacer 614. The second optically transparent substrate can include an OTE (not shown for illustrative convenience) on a surface of the substrate facing the first optically transparent substrate (615). When assembled, substrates 612/616 and spacer 614 define a cavity (620), in which an EC composition 621 can be disposed. For this particular EC assembly process, spacer gasket 614 should include at least one opening to be used as fill port 618. This opening will be sealed later, after introducing the EC composition. Spacer gasket 614 can further include at least one second opening (not shown) for venting out gas from the cavity which aids in minimizing and avoiding trapping of gas bubbles in the EC composition. Prior to introducing the EC composition, the cavity may be optionally purged and/or filled with an inert gas to prevent excessive exposure of the EC composition to the air.

In some embodiments, the substrates 612/616 and spacer 614 assembly is tilted at an angle of more than 0 and 90 degrees during filling of the ECC into the cavity to help with the flow of the ECC into the cavity. Specific optimal angle depends on a combination of factors including the ECC viscosity, surface wettability and convenience of part handling.

A filling nozzle 624 is then inserted in the filling port 618 and connected to an ECC supply (not shown). The cavity is then filled by dispensing the ECC into it through the nozzle 624. A variety of dispensing mechanisms that are common in the industry may be used as, for example, a Sealant Supply System by Graco. Care needs to be exercised to avoid excessive hydrostatic pressure that could lead to bulging out of the center portion of the cavity and consequently non-uniform layer thickness.

The fill port 618 and the optional vent port are then plugged to seal the ECC between the top and bottom substrates. If tilted, the assembly can then be adjusted to a horizontal position. Alternatively, the assembly can remain tilted. The EC composition in the cavity is then cured by a suitable method (e.g., time, temperature, UV exposure or a combination thereof). In this way, an electrochromic layer disposed between a first and second optically transparent substrate can be formed. The substrates can also include electrode(s), bus bar(s), passivation layer(s), etc. as described elsewhere.

One feature of the cast-in-place approach is filling of the spatial cavity formed by two substrates and the spacer. Alternatively, an ECC may be disposed on a first optically transparent substrate (with or with an OTE on a surface thereof), e.g., the ECC may be dispensed onto a single (bottom) substrate, followed by placing a second optically transparent substrate (with or with an OTE on a surface thereof) on the ECC disposed on the first substrate. As described above with reference to FIG. 6, a spacer/barrier can be placed substantially around a perimeter the first optically transparent substrate to define a thickness between the first and second substrates when assembled. Such as spacer/barrier can adhere to both the first and second substrates and prevent leaking of the ECC between the substrates when assembled. Before, after, or during the placement of the second optically transparent substrate on the ECC disposed on the first substrate, the EC composition can be cured by a suitable method (e.g., time, temperature, UV exposure or a combination thereof). In this way, an electrochromic layer disposed between a first and second optically transparent substrate can be formed. The substrates can also include electrode(s), bus bar(s), passivation layer(s), etc. as described elsewhere.

A variety of methods may be used for disposing an electrochromic composition on to a first optically transparent substrate (with or without an OTE on a surface thereof). One approach is to use a silk screen in a shape of the substrate. The ECC is delivered to the substrate through the opening of the screen. If an ECC is viscous enough and does not flow, then it will stay in place after the screen is removed and a top substrate is placed thereon.

An alternative method is to use localized dispensation such as an ink jet or a dispensing nozzle that is rastered across the area of a bottom substrate as the ECC is being dispensed.

Yet another alternative is to use a Doctor Blade or a slot-die deposition technique that is a common in the deposition industry. A stencil, for example made from stainless steel, may be used to assist with such deposition and to control the amount of ECC left on the surface.

Figure 7A:
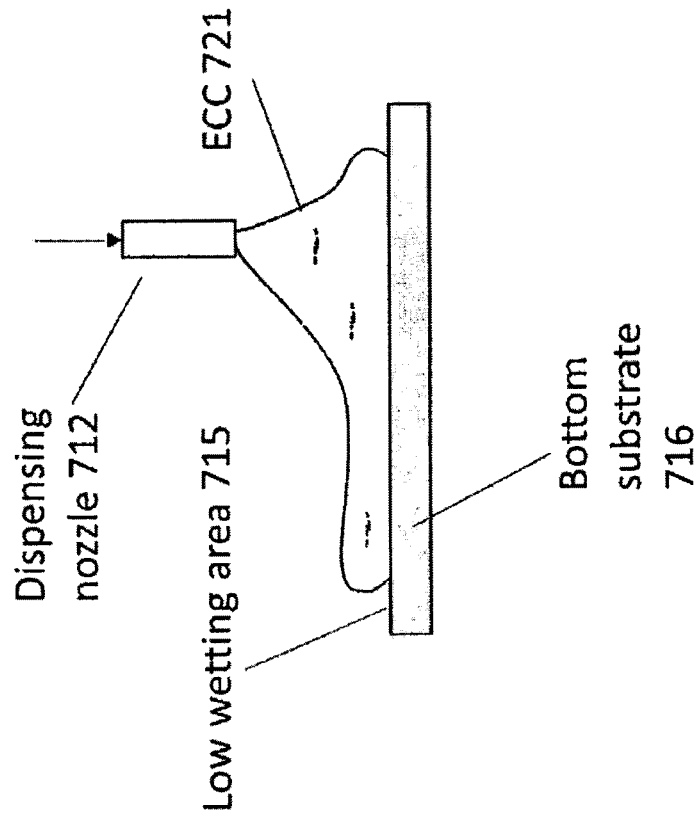
FIG. 7A illustrates a method of pouring an ECC on to a substrate in manufacturing an EC device in accordance with an embodiment of the present disclosure.

If the ECC has low viscosity and wets the lower substrate easily, then one method of deposition may be by pouring it onto the bottom substrate. FIG. 7A illustrates one method of disposing an ECC on to an optically transparent substrate for manufacturing an EC device. In this case, a metered amount of the ECC 721 is dispensed using a dispensing nozzle 712 on a first optically transparent substrate 716 (with or without a first electrode on a surface thereon), e.g., a bottom substrate. Substrate 716 can be maintained in a horizontal position. The ECC 721 flows to cover an area on the bottom substrate that is limited by a dam 714 or a barrier created by an area with reduced wettability 715.

Dam 714 can be placed substantially around a perimeter of the first optically transparent substrate and prevents leakage of the EC composition dispensed on the substrate. Such a dam may be formed similarly to the methods of spacer formation, describe in the section about the "Cast-in-place" method. Alternatively, the dam can be created in place from a liquid material that is dispensed around the perimeter and is solidified/cured in place in a separate step. The dam material may be cured just enough to work as a dam, e.g., prevent leakage of the EC composition dispensed on the substrate. It may still retain some compliance, so that when a second optically transparent substrate (with or without an OTE on a surface thereon) is placed on the dispensed ECC, the material of the dam adheres to the second substrate, e.g., a top substrate. The dam material can then be cured to form a more complete seal between the substrates.

Figure 7B:
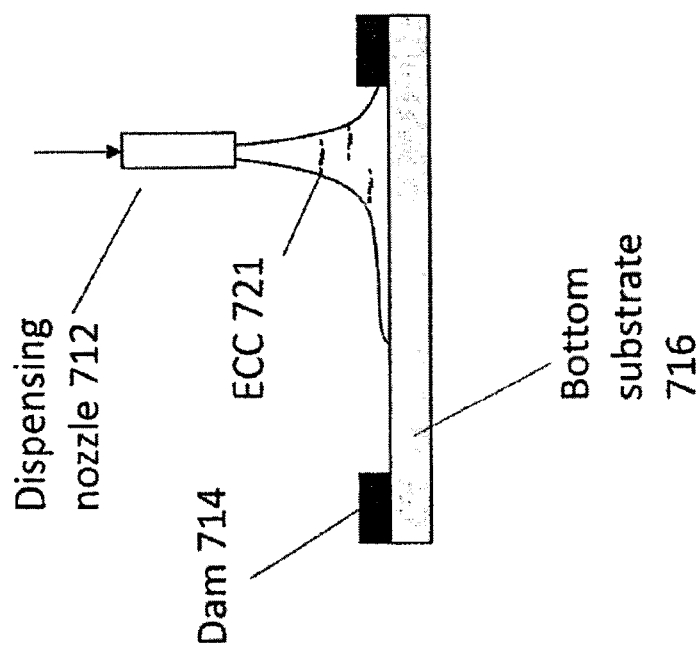
FIG. 7B illustrates an alternate method of pouring the ECC on to a substrate while manufacturing an EC device in accordance with an embodiment of the present disclosure.

An alternative method to contain dispensed ECC on the first substrate within a desired area is to modify a perimeter of the first substrate. FIG. 7B depicts such a structure. As shown, a perimeter (715) of the first substrate (716) can contain dispensed ECC (721) within a desired area. Perimeter 715 can contain dispensed ECC by being modified in a way that it is non-wettable by the ECC. In this case there is no elevated dam to contain the ECC, but rather the difference of surface energy that performs this function.

After the desired amount of ECC is dispensed, a second optically transparent substrate (with or without a first electrode on a surface thereon) can be placed on the dispended ECC to form an electrochromic composition disposed between the first and second substrates. This assembly can then be subjected to cure the ECC between the substrates. In this way, an electrochromic layer disposed between a first and second optically transparent substrate can be formed. The substrates can also include electrode(s), bus bar(s), passivation layer(s), etc. as described elsewhere.

Figure 8:
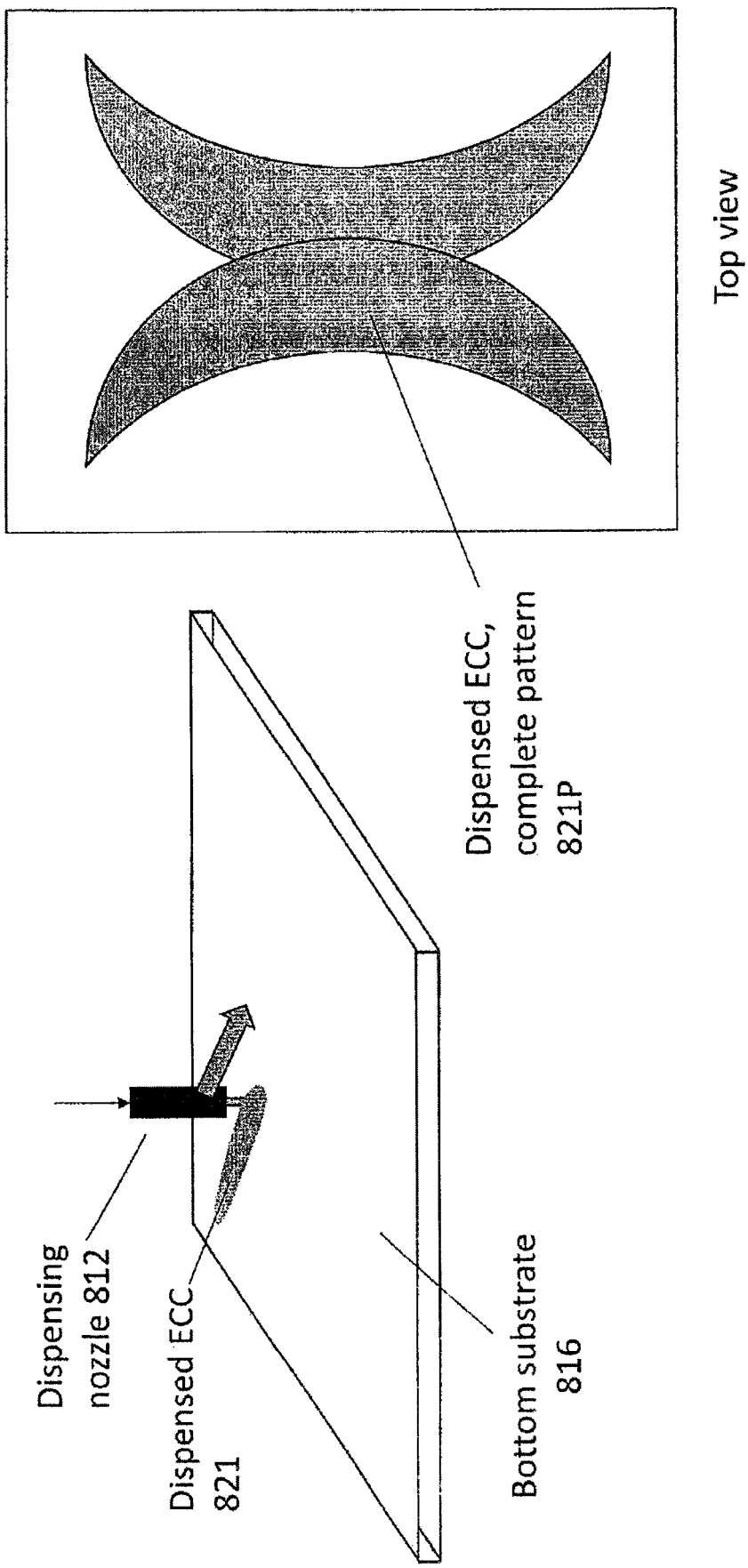
FIG. 8 illustrates a further alternate method of pouring the ECC on to a substrate while manufacturing an EC device in accordance with an embodiment of the present disclosure.

Another alternative method of forming an EC layer between optically transparent substrates includes dispensing an electrochromic composition which spreads to fill a cavity defined by a first and second optically transparent substrate, and, optionally a seal therebetween, by forcing an initially dispensed ECC on the first substrate to spread over the first substrate. In an aspect of the present disclosure, an electrochromic layer disposed between a first and second optically transparent substrates can be formed by dispensing a metered amount of an electrochromic composition having an area on the first optically transparent substrate, placing the second optically transparent substrate on the electrochromic composition and forcing the electrochromic composition to spread over the first optically transparent to form the electrochromic layer having an area that is significantly greater than the area of the dispensed electrochromic composition. For example, the EC layer can have an area that greater than an area of the dispensed EC composition by at least 5%, e.g., 10%, 15%, 20%, 25%, 30%, 35%, 40%, etc. FIG. 8 illustrates such a method. As depicted in FIG. 8, nozzle 812 is configured to dispense a metered amount of an EC composition (821) on a first optically transparent substrate 816 (which can have an OTE on the dispensed surface thereon). A dam can also be on substrate 816 (not shown). In this example, the initially dispensed ECC 821 does not cover a whole area of substrate 816. Instead, an electrochromic composition is dispensed in a controlled fashion to create a pre-calibrated shape 821P, for example, as shown depicted in the top view of FIG. 8. The dispensed shape has an area that is significantly less than an area of substrate 816. However, the thickness of this shape is higher than that of the resultant EC layer. The desired coverage and thickness of the resultant EC layer is then obtained by placing second optically transparent substrate, e.g. a top substrate (not shown) on the dispensed EC composition in a controlled manner. The weight of the top substrate, and optionally force applied by clamps (or force applied by another mechanism) to join the top and bottom substrates, as well as wetting of the dispensed EC composition and the specifics of the shape then cause the dispensed ECC to spread uniformly between the substrates, preferably filling the space and leaving no bubbles in the cavity defined by the two substrates. In this way, an electrochromic layer disposed between a first and second optically transparent substrate can be formed having an area that is significantly greater than the area of the dispensed electrochromic composition. The substrates can also include electrode(s), bus bar(s), passivation layer(s), etc. as described elsewhere.

Yet another alternative to create an EC layer is to fabricate it as a standalone preform layer, e.g., an EC preform layer. An EC preform layer can be in the form of a gel that exhibits effectively no flow under steady state at atmospheric pressure (1 atm.) and room temperature (i.e., 20° C.). Such a preformed EC layer can then be integrated with other components to form an EC device. A preformed EC layer can be produced using Roll-to-Roll (R2R) manufacturing techniques common in the plastics industry. A preform EC layer can be integrated with glass substrates in an approach similar to current industry standards of fabricating laminated glass assemblies. Laminated glass are typically fabricated by combining two pieces of glass and an interlayer as a stack. The interlayers are fabricated by extrusion or by any other suitable process. The stack is assembled from standalone components and then processed with temperature and/or pressure to create a structurally sound assembly. The interlayers commonly used in the glass industry belong to families of Poly-Vinyl Butyrals (PVB) or Ethylene-Vinyl Acetates (EVA). EC layers and EC devices of the present disclosure can be formed in similar ways using an EC preform layer.

One option to prepare an EC preform is to combine an EC composition together with a polymer typically used as a glass interlayer, for example PVB or EVA, creating a substantially homogeneous material that combines the properties of a glass interlayer and the EC composition. The preform can be prepared by extrusion or co-extrusion of a EC composition including a matrix having a polymer and the polymer typically used as a glass interlayer. The glass interlayer polymer can then become a part of the gel matrix of an EC layer. It can be the main polymer of the matrix, or can be a part of a polymeric blend comprising the matrix.

Another alternative approach to creating an EC layer is to fabricate it as a multilayer preform composite. Such a multilayered composite can be prepared by co-forming (e.g., co-extrude) an EC layer and one or more polymers, such as one or more interlayer polymers, to prepare a composite comprising the EC layer disposed on a bottom film and optionally a second film over the over the preform EC layer disposed on the bottom. Instead of homogenizing the multilayer preform during formation (e.g., extrusion), a homogenization step can be deferred to a separate processes step such as when the multilayered preform is disposed between optically transparent substrates. In this approach, the cross-section of a multilayered preform will have distinctive areas differing by function and by chemical composition depending on the layers of the preform composite. For example, there will be at least one area responsible for EC function and another area can act as more or less a traditional interlayer polymer used to laminate glass. The preform can be a multilayered structure having an EC layer with one or more polymeric layers thereon. For example, the EC layer may be located between two interlayers. A benefit of this arrangement is protection of EC layer from moisture and oxygen during shelf life and assembly operations.

The distinctive areas of a multilayered EC preform can be substantially homogenized during a lamination process, upon exposure to temperature and/or pressure. For example, if a layer of the multilayered EC preform composite is an EVA layer, then the lamination occurs at a temperature in a vacuum, but no additional pressure is exerted (there is no autoclave or mechanical press involved).

One distinctive feature of a multilayered EC preform composite is the availability of oxygen and water protection by exterior areas (e.g., polymeric layers) of the multilayered EC preform which can aid during storage and assembly operation, followed by homogenization during the lamination process.

R2R deposition onto flexible substrate with OTE. Another approach to manufacture the EC device is to deposit an EC layer in a continuous fashion onto a flexible substrate that has OTE facing the deposited EC layer. Such deposition may be performed using R2R equipment commonly used in the plastic film industry. The deposition may be performed by using a slot die extruder or any other appropriate means of casting from fluid state. There are multiple ways to create a complete EC device using such R2R method which can be differentiated by the structure of the film created in the R2R machine.

Figure 9:
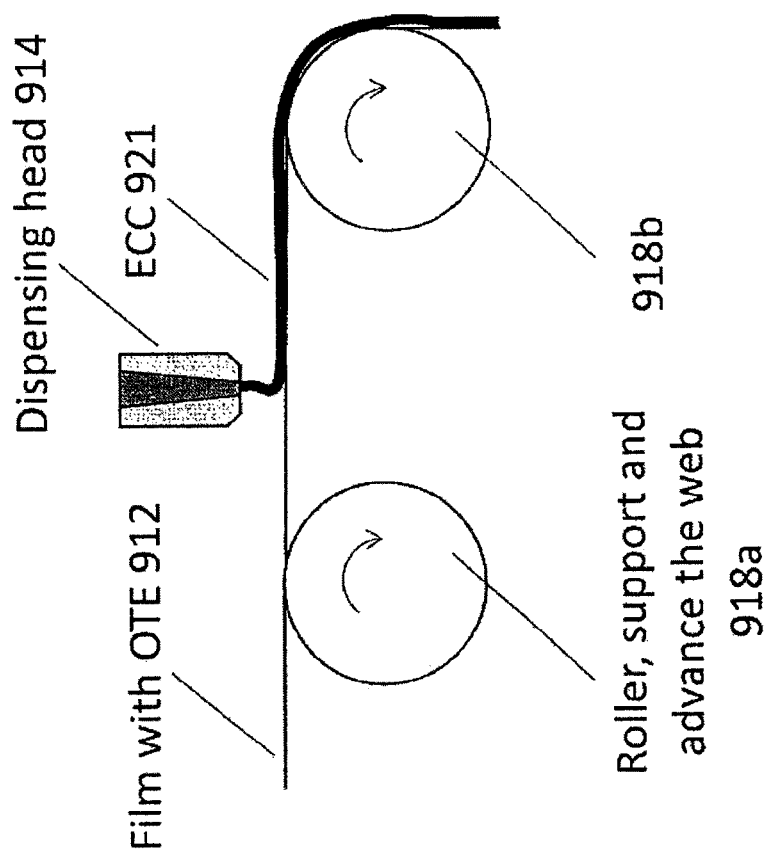
FIG. 9 illustrates a method of providing an ECC on to an electrodic film in accordance with an embodiment of the present disclosure.

FIG. 9 schematically depicts depositing an EC layer in a continuous fashion onto an optically transparent substrate that has OTE facing the deposited EC layer. As depicted in FIG. 9, EC layer 921 is deposited, using a dispensing head 914, onto a first optically transparent substrate 912 having an OTE (not shown) facing the deposited EC Layer. Substrate 912 having an OTE thereon can be a flexible optically transparent substrate in the form of a film. Substrate 912 is advanced by rollers 918a and 918b. By such a process a composite comprising the electrochromic composition as a layer disposed on a film can be formed in a continuous fashion. This method can also be used to prepare a composite of an electrochromic composition as a layer disposed on a film without an OTE on the film. Such a composite can be used as a stand-alone component in the manufacture of an EC device.

The composite comprising the EC layer disposed on an optically transparent substrate having an OTE facing the EC layer can then be used to form a variable transmittance layer for an EC device. Referring to FIG. 10A, a variable transmittance layer 10200A for an EC device can be prepared by combining two optically transparent substrates having OTE layer and an EC layer. As depicted in FIG. 10A, a first optically transparent substrate 10100A having OTE layer 10120A on a surface thereon and an EC layer 10210A on OTE layer 10120A can be combined with a second optically transparent substrate 10100B having OTE layer 10120B on a surface thereon and an EC layer 10210B on OTE layer 10120B. The first and second substrates and layers thereon can be combined by laminating, rolling together, etc. In this case, the substrates, OTE and EC layer are the same and symmetrical and thus the EC layer 10210AB of the resultant variable transmittance layer 10200A has a thickness that is twice the thickness of either EC layer 10210A on the first substrate or the thickness of EC layer 10210B on the second substrate.

Another possibility, as depicted in FIG. 10B, which illustrates a configuration of a variable transmittance layer 10200B for an EC device. Such a variable transmittance layer can be prepared by combining a first optically transparent substrate 10100 having OTE layer 10120 on a surface thereon and an EC layer 10210 on OTE layer 1012 with a second optically transparent substrate 10300 having OTE layer thereon 10320. The first and second substrates and layers thereon can be combined by laminating, rolling together, etc.

FIGS. 10A and 10B depict substrates than can be optically transparent films such as flexible films. However, the substrates can be rigid substrates such as glass. Yet another possibility for the formation of a variable transmittance layer depicted in FIG. 10A is to use a second substrate that is different from the first substrate or a second OTE than is different than the OTE of the first substrate. For example the first substrate can be a plastic material while the second substrate can be a different plastic material, or thicker plastic material or a glass. Such arrangement yields an asymmetric EC device that may be beneficial for certain applications.

As described above, in certain applications it may be beneficial to create a standalone EC layer in a form of an EC preform layer as described earlier. Such an EC preform layer can be fabricated, for example, in a form of a roll made in a R2R machine. There are certain specific considerations on how such an EC preform layer should be stored, handled and assembled into a device.

Some variants of an ECC are sensitive to moisture and/or oxygen. Therefore, storage and handling need to preferably occur in moisture- and air-free environments. One way to protect an EC layer is to extrude it onto a protective liner as, for example, a thin siliconized PET film. Such a liner can serve a dual purpose of providing a moisture and gas barrier, and preventing an EC layer from adhering onto itself while being wound on a roll. The rolls can then be sealed in bags that are substantially impervious to air and moisture. The bags may be purged and filled with inert gas, for example argon, before sealing. Alternatively, the bags may be evacuated and sealed.

In an aspect of the present disclosure, an electrochromic layer disposed between a first optically transparent substrate and a second optically transparent substrate can be prepared using an EC preform layer to fabricate an EC device. During assembly, an EC preform layer on a film, e.g. on a liner, can be unwound from a roll and disposed on a first optically transparent substrate which can be glass, thick plastic or a film. Tackiness of a EC preform layer provides an initial adhesion of the EC preform layer to the substrate. The liner then can be removed from the EC preform layer. A second optically transparent substrate can then be placed on the EC preform layer disposed on the first substrate. In this way, an electrochromic layer disposed between a first and second optically transparent substrate can be formed. The substrates can also include electrode(s), bus bar(s), passivation layer(s), etc. as described elsewhere. The EC perform layer and substrate assembly can then be cured, if needed, by any one or more of time, temperature, pressure, UV exposure or other chemical or physical agents. A particular curing recipe depends on the type of chemistry used in the EC preform layer. In order to minimize exposure of EC preform layer to air during the assembly operations, it is preferred to conduct the assembly operations in inert atmosphere. For example, the area where the substrates are combined with the EC preform layer may be under continuous purge with $N_2$ or Ar.

A typical procedure of assembling the stack of substrate/EC preform layer/substrate involves placing the EC preform layer on a bottom optically transparent substrate. This substrate can already have an OTE and one or more bus bars on a surface facing the EC preform layer disposed thereon. It can be more convenience to have the footprint of the EC preform layer to be equal or to exceed that of the substrate. In this case, after the second substrate is added to the stack, a lateral excess of the EC preform layer may be trimmed around a perimeter of the stack. The resultant footprint of the EC preform layer should covers substantially the footprint of the substrate with OTE, including bus bars. Further, it is preferable to have bus bars electrically insulated from an electrically conductive EC perform layer. Otherwise, if the bus bars are not properly insulated, there is a potential for developing electrical shorts from the bus bar through the EC layer and/or corrosion of the bus bar by the EC layer, as discussed with reference to FIGS. 5A and 5B.

Electrochromic devices are known to exhibit halo or iris effect, in which the distribution of coloration over an electrochromic layer between electrodes or a variable transmittance layer deviates from uniform according to a certain law depending on the distance from the closest point of external circuitry connection. In cases of a symmetrical connection, the center of an EC layer of the device can have different tinting or clearing dynamics compared to the periphery of the EC layer, e.g., the center area of the EC layer lags in transiting from one light transmission state to another state. The iris effect is typically more pronounced with larger area EC layers due to longer mean current path. The iris effect is not desirable from the customer point of view and typically manufacturers strive to minimize or eliminate it.

The origin of iris effect is believed caused by the lateral distribution of the potential of the surface conductive layer caused by ohmic drops along the current paths. The rates of electrochemical reactions differ at different points of the interface between the EC layer and electrodes, being higher at zones of higher overpotentials. The geometry of connection of the electrode to the external circuit matters for the potential distribution. The iris effect is more pronounced in more intensive modes of operation. The most intensive mode of operation that corresponds to depletion of the rate-limiting interface with the reagent over the whole area is characterized by the parabolic (or close to it) potential distribution due to the current density over the whole variable transparency layer being equal. This means that if the current density is too high relative to the surface conductivity of an OTE used in a device, the difference of coloration strength between periphery and center may reach the full dynamic range of the EC device. At intermediate modes of operation the iris effect is less pronounced due to the currents being lower.

In an aspect of the present disclosure, one way to mitigate the iris effect is to use a variable transmittance layer (VTL) having anisotropic electrical properties in a lateral direction. Such anisotropic electrical properties can be the result of one or more electrodes of an VTL having an anisotropic electrical property in a lateral direction and/or an EC layer having anisotropic electrical properties in a lateral direction between a first and second electrodes defining a VTL.

For example, one way to mitigate the iris effect is to spatially modulate sheet resistance of one or more electrodes, e.g., OTEs, in contact with an EC composition or layer in a VTL in an EC device. For example, a VTL can include an OTE in which the OTE has a spatially inhomogeneous resistance such as having a sheet resistance higher around a periphery of the OTE and lower towards the center area of the OTE.

Figure 10C:
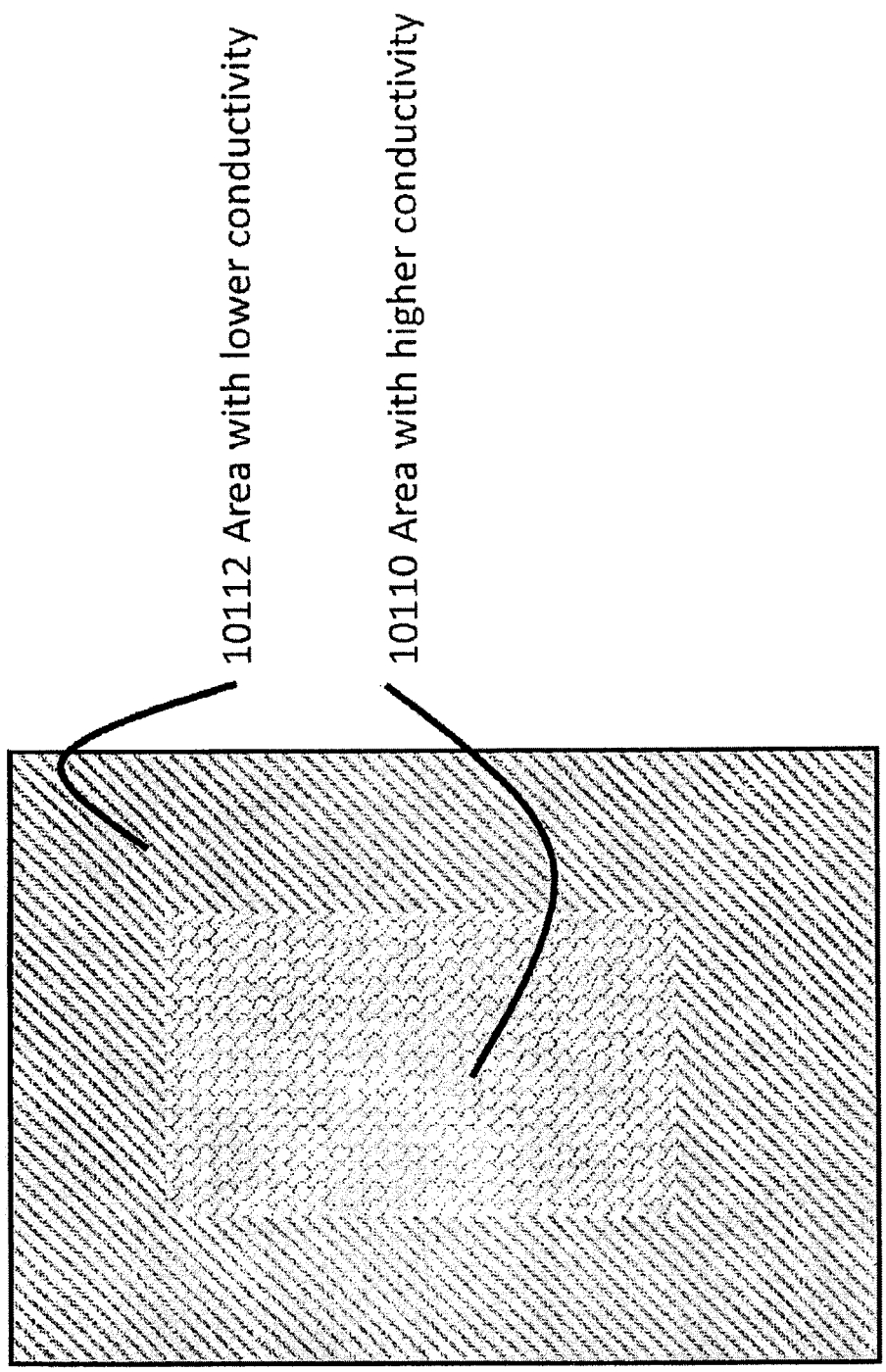
FIG. 10C illustrates an electrochromic layer having a center area with a higher conductivity than a peripheral area of the layer

Yet another way to mitigate the iris effect is to spatially modulate the electrical resistivity and/or concentration of the electrochemically active EC material in the plane of an EC layer of an EC device. FIG. 10C illustrates such an EC layer. As shown in the figure, EC layer has electrical properties that are substantially different in different areas of the layer. In particular, EC layer has a center area with a relatively higher conductivity 10110 than a peripheral area 10112. Such anisotropy compensates for an increase of reaction rates at zones of high overpotential with a decreased activity caused by low reagent concentrations. Specifically, if the concentration is higher in the center area than around the periphery of the EC layer, then the center area will have different, faster, kinetics then the periphery. By adjusting the concertation gradient between periphery and center areas, it is possible to suppress or eliminate the iris effect. Such gradients of concentration in the lateral direction may be created by changing the chemical composition of the EC layer during the process of dispensation. Alternatively, multiple dispensing nozzles may be used to dispense ECCs with different compositions in different areas of a substrate to form an EC layer having different concentration zone in a lateral direction. The spatial modulation of the resistivity and/or concentration may be accomplished in a step-wise manner, with at least two different areas, having lower conductivity closer to the periphery of the device and higher conductivity towards the center. Alternatively, such variation may be implemented in a gradual form, with conductivity more or less continuously rising from periphery towards the center.

For such method to be most effective in long-term operations, minimization of lateral diffusion of the EC materials may be needed to avoid concentration equilibration and disappearance of the iris mitigation capability. Such diffusion can occur in the liquid phase of EC layer in the form of a gel, through pores within the polymer matrix. One way to minimize or prevent lateral diffusion is to create non-porous lateral barriers with the matrix. The diffusion will still be able to occur in the direction normal to the plane of substrates on either side of the EC layer; however, the area with higher and lower concentration of EC materials will not substantially prevented from intermixing. This approach may be generalized by deploying a gel with anisotropic diffusion properties—having relatively unhindered diffusion in the normal direction and suppressed diffusion in the lateral direction. Additionally, the anisotropic gel may result in increased overall diffusion in normal direction, leading to increased device switching speed.

Such anisotropy can be created by using an anisotropic assembly process, for example using pressure direction, or adding electrostatic or magnetic field during curing of an EC layer between substrates, or a combination of these factors, and implementing polymer matrix that is responsive to such factors.

One other method that can be used to suppress the iris effect is to use a so-called weakly supported matrix having relatively low ionic conductivity. The effect is attained due to rates of electrochemical reaction are being more dependent on the ionic conductivity of a matrix (which is uniform in this case and potential-independent) than on the surface potential distribution. The rates of electrochemical reactions are therefore having a negative feedback due to the Frumkin effect: the driving overvoltage decreases with the increase of the reaction product concentration at the OHP. The drawback of this method is that the PTR value of such a device may be significantly lower than for a similar one with strongly supported matrix.

Several methods utilizing non-uniform OTEs may be used to mitigate the iris effect. An electrode may be manufactured or treated (irradiation, ozone/corona, chemical/solution, thermal, etc) to form zones having different surface resistance, concentration of charge carriers, work function, carrier mobility, etc. For instance, concerning an anode, higher work function zones show faster kinetics that lower work function ones if specific electrochromic materials are used. Profiling the surface resistance may smooth the transient current leaps but make insignificant effect on the steady-state operation.

In most cases when a gel-electrolyte is used the ion-transfer rate limitation is maintained on the electrode that is not rate-limiting, so the distribution of electrode current density follows that for a rate-limiting one, more pronounced for wider devices. This means that if the electrode modification is considered in the common case the modification of the rate-limiting electrode may be sufficient.

For Types I-III devices, the rate-limiting electrode may be switched by variation of the matrix properties and/or the concentrations of electrochemically active reagents.

Another method to create lateral anisotropy of electrochemical reaction is to leverage the use of the separator membrane in Type III device. When a membrane's permeability is not uniform across its area of an EC device, then such a membrane can cause anisotropic light transmission processes. In areas where such a membrane has higher permeability, the process will happen faster (i.e. switching speed is higher) then in the areas with lower permeability, all other parameters being equal. This effect may be utilized to minimize an iris effect that is driven by the lateral gradient of voltage. Specifically, if the membrane has permeability higher in a center region compared to that closer to a periphery or edges of the membrane, then the spatial gradient of color species will be decreased or even eliminated.

The variation of permeability across an EC layer of an EC device may be gradual or a step-wise with two or more gradations. For example, an EC layer can include a membrane with different permeability across a lateral direction of the membrane. Such a membrane may be pre-fabricated with a concentric pattern of permeability, with higher permeability in a center area relative to a peripheral area of the membrane. Such prefabricated non-uniform membrane should be aligned with the center area of the device during the assembly. The benefit of such pre-fabricated membrane approach is to decoupling the process of device assembly from the process of making the membrane non-uniform. The drawback of such pre-fabricated approach is the fact that different size devices will need different sized, and differently patterned, membranes.

Alternatively, a membrane patterning may be created specifically for each device. For example, the permeability of a membrane may be varied by a processing step, for example by exposure to UV, or IR or another external effect, or a combination of such effects. If the exposure is varied across the area of the membrane, then the resultant nonuniformity of the permeability will have an imprint of spatial non-uniformity of the processing steps. For example, if the processing step involves UV light and the permeability of the membrane is higher in the areas with higher exposure, then one needs to have higher exposure toward the center area of the membrane and lower exposure closer to the edges. Such a non-uniform exposure may be achieved by using a stationary non-uniform source, or by rastering a source across the membrane and varying the exposure time and/or intensity across the area of the device. Such processing of the membrane may be conducted on a standalone membrane or once it is placed in the device—provided that the processing step does not influence the rest of device adversely.

Alternatively, the permeability may be modulated by using a membrane of different thickness in different areas of the membrane. The change of thickness may be gradual (e.g. concentric) or step-wise. A step-wise change may be accomplished by using a single layer membrane with certain permeability in the center region of the device, and a double layer membrane (doubling the thickness and decreasing the permeability) closer to the edges.

Device and System Operation

Control methods of an EC device are aimed to efficiently and safely control the transmittance properties over the whole area of a variable transmittance layer. The control algorithm should provide sufficiently uniform transmittance properties over the whole area of a variable transmittance layer both at stationary states and at transients. Control algorithms for EC devices of different types are fundamentally different.

Physical Principles:

Processes of changing of the operational state of an EC device are initiated by varying electrical biases over electrode-electrolyte interfaces. Biasing an interface away from the equilibrium causes an electron transfer between the electrode and the electrolyte and varies the electrolyte redox Fermi level. Since the Fermi level of the electrode approaches the electrolyte redox Fermi level at equilibrium state, the state of an EC device may be then determined by measuring the difference of Fermi levels of two distinct electrodes (anode/cathode or anode/reference or cathode/reference) brought in contact with the same EC layer, i.e. by measuring the open-circuit voltage ($V_{oc}$) of an EC device.

For planar cells with oppositely biased optically transparent electrodes control signals that change the operational state of an EC device are applied to the surface conductive layers of electrodic stacks directly or through one or more auxiliary layers (solder, conductive adhesives, etc) at the borders/edges of a variable transparency layer assembly. For EC devices with one function of electrode(s) of the variable transparency layer control signals are applied between the surface conductive layers of electrodic stacks and separated counter electrode.

The characteristic property of EC devices is hysteresis. After a certain electric stimulus is applied the distributions of species activities, current densities, potential distributions and other parameters do not take their stable values instantly but show transient behavior. The values and distributions evolve with time and at some point in time reach steady-state values, which are characterized as having first time derivatives equal to zero and are specific for the electric conditions of the interfaces.

Monostable Devices (Type I)

Due to the hysteresis, the path of reaching the steady-state by a Type I EC device depends strongly on the way of how the voltage is applied during the transition. According to the laws of the electrochemical kinetics (Butler-Volmer/Frumkin equations as the simplest model) the rate depends on the interfacial concentration of the reactant. As the kinetics of the electron transfer is generally much faster than the mass transfer rate, the overall process is considered to be mass-transfer controlled. Type I devices mostly utilize non-fluid gel electrolytes, so the convection may be neglected, and the process is then diffusion/migration-controlled. It is useful to distinguish two nominal regimes of a device operation: the first one assumes that at every moment of time along the path to a desired steady-state the diffusion is fast enough for the activity profiles to be close to steady-state (first time derivatives≈0); in the second regime the diffusion is slow and the activity profiles are not close to steady-state, i.e. the first time derivatives differ significantly from zero until the steady-state is reached.

The shape of I-V curves of an EC device are determined by the slowest step of the whole charge-transfer sequence, both within ionic and electronic conductors. Thus, if diffusion-control is assumed, the shape of the I-V curve is determined by the rate of the slowest mass-transfer of a reagent to the corresponding electrode. Hence, only one electrode-electrolyte interface is rate-limiting during operation.

The I-V curve of the steady-state regime of an ideal (not having any ohmic drops on the electrodes) type I EC device with two redox couples follows the curve of rate-limiting interface characteristic and has the "hyperbolic tangent" shape. This curve may be contingently subdivided into three areas: the area of zero current, the area of linear I-V dependency, and the depletion area, within which the cell current is constant and doesn't depend on the voltage applied. Within the area of zero current the voltage applied is insufficient to produce measurable electrochemical reaction rates due to low overpotentials, whereas within the linear region the current depends on the voltage applied almost linearly because the interfacial steady-state gradient of the activity of the reagent of the rate-limiting step does so. Operation within the depletion area is accompanied by close to zero interfacial (at the rate-limiting interface) steady-state concentrations of reagent species (reagent depletion), so the reaction rates and the cell current are not able to grow as the overpotentials increase.

If the non-steady-state operation is performed, the relatively low rate of mass transfer leads to the fast drop of the interfacial concentration (or activity, in common case) of reagent what increases its interfacial gradient. When the depletion happens, the interfacial gradient is the highest and beyond this point it decreases until the steady-state is reached. This behavior leads to emergence of the current peak on the I-V curve. The peak current is higher than in steady-state regime because during the transient activity gradient of the reagent is higher than the highest possible at the steady-state (at depletion).

When a finite size variable transparency layer is considered, an ohmic drop arises on the surface conducting layers. Therefore, the overpotential on an electrode at the arbitrary point of the variable transparency layer depends not only on the cell voltage applied, but also on the integral ohmic drop along the current path. Thus, the rates of electrochemical reactions may differ at different points of a variable transparency layer. Since only net cathodic and anodic currents must be equal, the current distribution over each of the electrodes of the variable transparency layer may differ leading to non-equal distribution of products of anodic and cathodic reactions that causes the transmittance non-uniformities. The goal of a control algorithm is to allow the adjustment of transmittance properties of the variable transparency layer within its dynamic range and provide the required degree of optical properties uniformity over the whole area of the variable transparency layer. As discussed elsewhere herein, the visible light transmittance (VLT) of a small area of a finite size variable transmittance layer depends on integral concentrations of colored solutes along the light propagation path within the EC layer.

The distribution of reaction rates over the second, non-limiting electrode follows the limiting one due to the Frumkin effect. Indeed, the diffusion rate of the species reacting on the non-limiting electrode is higher and if no additional rate control is present the distribution of currents over the non-limiting electrode would be so that the Ohmic drops are minimal. It means that the currents leaking through the points closest to the external circuit connection point would be as high as possible. As the currents are limited by diffusion rates, the maximal specific steady-state current is limited by the interface depletion. So, the portion of an interface that is able to operate at depletion conditions would operate so, causing the non-uniform distribution of the second electrode currents. However, in this case, due to the distribution of currents over the rate-limiting electrode, the ion transfer paths would be too long. Assuming real ion-transfer rates of gel-electrolytes, in such a situation the counter-ion flux would be insufficient, the excessive charge would appear at the active part of the second interface and thus OHP potential value would increase to the values such that minimize the current density to the corresponding ion transfer rates (a negative feedback). Thus, the character of the rate control of the non-limiting interface can be described as ion transfer controlled.

So, in further discussion the operation modes of the rate-limiting interface are considered as regime-determining and the whole finite-size EC layer area can be contingently subdivided into series-parallel connected distinct differentially small size EC devices within which no Ohmic drops are present. The description of algorithmics is mostly based on this assumption. For clarity, I-V curves are further considered in terms of applied voltage but not of rate-limiting interface overpotentials.

For simplicity, the rectangular-shaped device is assumed in the following description. The most efficient way of EC device connection implies applying potentials to the perimeters of both electrodes. In such a device Ohmic drops will be higher along the longer side of a rectangle, so the efficient estimation of voltages applied, and hence of the status of the device, are made in the direction along the shorter side. In order to make the system virtually flattened to a one-dimensional, one can suppose that the driving voltage is applied only to the longer sides of an EC device. This symmetrical connection shows mirrored distribution of voltages and currents and can be analyzed as two mirrored half-devices, where both electrodes are connected on one side.

Another one, diagonal connection may be also considered. It assumes that each electrode is connected by only one side. For example, the upper one is connected by the left side, and the lower one—by the right one. This connection shows higher Ohmic drops and therefore is not energy efficient.

As discussed elsewhere herein, a stationary I-V characteristic of an interface shows that an area of an interface may operate in 3 modes, so a particular variable transparency layer may contain areas operating in different modes along the thickness of the layer at the same time. The following combinations are possible:

Depletion mode
Depletion and linear modes
All linear modes
Depletion, linear and zero current modes
Linear and zero current modes
All zero-current mode There are no practical circumstances where some portions may be in zero current mode, some in depletion mode, while none in the linear mode. In other words, a portion of layer in the linear I-V mode always separates zero current mode and depleted mode.

The first mode of operation corresponds to the maximal possible stationary cell current and the equality of the interfacial charge transfer rates over the whole area of each electrode. It means that the rates of electrochemical reactions are constant over all area of the variable transparency layer and hence the distributions of electrochemical reactions products are uniform over each plane within the EC layer that is equidistant from an electrode. Hereby, the color and VLT perceived by an observer of the EC device are also uniform for each pair of angles of light incidence and of observation. However, in this mode of operation, due to the ohmic drops of the OTEs and other system elements and due to the requirement of overpotentials of the rate-limiting electrode to be in the depletion zone even at the point most distant from bus bars, the overpotentials at every location will be higher than that of the most distant point. Depending on the steady-state current density and the sheet resistance of the surface conductive layers, the minimal values of control voltages to be applied could be so high that overpotentials in some areas of the variable transparency layer are enough for various fatal processes to occur, leading to the EC device malfunction and/or destruction. Thus, in order to operate in this mode a variable transparency layer must possess the surface conductive layers matched with interfacial current densities so that at every point of a variable transparency layer operating in all depletion mode the overpotential doesn't exceed the safe value. Operation in all depletion mode may be realized by applying the constant voltage between the surface conductive layers of anode and cathode.

The last, all zero-current mode is characterized by the absence of any currents and solute fluxes within the EC layer. As was mentioned before, in a monostable device this mode corresponds to the state of maximal transmittance.

The combined modes of stationary operation are discussed together. In a small piece of a variable transparency layer, including of the EC layer, anode and cathode, as told before, at the steady-state conditions, the VLT value depends on the rates of formation and consumption of colored solutes, which are interdependent through the concentration gradients. Hence, if current (and therefore, the rates of formation of colored solutes) is lower than the depletion value, the transmittance increases. Therefore, if ohmic drops in a variable transparency layer are so that in some areas overpotentials are lower than values needed for depletion, the VLT of such areas will be higher than minimal value. If somewhere over the variable transparency layer overpotentials are in zero-current zone, this area will have the maximal VLT value that corresponds to the off state.

According to aforementioned, steady-state modes of operation allow spatial uniformity of transmittance only in fully transparent or fully darkened states. All the intermediate steady-states exhibit non-uniformities of transmittance, though they may be imperceptible for an observer since at intermediate states the total current and ohmic drops are lower than those in steady state with non-zero current.

When operating in stationary mode, the applied voltage and total current are sufficient parameters that can be used to infer the state of the EC device.

Transient Mode Operation:

If an EC device is to be switched between states the control signals applied are to be changed also. If the rate of voltage variation exceeds the limit of stationary (in terms of interfacial behavior, do not mix up with the stationary mode of an EC device operation) regime, the hysteresis effects arise. In a real application, the critical voltage variation rate may be so low that it is impossible to avoid using non-stationary regimes. Thus, if a voltage variation rates of control signals applied to a finite size variable transparency layer exceed the critical value, high inrush currents will leak in accordance with the non-stationary current-voltage characteristics. The highest overpotentials arise in the zones adjacent to the control signals application points, i.e. close to the borders/edges of electrodic stacks. High interfacial currents at these zones cause increased ohmic drops on the surface conductive layers and hence lowered overpotentials (in comparison to steady-state) at the zones that are more distant from the control signals application points. Thereby, intense non-uniformities of transmittance of the variable transparency layer may happen at transients if a control signal applied has too high velocity of voltage alteration. However, such a transient ends at a stationary state, so the non-uniformities described are temporary.

Interval (Multiphase) Operation

The trade-off between slow but rather uniform stationary and fast, but non-uniform transient regimes of switching is gradual variation of regime in accordance with the actual transmittance of an EC device, human eye sensitivity and ambient illuminance. Consider switching over the whole dynamic range, from fully transparent stationary state to fully darkened one. At the start the illuminance due to transmitted light is the highest and the human eye sensitivity is enough to recognize even low grade of transmittance non-uniformity. On the other hand, the fully discharged EC device has minimal impedance, so the inrush currents will be relatively high, what would increase the iris effect. Therefore, at the initial step rates of voltage variations are to be close to stationary regime until the transmittance reaches the value at which a human eye is not so sensitive and the possible inrush currents are not so high. Nevertheless, at the intermediate states, even at stationary mode there is a certain minimal transmittance non-uniformity (described above). To allow an EC device to operate at the intermediate levels of transmittance with minimized non-uniformities, features of open-circuit behavior are used.

If the EC device was operated in stationary mode at intermediate level of transmittance and then was open-circuited, the processes of lateral mass transfer and over-the-electrode (see above) potential alignment will reduce the non-uniformities. Thus, the EC device may be controlled by a sequence of active and open-circuit (relaxation) phases, allowing for transmission non-uniformity artifacts, such as iris, provided that the fluctuations of the transmittance are weak. One more significant feature of the relaxation state is that it allows to measure the $V_{oc}$, and thus to determine the real intrinsic state of an EC device. If $V_{oc}$ is measured at the end of a relaxation phase it provides averaged value which may be used to define the transparency state of the whole variable transparency layer. $V_{oc}$ value allows the unambiguous determination of the transparency state of the EC device without observing its optical properties and thus may be used as feedback signal for a system of automatic transmittance control.

Figure 11:
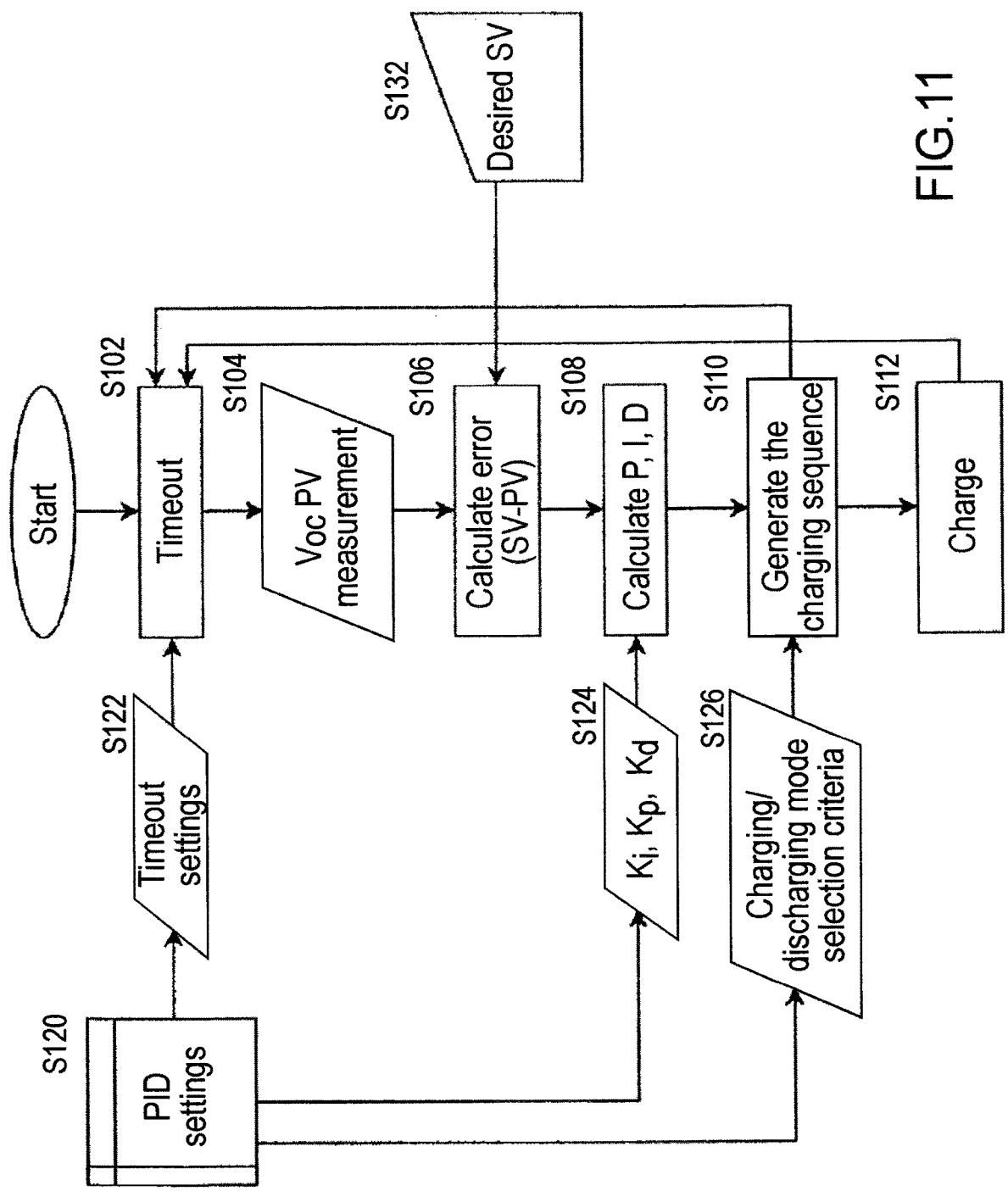
FIG. 11 is a flow chart depicting a control algorithm for controlling an EC device in accordance with an embodiment of the present disclosure.

FIG. 11 is a flow chart depicting a control algorithm for controlling an EC device in accordance with an embodiment of the present disclosure. A non-limiting goal of the algorithm is then to keep the $V_{oc}$ at the desired value. PID controller is used for this purpose. Since the feedback value is only obtainable at the open-circuit conditions and no charging signal can be applied at the same time, the algorithm shall imply at least two periodically switching phases: Charge and Feedback.

The PID cycle may only be started if an initial feedback value exists. The processes occurring at open-circuit conditions align the potential distribution over the electrodes, so every measurement of the $V_{oc}$ (PV) is performed, at S104, after a certain timeout, at S102, which is specifically calculated, at S122, for every shape and chemical composition of the EC device controlled. The Set Value, SV is automatically calculated according to the desired mode of operation at S132. The SV is compared with the current PV, the error value is obtained, at S106, and then P, I and D values are calculated, at S108, using PID coefficients S124 and previously acquired data. After P, I and D values are calculated, the algorithm generates the shape of the charging curve at S110. This step is needed to reduce the iris effect and to adaptively calculate the best route from the current state to the desired one. The charging sequence may contain constant current (galvanostatic) with overvoltage control, constant voltage (potentiostatic) with overcurrent control, current function (I(t, . . . )) and voltage function (V(t, . . . )) steps. During current-controlled steps the voltage applied can be measured and compared with the abovementioned physical chemical constants to find out how close to a steady state the device is. In this mode of operation, the timeout duration may be set to zero if relaxation is not necessary (e.g. when switching to the fully darkened state as quickly as possible). During transitions, the main goal is to suppress the inrush currents leading to iris effects whereas taking minimal possible amount of time to perform the desired transition. For instance, if a transition from the fully-discharged state to the fully darkened one is desired, the algorithm would start with initially very low but increasing current and then switch to constant voltage, which is the most convenient way to maintain the device in all depletion mode. On the contrary, if an intermediate state of tint is needed, due to the transmittance of intermediate steady-states being non-uniform, the algorithm would use the combination of specific shape of the charging voltage curve and timeout duration to obtain the dynamic behavior of the device where the non-uniformities of transmittance are imperceptible.

In general, the goals of control algorithm vary depending on the application and on the particulars of deployment. In applications where people occupy interior space (e.g. buildings, vehicles, airplanes) two distinctively different goals are:

(a) Improving lighting comfort for space occupants; and
(b) Optimizing heat load of the building to reduce HVAC CAPEX and operation costs.

Chemistry as a Function of Geography

Lighting comfort of occupants is largely independent of the geographic location of a building, it is mostly driven by human physiology. Heat load optimization, however, varies strongly as a function of building location.

In hot climates it is beneficial to minimize heat load of the building, thereby reducing the load on the cooling system on the building. Therefore, EC chemistry that limits transmission of IR part of the spectrum is preferred.

In colder climates it is preferred to maximize the heat load, thereby reducing the load on the heating system of the building. In such applications EC chemistry that does not affect IR transmission is preferred, since IR contains a significant portion of heat energy.

In addition to variations of chemistry as function of geography, the other elements of window assembly need to be adjusted to optimize the heat load as a function of location. Such elements include presence or absence of low-e coatings on glass, addition of specialty films that modify spectral transmission or implementing other spectral control features.

Energy Efficiency Vs Lighting Control

If the system is operating in the Energy Efficiency mode, then the primary optimization parameter is the combined energy consumption of the building (or vehicle). The control system will monitor the total energy consumption of the building, including energy used for window light transmission control, HVAC and interior lighting. The system would then optimize the operation of these three elements to minimize the total energy, while maintaining minimally acceptable conditions within the building (e.g. not allowing the inside temperature to go above or below certain boundaries).

If the system is operating in the Lighting Control mode then the primary optimization parameter is the quality of lighting in the interior space. This parameter may be derived from the luminance sensor(s) located in the occupied space. There may be a single sensor that provides an integral control parameter, or there could be multiple sensors distributed across the space and generating localized control parameters. The performance of such localized control points may be further personalized by individual users adjusting the lighting control preferences.

It is important to note that the behavior of control system and of the EC windows controlled by it can be substantially different between the Energy Efficiency and Lighting Control modes. For example, the interior of a building operating in the Energy Efficiency mode on a sunny day in warm climate may be too dark and too warm for occupants.

Buildings

As described elsewhere herein, there could be two distinctly different modes for buildings differentiated by control goals—Energy Efficiency and Lighting Control. From the calendar point of view, the buildings will be operating in one of these modes depending on day and time. For example, during the work hours, say 8 AM to 6 PM, the building would be in the Lighting Control mode. During the rest of the day, over the weekends and holidays the building would switch into the Energy Efficiency mode. The users may have an option of overriding the control mode of the building.

Vehicles

Increasing electrification of the vehicles allows for optimization of light and thermal conditions similar to that of the buildings. If the vehicle is equipped with an EC device for windows and/or roof, the transparency can regulated dynamically. When the vehicle is occupied then typically users would have control over the conditions inside. When the vehicle is parked, and automated control mode may be engaged. For example, on a sunny cold winter day an EC device of the vehicle can transition to a high transmission clear state in order maximize warming of the car through maximizing greenhouse warming. Alternatively, on a hot summer day, the heat load should be minimized and the EC device can transition to a low transmission state, e.g., a dark state with low VLT. Reducing interior temperature due to solar heat results in faster time to comfort once the AC is engaged with fuel economy improvement and reduction of $CO_2$ emissions since less energy is spent on cooling the cabin. This heat load reduction would call for switching the EC device automatically into the dark mode when the vehicle is parked in the sun on a warm day. Maintaining the dark state of EC devices uses energy and may drain the battery. Therefore, dynamic adjustment of vehicle's EC device is advantageously controlled when the vehicle is grid-connected.

EC Compositions and Layers

The light-absorbing components of an EC composition or layer can provide tunable attenuation of the electromagnetic radiation flux in visible, UV and/or NIR regions, thus (1) creating the desired visual sensation for a human looking through the EC device and/or for an area where it is installed and (2) providing the EC device the ability to regulate the amount of the incoming electromagnetic radiation energy in visible, UV and/or NIR regions.

Electrochromic compositions of the present disclosure include one or more electrochromic materials. Such compositions can also include one or more of a solvent, a polymeric material, an auxiliary compound, modifier, additional element or any combination thereof. Such compositions can be formed into layers for use with certain EC devices. In certain aspects, an EC layer typically includes a matrix.

EC compositions and layers of the present disclosure can be substantially or entirely clear, colorless or colored, non-turbid, non-hazy. Electrochromic compositions and layers of the present disclosure can change light transmission from one state to another state in response to an input signal, e.g., an applied voltage, electrical current, electric field, etc. The change in light transmission can occur at visible, UV and/or IR wavelengths. The change in light transmission can occur from a high light transmission state, e.g., a transmittance of at least about 50% 55%, 60%, 65%, 70%, 75%, etc. to a low light transmission state, a transmission of less than 1%, e.g., less than about 0.8%, 0.6%, 0.4%, 0.2% and even less than 0.1%. These high and low transmission state can occur in the visible, UV and/or IR wavelengths but for certain applications the change in high light transmission occurs in the visible spectrum. In certain aspects, the electrochromic layer can continuously change light transmission from one state to one or more other states in response to one or more input signals.

The electrochromic composition or layer can have a predetermined color in one state of the visible light transmission. Certain colors are preferable for windows such as blue, green, grey, etc. The color of an EC composition or layer can be set by selecting an appropriate electrochromic material for the composition or layer. In addition, more than one electrochromic materials can be included in a composition in which spectral absorbance or reflectance of the individual materials are matched to generate a predetermined color, e.g., are matched to transmit or reflect gray scale visible light. This can be done by CIELAB matching. That is, if a pair of visible light-absorbing compounds is present in the composition or layer, the resulting color perceived by a human would be described by the sum of the a* and b* values of the single components of the same concentration weighted in accordance with their L* values. For example, the electrochromic composition can include electrochromic materials that are spectrally matched to produce substantially gray scale color of transmitted or reflected light through or from the electrochromic composition such as when the color deviations of the transmitted or reflected light through or from the electrochromic composition are less than 10 units, e.g., less than 5 units, of a* and b* axis for CIELAB color space.

Such predetermined color can be determined using a standard spectrophotometer. Color determinations for the present disclosure should be referenced with a HunterLab UltraScan PRO spectrophotometer which uses a D65 illumination source and operated with a 10 degree standard observer.

Further, electrochromic compositions and layers of the present disclosure can have low haze in a high transmission state. The human eye can typically detect haze with a value of about 4% or greater. Hence it is preferable for certain applications that the electrochromic composition or layer have haze less than about 10% in a high transmission state, e.g., less than 8%, 6%, 4%, 3%, 2% and 1%. In an EC device, components other than an EC layer can contribute to haze, such as optically transparent substrate and coatings thereon including electrically conductive coatings such as OTEs. Hence, in an aspect of the present disclosure, haze as viewed from an optical path of an EC device should also have the same or lower haze as set forth for the haze of an EC layer of the present disclosure, e.g., haze of less than about 10% in a high transmission state, e.g., less than 8%, 6%, 4%, 3%, 2% and 1%.

Cloudiness or "haze" can be measured with a standard haze meter, which measures the amount of light that is diffused or scattered when passing through a transparent material. That percentage of light that when passing through that deviates from the incident beam by greater than 2.5 degrees on average is defined as haze. See, e.g., Haze conformance per ASTM D1003 Section 8. Procedure B Spectrophotometer.

In addition, electrochromic compositions and layers of the present disclosure advantageously can change light transmission from the one state to another state (e.g., from one visible light state to another visible light state) quickly, e.g., less than about 30 seconds, and uniformly. In an aspect of the present disclosure, the EC composition and layer can change light transmission from the one state to another state uniformly in seconds. As used herein, light transmittance uniformity is defined as a variability of light transmittance, e.g. a VLT, of less than 20%, i.e., for any point of a surface the variation of a VLT is less than 20% at the same time.

Further, the electrochromic layer can have a predetermined electrical property or operational property. For example, electrochromic layers of the present disclosure can have one or more predetermined values for one or more electrical properties such as electrical conductivity, operational voltage range of less than about 1.5V, e.g., less than about 1.3V, 1.2V, current range and power consumption in stationary and transient states such as continuous power consumption in a low light transmission state (e.g., a dark state) below 0.25 $W/m^2$, preferably below 0.1 $W/m^2$ and most preferable below 0.05 $W/m^2$.

In certain aspects of the present disclosure, an electrochromic device can include an electrochromic composition that is configured to provide a specific solar heat gain coefficient value for the electrochromic device in a colored state and/or in a clear state. A specific solar heat gain coefficient (SHGC) is the fraction of incident solar radiation admitted through a window, both directly transmitted and absorbed and subsequently released inward. SHGC is expressed as a number between 0 and 1. The lower solar heat gain coefficient value, the less solar heat is transmitted through an electrochromic device. In some aspects of the present disclosure, an electrochromic composition included in an electrochromic device includes is configured to provide a specific solar heat gain coefficient value that is less than 1, e.g., less than 0.9, etc., for the electrochromic device in a colored state and/or in a clear state.

Examples of electrochromic materials that can be included in an electrochromic composition or layer of the present disclosure include, but are not limited to, electroactive visible light-absorbing compounds (in specific oxidation states) such as 4,4'-bipyridinium salts (e.g., viologens), 2,2'-bipyridinium salts, tertiary amines, ferrocyanides, heterocyclic compounds (e.g., phenazines, phenoxazines, phenotiazines, quinoxalines, etc.), conductive polymers (e.g., PEDOT-PSS, PANI, PT, polyacetylenes, etc.), quinones, organometallic compounds, or combinations thereof; and Lewis/Brønsted acids and bases as light-absorbing compounds such as pH-indicators, CT complexes (e.g., hydroquinone/quinhydrone, metallocomplexes), or combinations thereof. The bipyridinium salts preferably include weakly-coordinating anions, like the salts of supporting electrolytes.

In certain aspects of the present disclosure, an electrochromic material can comprise one or more compounds of formula (I)

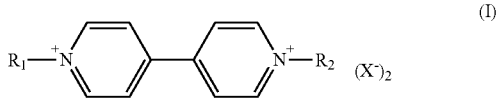

(I)

wherein $R_1$ and $R_2$ are the same or different and individually represent a substituted or unsubstituted alkyl, a benzyl, substituted or unsubstituted phenyl, and $X^-$ represents an anion.

In certain aspects of the present disclosure, $R_1$ and $R_2$ individually represent an alkyl such as a $C_{1-7}$ alkyl, e.g., methyl, butyl, t-butyl, unsubstituted or substituted with one or more of phenyl, halogen atom such as one or more fluorines, e.g., a perfluoromethyl, a 4,4'-bipyridinium, which itself can be substituted with an alkyl, such as a $C_{1-7}$ alkyl, e.g., methyl, butyl, t-butyl; a benzyl (—$CH_2$-Ph); a phenyl, or phenyl substituted with one or more of an alkyl, such as a $C_{1-7}$ alkyl, e.g., methyl, butyl, t-butyl, a haloalkyl such as a perfluoro $C_{1-4}$, a halogen atom such as one or more fluorines; an alkoxy, e.g., a $C_{1-4}$ alkoxy, methoxy, a halogenated alkoxy, e.g., a $C_{1-4}$ perfluoroalkoxy, perfluoromethoxy; a pentafluorosulfanyl, cyano, $NR'_2$, where R' is an alkyl or substituted alkyl, etc. $X^-$ represents an anion such as a hexafluorophosphate, tetrafluoroborate, perchlorate, or an organic anion such as trifluoromethanesulfonylimide $(CF_3SO_2)_2N^{--}$).

In some embodiments, $R_1$ and $R_2$ individually represent a substituted phenyl in which substituents can be located at various positions of a phenyl ring with numbering shown below.

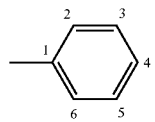

For example, $R_1$ and $R_2$ individually represent a substituted phenyl having one or more substituents on a 3, 4, and/or 5 position of the phenyl, such as one, two or three $C_{1-7}$ alkyl substituents on a 3, 4, and/or 5 position of the phenyl, e.g., a tolyl, 4-tert-butylphenyl, 3,4-dialkylphenyl, 3,4-dimethylphenyl, 3,5-dialkylphenyl, 3,5-di-tert-butylphenyl substituted phenyl groups.

In other embodiments, $R_1$ represents a $C_{1-7}$ alkyl and $R_2$ represents a phenyl or a phenyl having one or more substituents on a 3, 4, and/or 5 position of the phenyl FIG. 12 illustrates particular viologens useful as electrochromic materials that can be included in electrochromic compositions, layers and devices of the present disclosure.

Such viologens include, for example, one or more of 1-methyl-1'-phenyl-4,4'-bipyridinium bis(trifluoromethanesulfonylimide) (compound 19), 1-methyl-1'-(4-tert-butylphenyl)-4,4'-bipyridinium bis(trifluoromethanesulfonylimide) (compound 21), 1-methyl-1'-(3,5-di-tert-butylphenyl)-4,4'-bipyridinium bis(trifluoromethanesulfonylimide) (compound 48), 1-benzyl-1'-phenyl-4,4'-bipyridinium bis(trifluoromethanesulfonylimide)(compound 20), 1-methyl-1'-(4-fluorophenyl)-4,4'-bipyridinium bis(trifluoromethanesulfonylimide) (compound 22), 1-methyl-1'-(3,4-dimethylphenyl)-4,4'-bipyridinium bis(trifluoromethanesulfonylimide) (compound 29), 1-methyl-1'-(3,5-dimethylphenyl)-4,4'-bipyridinium bis(trifluoromethanesulfonylimide) (compound 31), 1-methyl-1'-(3,4,5-trimethylphenyl)-4,4'-bipyridinium bis(trifluoromethanesulfonylimide) (compound 33), 1,1'-dimethyl-4,4'-bipyridinium bis(trifluoromethanesulfonylimide) (compound 5), 1,1'-diheptyl-4,4'-bipyridinium bis(trifluoromethanesulfonylimide) (compound 8), 1,1'-bis(4-fluorophenyl)-4,4'-bipyridinium bis(trifluoromethanesulfonylimide) (compound 12), 1,1'-bis(4-butylphenyl)-4,4'-bipyridinium bis(trifluoromethanesulfonylimide) (compound 13), 1,1'-bis(4-tert-butylphenyl)-4,4'-bipyridinium bis(trifluoromethanesulfonylimide) (compound 14), 1,1'-bis(4-trifluoromethoxyphenyl)-4,4'-bipyridinium bis(trifluoromethanesulfonylimide) (compound 25).

In other aspects of the present disclosure, an electrochromic composition or layer can include an electroreduction sensitive material, e.g. a cathode material, comprising one or more compounds of formula (I), an electrooxidation sensitive material, e.g., an anodic material such as a ferrocene, a 5,10-dihydrophenazine, a polyarylamine, a tritolylamine, a phenothiazine, a methyl-phenyl-thiazine, or a benzidine, and a solvent and optionally a polymeric material, or optionally components that form a polymeric material.

Auxiliary compounds aid in the reaction sequences that lead from initial electrochemical processes to formation or consumption of light-absorbing species, and include, for example, Redox shuttles (electrocatalysts); Lewis/Brønsted acid/base shuttles (e.g. $H^+$); pH regulators (pH buffers); or combinations thereof.

Modifiers are minor compounds introduced to adjust the miscellaneous durability and fabrication properties of an electrochromic layer and include compounds such as, for example, radiation filters (UV blockers such as titanium oxide particles); scavengers (e.g., scavengers for $O_2$, water); antioxidants; surfactants (e.g., dispersion stabilizers, defoamers, wetting promotors); rheology modifiers; or combinations thereof. In certain embodiments, one or more solvent, radiation filter, additive, auxiliary compound, modifier, or electrolyte comprise, or is exclusively, an organic material.

A polymeric material can be a networked polymer (e.g., crosslinked) or a polymer without a network. Polymers useful for the present disclosure include, without limitation, homo and copolymers (regular or block-) of: acrylic, alkylacrylic acids, and their salts, acrylic esters, such as methacrylates, acrylic amides and their salts; vinyl alcohol, acetates such as ethylene vinyl acetate, and acetals; acrylonitrile; alkenes (e.g., ethylene, propylene, styrene, amylene, nonbornene, isobutylene); dienes (e.g., butadiene, isoprene, chloroprene, myrcene, etc.); haloalkenes (e.g., hexafluoropropylene, fluouoethylenes/propylenes, etc.); halodienes (e.g., chloroprene); siloxanes, silanes; carbohydrates; or a combination thereof. Particularly suitable polymers include a methacrylate polymer or copolymer thereof, or a polyacrylonitrile, a standard interlayer polymer, such as PVB or EVA. The polymers useful in an electrochromic composition can be added to an EC composition or formed in situ during a curing processes from monomeric or oligomeric precursors (which are initiated thermally or photochemically with specific initiators). Polymers included in an EC composition are preferably either chemically and electrochemically inert or their reactions with other components of the EC composition should be reversible.

Additional elements such as, for example, phases that are not soluble in an EC composition may be included in the composition and may act as, for example, spacers; ion-selective or porous membranes (refraction index matched with the matrix); reference electrodes (e.g., Ag, Pt wires); auxiliary electrodes (e.g., Li anodes and cathodes); or a combination thereof.

A solvent can comprise a liquid phase of an EC composition or layer and may include at least one of the following: aprotic solvents, i.e. dialkylamides (e.g., DMF, DMAc, NMP, tetramethylurea, DMPU, DMI), lactones (e.g., GBL, GVL), carbonates (such as propylene carbonate (PC), ethylene carbonate (EC), dimethyl carbonate (DMC), diethyl carbonate (DEC), ethyl methyl carbonate (EMC), etc), ethers, esters, glycols, terminated poly(ethylene glycols), phosphates $(PO(OR)_3)$, nitriles (e.g., acetonitrile, benzonitrile, succinonitrile, glutaronitrile, adiponitrile, 3-alkoxypropionitriles), phosphoamides (e.g., hexamethyl phosphoramide HMPA)), silicones; ionic liquids (i.e., the supporting electrolyte); protic solvents: water, alcohols, poly(ethylene glycols), amides; or deep eutectic solvents (may act as auxiliary compounds and/or supporting electrolytes).

The solvent composition contributes to the rheology of an EC composition or layer, both at fabrication and in a final, assembled state, though it may be changed during the fabrication due to the removal or chemical conversion of the fabrication-modifying co-solvents. Examples of co-solvents include, without limitation, diluents (e.g., viscosity modifiers, solubility enhancers); or monomers/oligomers, which may be polymerized during the fabrication.

The viscosity of the solvent compositions may affect the mass transfer properties of an EC composition or layer, whereby the polarity and dielectric permeability affect the interfacial charge transfer.

Because ion transfer rates (expressed as the ionic conductivity) determine the intensities of the Frumkin effects and hence are to be tuned to optimize the operational voltages, "iris" effect severity, switching speed, power consumption, color properties and hence the overall performance of an EC device, an EC composition or layer may contain one or more soluble electrochemically inert (within the range of potentials used) salts as supporting electrolytes. Such supporting electrolytes include, but are not limited to, salts of alkali or alkali earth metals, ammonium (e.g., $NR_4^+$, $emim^+$, $bmim^+$, butylmethylpyrrolydone, pyridinium), phosphonium (e.g., $PR_4^+$, $PAr_4^+$), arsonium ($AsR_4^+$, $AsAr_4^+$) sulphonium ($SR_3^+$, $SAr_3^+$) with $AcO^-$, $ClO_4^+$, $BF_5^-$, $PF_6^-$, $PF_n(C_xF_{2x+1})_{5-n}$, $B(Ar)_4^-$, $B(Ar^F)_4^-$ $Al(OR)_4^-$, $Al(OR^F)_4^-$, complex borates (e.g., cyano-, oxalato-, etc), dicyanamide, alkyl-, aryl-, prefluoroarylsulfonates (e.g., $OTF^+$, $OMs^-$, $OTs^-$) and/or symmetric/non symmetric sulfonimides (e.g., $FTFSI^-$, $TFSI^-$, $FSI^-$) anions. In organic solvents, salts of weakly coordinating anions are preferable, nevertheless the composition is to be selected to optimize the ionic association properties and solubilities of minor ionic components of an EC composition or layer. In water, in addition, inorganic acids (e.g., sulfuric, perchloric), nitrates, sulfates, halides may be used as well. Salts or more complex ionic systems (e.g., deep eutectic solvents) that are liquid at operational conditions of an EC device ionic liquids may act like solvents, thus being the only liquid components of the electrolyte. The ionic strength of the electrolyte may determine the rheology of the EC layer at the fabrication, influencing on the viscosity, pot life, etc.

The mass transfer parameters of an EC composition or layer, including diffusion, convection/advection, and migration, depend on the rheology of the EC composition or layer. Introducing polymeric compounds into an EC composition or layer (to the liquid phase) may reduce the fluidity and mass transfer rates through the gelation (i.e., thickening) of the liquid phase. Moreover, the electrode-electrolyte interfacial adhesion may also be affected by the polymers introduced.

EC Gels

The electrochromic compositions and layers of the present disclosure can be in the form of a gel. Such a gel comprises a solid phase, e.g., a non-fluid colloidal network or polymer network that is expanded throughout its whole volume by a fluid, e.g. a liquid phase. The gel can have all of the optical and electrical attributes of the electrochromic composition or layer described above, including changing light transmission from one state to another state in response to an input signal.

In addition, the network degree, e.g., degree of cross-linking of a polymer material, gives a gel its structure and mechanical properties and hence selection of the polymer and network degree can provide an electrochromic composition or layer in the form of a gel with predetermined mechanic properties. In an aspect of the present disclosure, electrochromic compositions or layers in the form of a gel can have one or more predetermined values for one or more mechanical properties. Certain gels of the present disclosure exhibit effectively no flow under steady state at one atmospheric pressure and 20° C. In one aspect of the present disclosure, the electrochromic composition or layer in the form of a gel is sufficiently pliable to readily conform to a curved surface, such as a curved surface of a supporting substrate.

An electrochromic layer in the form of a gel can be fabricated by forming a polymer network phase within a liquid phase. The liquid phase or solid network phase includes one or more EC materials that can change light transmission from one state to another state in response to an input signal. In addition, and as described for an electrochromic composition or layer, the liquid phase can include one or more of a solvent, auxiliary compound, modifier, electrolyte, additional element or any combination thereof. The solid network phase can comprise, or formed from, a polymer such as those described for an EC composition or layer. In an aspect of the present disclosure, the solid network phase is formed in situ by crosslinking a composition comprising components that form a crosslinked polymer such as those polymers described for an EC composition or layer. For example, the solid network phase can be formed from UV or thermally curable organic compounds and/or curable alkoxysilanes components of a precursor electrochromic composition to form a gel. By using precursor components in an electrochromic composition to form a gel, the gel can be formed on a flexible substrate, e.g., a film such as a film comprised of a plastic, by depositing a layer of the precursor EC composition on to the flexible substrate and curing the composition to form a composite comprised of the EC gel and substrate. Such a composite can be used as a stand-alone component in the manufacture of an EC device.

An EC composition or layer, in a form of a gel, can have physical connection to adjacent components of an EC device. A gel is naturally tacky and creates a bond with neighboring surfaces. Additionally, to strengthen this bond, an interface between an electrochromic composition or layer in the form of a gel and an adjacent component of an EC device can be fortified by creating a chemical bond between the composition or layer and an adjacent component. That is, the network phase of an electrochromic layer in the form of a gel can include groups that can react with an electrode surface to adhere the gel to the surface.

In an aspect of the present disclosure, an electrochromic device can include an electrochromic layer disposed between a first and second optically transparent substrate of an EC device, wherein the electrochromic layer is bonded, e.g., chemically bonded, to either the first or second substrate or both. In an aspect of the present disclosure, a polymer in an EC layer may be designed to create a chemical bond with one or more substrates of an EC device including any electrodes and/or interface layer on the substrate and in direct contact with the EC layer. For example, one variant represents a polymer modified with alkoxysilanes, which can be hydrolyzed to hydroxysilane groups followed by covalent bonding to the surface of a substrate or its functional surfaces (electrode, interface layer, etc.) through the formation of ether bonds. The polymer can be formed from UV or thermally curable monomers, such as acrylates, acrylic acids, acrylonitriles, vinyl acetates, ethylene, etc. which incorporates one or more alkoxysilanes, such as an alkenyltrialkoxysilane, where the alkenyl can be a $C_2$-$C_6$ alkenyl group and the alkoxy groups can be comprised of lower ($C_1$-$C_4$) alkoxy. Another variant represents a UV or thermally curable polymer modified with acrylates containing trialkoxysilane pendant groups, e.g. a polymer formed from UV or thermally curable monomers which incorporates one or more acryltrialkoxysilanes as the alkoxysilane. Such alkoxysilanes that are incorporated in a polymer are suitable for subsequent bonding to an electrode surface. Alternatively, or in combination, the surface of the substrate (or its functional layers thereon) can be pre-modified by contact with functionalized silanes, for example 3-aminopropyltriethoxysilane, to form a monolayer of the functionalized silane on the electrode surface. The active groups, e.g., amino groups, of such functionalized silane are suitable for bonding with a polymer such as a polymer including nitrile, ether, or ester groups, for example. Hence, an EC composition or layer can be chemically bonded to an EC device (optically transparent substrates or its functional surfaces (electrode, interface layer)) by a substrate modified with functional groups in contact with the EC composition or layer and/or by a polymer modified with functional groups as a constituent of the EC composition or layer.

When included in an EC device, an electrochromic layer such as in the form of a gel can operate stably for long periods of time. As used herein a stable electrochromic layer such as in the form of a gel is one that can be cycled from high to low transition states with less than 10% of decay of transmission of visible light at 620 nm over 1,000 cycles. In certain aspects, electrochromic layers and/or gels of the present disclosure can be operational within a temperature range of −40° C. to 110° C.

An EC device including an electrochromic layer in the form of a gel advantageously can attenuate sound passing though the device. This can be beneficial for EC devices used as windows in building or on transporting vehicles, e.g., cars, buses, trains, etc. For example, road traffic can cause noise levels of 80 decibels (dB) or higher. The substrates of an EC device mitigate some of the noise that can pass through an EC device. However, including an EC layer in the form of a gel can attenuate sound by at least 10, 20, 30 40 50%, or more as compared to the same device with non-gel EC layer.

As described in reference to FIGS. 6 through 10 and elsewhere, electrochromic compositions of the present disclosure can be applied to an electrode interface layer in a variety of ways. Such electrochromic compositions can be prepared and disposed on a first optically transparent substrate having an OTE on a surface facing the composition or between a cavity defined by a first and second optically transparent substrates with or without OTEs on surfaces facing each other as follows:

(a) Liquid solution with one or more types of monomer(s), including monomers having more than one polymerizable group, and thermal radical initiator. At least one electrochromic compound, and at least one polymeric forming monomer and a thermal radical initiator are dissolved in a solvent in any order to form a solution. The solution can also include one or more supporting electrolyte, modifier, auxiliary compound, etc. The solution obtained preferably fills in a cavity between two electrode stacks. Upon thermal treatment, the initiator decomposes generating radicals and initiating radical polymerization of the monomers. The polymerization can result in the formation of interpenetrated polymer network and gelation of an EC layer.

(b) Liquid solution with one or more types of monomer(s), including monomers having more than one polymerizable group, and photochemical radical initiator. Electroactive compounds, supporting electrolyte, modifiers (e.g., UV-filter, antioxidant, thermal stabilizer, surfactant, etc.), monomers and photochemical radical initiator can be dissolved in a solvent in any order. The solution obtained can be dispensed into a cavity between two electrode stacks (a.k.a "cast in place" approach). Upon illumination the radical initiator decomposes generating radicals and initiating the radical polymerization of the monomer(s). The polymerization of monomers can result in the formation of interpenetrated polymer network and gelation of the EC layer.

(c) Liquid solution with one or more types of monomer(s), including monomers having more than one polymerizable group, that are susceptible to cationic polymerization and photochemical cationic initiator. Electroactive compounds, supporting electrolyte, modifiers (e.g., UV-filter, antioxidant, thermal stabilizer, surfactant, etc.), monomer(s) and photochemical cationic initiator can be dissolved in a solvent in any order. The dissolution of components can be carried out at room temperature or otherwise with heat, up to the boiling point of the solvent. The solution obtained can be dispensed into a cavity between two electrode stacks. Upon illumination ionization of the initiator occurs generating reactive cations and initiating the cationic polymerization of the monomer. The polymerization of monomers can result in the formation of interpenetrated polymer network and gelation of the EC layer.

(d) Liquid solution with additional volatile co-solvent. Electroactive compounds, supporting electrolyte, modifiers (e.g., UV-filter, antioxidant, thermal stabilizer, surfactant, etc.), polymer thickener can be dissolved in a primary high-boiling solvent. The dissolution of components can be carried out at room temperature or with heat up to the boiling point of the solvent. Otherwise, electroactive compounds, supporting electrolyte, modifiers (e.g., UV-filter, antioxidant, thermal stabilizer, surfactant, etc.) are dissolved in a primary high-boiling solvent in any order. The dissolution of components can be carried out at room temperature or with heat up to the boiling point of the solvent. The polymer thickener is dissolved in a volatile co-solvent at room temperature or with heat up to the boiling point of the co-solvent. The two solution are combined with formation of the final working solution. Other variants represent systems where dissolution of components in a high-boiling primary solvent or in a volatile co-solvent can be performed in any combination. The solution obtained can be applied to the surface of one electrode (i.e., anode or cathode) or on the surfaces of both electrodes by any of the application methods. The application method represents drop casting, spin-coating, blade coating, slot-die coating, screen printing, ink-jet printing or filling the basin. After evaporation of the volatile co-solvent the EC layer forms on the electrode surface.

(d.1) As an example of procedure (d) above, an electrochromic solution was made by dissolution of 5 wt. % of polymethylmethacrylate powder (d99=25 μm) in acetone with fast and vigorous mixing with an impeller. A solution of cathodic material in form of 1,1'-dimethyl-4,4'-bipyridinium bis(trifluoromethanesulfonyl)imide with molar concentration 0.1 M and anodic material in form of ferrocene with molar concentration 0.1 M in propylene carbonate was prepared and mixed with the solution of polymer in acetone. The final solution was applied to a polymer film carrier and dried to form an EC preform layer on the polymer film.

(e) Liquid colloid system in form of polymer sol can be formed containing a colloid of a polymer matrix in a solution of electroactive compound(s), cross-linking agent(s) and initiator(s).

(e.1) As an example of procedure (e) above, an electrochromic sol was made by dissolution of 13 wt. % of polymethylmethacrylate powder (d99=25 μm) in a solution of electrochromic compounds, supporting electrolyte, cross-linking agent and initiator in a mixture of ethylene carbonate and propylene carbonate with formation of viscous polymer sol. The aforementioned solution was prepared by dissolving of cathodic material in form of 1,1'-dimethyl-4,4'-bipyridinium bis(trifluoromethanesulfonyl)imide with molar concentration 0.1 M, anodic material in form of ferrocene with molar concentration 0.1 M, and supporting electrolyte in form of 1-ethyl-3-methylimidazolium bis(trifluoromethanesulfonyl)imide with molar concentration 0.3 M, ethylene glycol dimethacrylate with 10 wt. % and initiator in a form of dibenzoylperoxide in amount of 0.5 wt % in a 1:1 mixture of ethylene carbonate and propylene carbonate. The resulting sol was cast in the space between anodic and cathodic stacks and solidified by heating for 15 min at 120° C.

(f) Liquid dispersion of coarse polymer particles. Electrochromic compounds, supporting electrolyte, modifiers, at least one monomer and thermal radical initiator were dissolved in a solvent in any order. Polymer thickener was introduced in the prepared solution and thoroughly dispersed under agitation with ultrasound or mechanical homogenizer. The dispersion obtained can be disposed in an interior of an EC device, sealed and gelated by polymer swelling in the solvent upon heating, thus forming an EC layer. The rate of polymer swelling can be adjusted by the processing temperature, thus allowing the control over the dispersion viscosity.

(f.1) As an example of procedure (0 above, an electrochromic dispersion was made by intensive dispergation of 18 wt. % of polyacrylonitrile powder (d99=100 μm) in a solution of electrochromic compounds and supporting electrolyte in a mixture of ethylene carbonate and propylene carbonate with rotor-stator high-speed homogenizer. The aforementioned solution was prepared by dissolving of cathodic material in form of 1-methyl-1'-phenyl-4,4'-bipyridinium bis(trifluoromethanesulfonyl)imide with molar concentration 0.03 M, anodic material in form of 10-methylphenothiazine with molar concentration 0.03 M, and supporting electrolyte in form of 1-ethyl-3-methylimidazolium bis(trifluoromethanesulfonyl)imide with molar concentration 0.65 M in a 2.45:1 mixture of ethylene carbonate and propylene carbonate. The resulting dispersion was filled in an interior of an EC device and solidified by heating for 15 min at 120° C.

(f.2) As another example of procedure (f) above, an electrochromic dispersion was made by intensive dispergation of 18 wt. % of polyacrylonitrile powder (d99=100 μm) in a solution of electrochromic compounds and supporting electrolyte in a mixture of ethylene carbonate and propylene carbonate with rotor-stator high-speed homogenizer. The aforementioned solution was prepared by dissolving of cathodic material in form of 1-methyl-1'-phenyl-4,4'-bipyridinium bis(trifluoromethanesulfonyl)imide with molar concentration 0.03 M, anodic material in form of 10-methylphenothiazine with molar concentration 0.03 M, and supporting electrolyte in form of 1-ethyl-3-methylimidazolium bis(trifluoromethanesulfonyl)imide with molar concentration 0.3 M in a 1:1 mixture of ethylene carbonate and propylene carbonate. The resulting dispersion was laminated between two 100 μm PET films using two heated rolls. The gap between rolls was adjusted to 700 μm thus forming a uniform EC preform layer with a fixed 500 μm thickness.

(f.3) As another example of procedure (f) above, an electrochromic dispersion was made by intensive dispergation of 18 wt. % of polyacrylonitrile powder (d99=100 μm) in a solution of electroactive compounds and supporting electrolyte in a mixture of ethylene carbonate and propylene carbonate with rotor-stator high-speed homogenizer. The aforementioned solution was prepared by dissolving of a cathodic material in form of 1-methyl-1'-phenyl-4,4'-bipyridinium bis(trifluoromethanesulfonyl)imide with molar concentration 0.03 M, a anodic material in form of 10-methylphenothiazine with molar concentration 0.03 M, and a supporting electrolyte in form of 1-ethyl-3-methylimidazolium bis(trifluoromethanesulfonyl)imide with molar concentration 0.3 M in a 1:1 mixture of ethylene carbonate and propylene carbonate. The resulting dispersion was casted to a pretreated (corona treated) PET film using a Doctor Blade coating technique to form a uniform dispersion layer. The PET film with applied dispersion layer was heated in a convection oven to facilitate swelling and formation of an EC preform layer suitable for further lamination.

Examples of Electrochromic Compositions

Sample 1 (Blue)
  Matrix: PMMA-co-PMAA 30-45 wt. %, propylene carbonate.
  Diluents: chloroform, methylene chloride.
  Light-absorbing compounds precursors: ferrocene, dibenzylviologen/dimethylviologen perchlorate/tetrafluoroborate, 0.05 M.
  Supporting electrolyte: none.
  Fabrication: rolling, calendering.
  Additional elements: glass microspheres as spacers.
  Modifiers: none.

Sample 2 (Violet)
- Matrix: methyl methacrylate, methacrylic acid, methacrylic acid calcium salt co-polymer (VITAN-OS) 40-45 wt. %, propylene carbonate.
- Diluents: acetone, methylene dichloride, chloroform.
- Light-absorbing compounds precursors: ferrocene 0.1 M, C4-bisviologen tetrafluoroborate, 0.025 M, dimethylviologen tetrafluoroborate 0.05 M.
- Supporting electrolyte: none.
- Fabrication: rolling.
- Additional elements: none.
- Modifiers: none.

Sample 3 (Brown)
- Matrix: methyl methacrylate, methacrylic acid, methacrylic acid calcium salt co-polymer (VITAN-OS) 40-45 wt. %, propylene carbonate.
- Diluents: acetone, methylene dichloride, chloroform.
- Light-absorbing compounds precursors: 5,10-dimethyl-5,10-dihydrophenazine 0.1 M, C4-bisviologen tetrafluoroborate, 0.05 M.
- Supporting electrolyte: none.
- Fabrication: rolling.
- Additional elements: none.
- Modifiers: none.

Sample 4 (Black)
- Matrix: methyl methacrylate, methacrylic acid, methacrylic acid calcium salt co-polymer (VITAN-OS) 40-45 wt. %, propylene carbonate.
- Diluents: acetone, methylene dichloride, chloroform.
- Light-absorbing compounds precursors: 5,10-dimethyl-5,10-dihydrophenazine 0.1 M, C4-bisviologen tetrafluoroborate, 0.025 M, dimethylviologen tetrafluoroborate 0.05 M.
- Supporting electrolyte: none.
- Fabrication: rolling.
- Additional elements: none.
- Modifiers: none.

Sample 5 (Green)
- Matrix: methyl methacrylate, methacrylic acid, methacrylic acid calcium salt co-polymer (VITAN-OS) 40-45 wt. %, propylene carbonate.
- Diluents: acetone, methylene dichloride, chloroform.
- Light-absorbing compounds precursors: 5,10-dimethyl-5,10-dihydrophenazine 0.1 M, dimethylviologen tetrafluoroborate 0.05 M.
- Supporting electrolyte: none.
- Fabrication: rolling.
- Additional elements: none.
- Modifiers: none.

Sample 6 (Blue)
- Matrix: methyl methacrylate, methacrylic acid, methacrylic acid calcium salt co-polymer (VITAN-OS) 40-45 wt. %, propylene carbonate.
- Diluents: acetone, methylene dichloride, chloroform.
- Light-absorbing compounds precursors: ferrocene, dimethylviologen tetrafluoroborate, 0.05 M.
- Supporting electrolyte: none.
- Fabrication: rolling.
- Additional elements: none.
- Modifiers: none.

Sample 7 (Blue)
- Matrix: methyl methacrylate, methacrylic acid, methacrylic acid calcium salt co-polymer (VITAN-OS) 35 wt. %, propylene carbonate, poly(ethylene glycol)-400.
- Diluent: acetone.
- Light-absorbing compounds precursors: ferrocene, dimethylviologen tetrafluoroborate 0.05 M.
- Supporting electrolyte: none.
- Fabrication: slot-die coating on PET/metal mesh/CNT electrodes, hot air drying, lamination.
- Additional elements: none.
- Modifiers: Agidol-1 (antioxidant), Milestab 9 (UV-stabilizer).

Sample 8 (Blue)
- Matrix: methyl methacrylate, methacrylic acid, methacrylic acid calcium salt co-polymer (VITAN-OS) 30 wt. %, propylene carbonate, poly(ethylene glycol)-400.
- Diluent: acetone.
- Light-absorbing compounds precursors: ferrocene, dimethylviologen-TFSI 0.09 M.
- Supporting electrolyte: none.
- Fabrication: slot-die coating on PET/metal mesh/CNT electrodes, hot air drying, diluent evaporation, lamination.
- Additional elements: none.
- Modifiers: Agidol-1 (antioxidant), Milestab 9 (UV-stabilizer).

Sample 9 (Blue)
- Matrix: methyl methacrylate, methacrylic acid, methacrylic acid calcium salt co-polymer (VITAN-OS) 23 wt. %, propylene carbonate, poly(ethylene glycol)-400.
- Diluent: none.
- Light-absorbing compounds precursors: ferrocene, dimethylviologen-TFSI 0.08 M.
- Supporting electrolyte: none.
- Fabrication: Dr. blade polymer dispersion coating on PET/metal mesh/CNT electrodes, hot air drying, lamination.
- Additional elements: none.
- Modifiers: Agidol-1 (antioxidant), Milestab 9 (UV-stabilizer).

Sample 10 (Blue)
- Matrix: polyacrylonitrile (PAN), Mw=150 k, 35 wt. %, classified, <15 μm fraction, propylene carbonate.
- Diluent: none.
- Light-absorbing compounds precursors: ferrocene, dimethylviologen-TFSI 0.03 M.
- Supporting electrolyte: emimTFSI, 0.1 M.
- Fabrication: Dr. blade polymer dispersion coating on PET/metal mesh/CNT electrodes, hot air drying, lamination.
- Additional elements: none.
- Modifiers: none.

Sample 11 (Black)
- Matrix: polyacrylonitrile (PAN), Mw=150 k, 35 wt. %, classified, <15 μm fraction, propylene carbonate.
- Diluent: none.
- Light-absorbing compounds precursors: C4-bisviologen-TFSI 0.013 M, dimethylviologen-TFSI 0.025 M, 5,10-dimethyl-5,10-dihydrophenazine 0.054 M.
- Supporting electrolyte: none.
- Fabrication: Dr. blade polymer dispersion coating on PET/metal mesh/CNT electrodes, hot air drying, lamination.
- Additional elements: none.
- Modifiers: none.

Sample 12 (Blue)
- Matrix: polyacrylonitrile (PAN), Mw=150 k, 22 wt. %, classified, <15 μm fraction, propylene carbonate:ethylene carbonate 1:2.45 (mol).
- Diluent: none.
- Light-absorbing compounds precursors: ferrocene, dimethylviologen-TFSI 0.04 M.
- Supporting electrolyte: emimTFSI, 0.5 M.

Fabrication: Dr. blade polymer dispersion coating on PET/metal mesh/CNT electrodes, hot air drying, lamination.
Additional elements: none.
Modifiers: none.

Sample 13 (Black)
Matrix: polyacrylonitrile (PAN), Mw=150 k, 22 wt. %, classified, <15 μm fraction, propylene carbonate:ethylene carbonate 1:2.45 (mol).
Diluent: none.
Light-absorbing compounds precursors: diphenylviologen-TFSI 0.003 M, dimethylviologen-TFSI 0.015 M, 10-methylphenothiazine 0.03 M.
Supporting electrolyte: emimTFSI, 0.4 M.
Fabrication: cast-in-place IGU filling (FTO/ITO glass).
Additional elements: none.
Modifiers: none.

Sample 14 (Black)
Matrix: polyacrylonitrile (PAN), Mw=150 k, 22 wt. %, non-classified, <100 μm fraction, propylene carbonate: ethylene carbonate 1:2.45 (mol).
Diluent: none.
Light-absorbing compounds precursors: dimethylviologen-TFSI 0.009 M, tritolylamine 0.006 M, N,N'-Bis(4-methoxy-2-methylphenyl)-N,N'-diphenylbenzidine 0.003 M.
Supporting electrolyte: emimTFSI, 0.4 M.
Fabrication: cast-in-place IGU filling (FTO/ITO glass).
Additional elements: none.
Modifiers: none.

Sample 15 (Blue)
Matrix: polyacrylonitrile (PAN), Mw=150 k, 22 wt. %, non-classified, <100 μm fraction, propylene carbonate: ethylene carbonate 1:2.45 (mol).
Diluent: none.
Light-absorbing compounds precursors: dimethylviologen-TFSI 0.005 M, tritolylamine 0.005 M.
Supporting electrolyte: emimTFSI, 0.4 M.
Fabrication: cast-in-place IGU filling (FTO/ITO glass).
Additional elements: none.
Modifiers: none.

Sample 16 (Black)
Matrix: polyacrylonitrile (PAN), Mw=150 k, 18 wt. %, non-classified, <100 μm fraction, propylene carbonate: ethylene carbonate 35:65 (mol).
Diluent: none.
Light-absorbing compounds precursors: methylphenylviologen-TFSI 0.03 M, 10-methylphenothiazine 0.03 M.
Supporting electrolyte: emimTFSI, 0.65 M.
Fabrication: cast-in-place IGU filling (FTO/ITO glass).
Additional elements: none.
Modifiers: none.

Sample 17 (Violet)
Matrix: polyacrylonitrile (PAN), Mw=150 k, 18 wt. %, non-classified, <100 μm fraction, propylene carbonate: ethylene carbonate 35:65 (mol).
Diluent: none.
Light-absorbing compounds precursors: dimethylviologen-TFSI 0.03 M, 10-methylphenothiazine 0.03 M.
Supporting electrolyte: emimTFSI, 0.65 M.
Fabrication: cast-in-place IGU filling (FTO/ITO glass).
Additional elements: none.
Modifiers: none.

Sample 18 (Bluish Green)
Matrix: polyacrylonitrile (PAN), Mw=150 k, 18 wt. %, non-classified, <100 μm fraction, propylene carbonate: ethylene carbonate 35:65 (mol).
Diluent: none.
Light-absorbing compounds precursors: N,N,N',N'-tetraphenylphenylenediamine 0.005 M, dimethylviologen-TFSI 0.005 M.
Supporting electrolyte: emimTFSI, 0.4 M.
Fabrication: cast-in-place IGU filling (FTO/ITO glass).
Additional elements: none.
Modifiers: none.

Sample 19 (Brown)
Matrix: polyacrylonitrile (PAN), Mw=150 k, 18 wt. %, non-classified, <100 μm fraction, propylene carbonate: ethylene carbonate 35:65 (mol).
Diluent: none.
Light-absorbing compounds precursors: dimethylviologen-TFSI 0.004 M, N,N'-Bis(4-methoxy-2-methylphenyl)-N,N'-diphenylbenzidine 0.004 M.
Supporting electrolyte: emimTFSI, 0.4 M.
Fabrication: cast-in-place IGU filling (FTO/ITO glass).
Additional elements: none.
Modifiers: none.

Sample 20 (Red)
Matrix: polyacrylonitrile (PAN), Mw=150 k, 18 wt. %, non-classified, <100 μm fraction, propylene carbonate: ethylene carbonate 35:65 (mol).
Diluent: none.
Light-absorbing compounds precursors: C4-bisviologen-TFSI 0.015 M, 10-methylphenothiazine 0.015 M.
Supporting electrolyte: emimTFSI, 0.65 M.
Fabrication: cast-in-place IGU filling (FTO/ITO glass).
Additional elements: none.
Modifiers: none.

An electrochromic composition sample was analyzed quantitatively for color and haze using a HunterLab UltraScan PRO spectrophotometer having a D65 illumination source and operated with a 10 degree standard observer. The results are provided in the table below.

| ID (598) | L* | a* | b* | Haze % D65/10 | Y Total D65/10 | Y Diffuse D65/10 |
|---|---|---|---|---|---|---|
| Bleached state | 86.84 | 1.26 | 6.48 | 7.94 | 69.68 | 5.53 |
| Black at 1.2 V | 49.91 | −15.65 | 24.75 | 7.56 | 18.34 | 1.39 |
| Black at 1.3 V 0.09 A | 0.15 | 0.2 | 0 | N/A— too dark | 0.02 | 0.01 |

Electrochromic devices, components thereof and systems and methods for controlling electrochromic devices have been described as well as electrochromic materials, compositions, layers, gels and fabrication of the foregoing. Provided below are certain aspects of the present disclosure, which include:

A. An electrochromic device comprising: a first electrode, second electrode (e.g., an anode and a cathode) and an electrochromic composition including one or more electrochromic materials; wherein at least one of the one or more electrochromic materials undergoes electron exchange only at either the first electrode or at the second electrode. Either or both of the first electrode or the second electrode comprise a semiconductor material at an interface with the electrochromic composition. Further, the first electrode includes a material that is different than a material of the second electrode. In some embodiments, the electrochromic composition is disposed between and in contact with the first electrode and second electrode and configured to change light transmission from one state to another state in response to an input signal between the electrodes, .e.g., change visible light transmission from one state to another state in response to an input signal. The first electrode, second electrode, and electrochromic composition can define a variable transmittance layer (VTL) and the VTL can have electrical properties that are different in a central portion of the VTL than in a periphery of the VTL. In other embodiments, the electrochromic composition includes a cathodic compound and an anodic compound as the one or more electrochromic materials and wherein either or both of the first electrode or the second electrode selectively allows reducing and oxidizing substantially only the cathodic compound and/or its reduced forms, while substantially prohibiting reduction and oxidation of the anodic compound. In Further embodiments, the electrochromic composition includes a cathodic compound and an anodic compound as the one or more electrochromic materials and wherein either or both of the first electrode or the second electrode selectively allows reducing and oxidizing substantially only the anodic compound and/or its oxidized forms, while substantially prohibiting reduction and oxidation of the cathodic compound.

B. An electrochromic device comprising: a first electrode, a second electrode, an electrochromic composition therebetween (e.g., a cathode, anode and electrochromic composition therebetween), and a selectively permeable membrane within the electrochromic composition and disposed between the two electrodes. The membrane can substantially allow permeation of small molecules, e.g., small ions, but substantially prohibits permeation of large molecules, e.g., large ions. For example, the membrane can substantially allow permeation of protons but substantially prohibits permeation of ions larger than protons. In some embodiments, the membrane can have a center portion and a peripheral portion, wherein the center portion has a higher permeability than the peripheral portion. In other embodiments, the cathode electrode, anode electrode, electrochromic composition define a variable transmittance layer (VTL), wherein the VTL has electrical properties that are substantially different in a center of the VTL than in a periphery of the VTL.

C. An electrochromic device comprising: a first optically transparent substrate; a second optically transparent substrate; an electrochromic composition disposed between the first and second optically transparent substrates, wherein the first optically transparent substrate, the second optically transparent substrate and the electrochromic composition therebetween define an optical path for light transmittance; a first electrode on either or both of the first or the second optically transparent substrates; a second electrode located outside of the optical path; and wherein the electrochromic composition is configured to change light transmission from one state to another state in response to an input signal between the first and second electrodes. The first electrode can be an anode electrode and the second electrode can be a cathode electrode; and/or the first electrode can be on both of the first and second optically transparent substrates; and/or the first electrode can be an optically transparent electrode; and/or the second electrode is not optically transparent.

D. An electrochromic device comprising an edge, wherein the edge is exposed to an inert atmosphere. The electrochromic device can further comprise a substrate having the edge exposed to the inert atmosphere and a second optically transparent substrate having a second edge that is not exposed to the inert atmosphere; and/or the electrochromic device can further comprise a first optically transparent substrate with a first optically transparent electrode disposed thereon and having the edge exposed to the inert atmosphere; a second substrate with a second optically transparent electrode disposed thereon; and an electrochromic composition disposed between the first and the second substrates; and/or the first optically transparent substrate can be in the form of a flexible film. The electrochromic device comprising an edge can be part of an insulated glass unit (IGU). Such an insulated glass unit can comprise a first glass substrate and a second glass substrate which define a volume therebetween and which volume can include an inert atmosphere and the electrochromic device comprising the edge, wherein at least one of the first glass substrate or the second glass substrate is not in electrical communication with the electrochromic device. The IGU can further comprise a third glass substrate spaced apart from the second glass substrate and defining a second volume E. An optically transparent substrate comprising: a first major surface with a optically transparent electrode; a second major surface; an edge between the first and second major surfaces; and an electrically conductive strip in electrical contact with the optically transparent electrode and disposed over the edge. In some embodiments, the electrically conductive strip is in electrical contact with the optically transparent electrode and disposed over the edge and on the second surface of the substrate. The optically transparent substrate can further comprise a second electrically conductive element in electrical contact with the electrically conductive strip on the second surface of the substrate; and/or a second electrically conductive element in electrical contact with the electrically conductive strip and optionally on the second surface of the substrate. The second electrically conductive element can comprise a metal, e.g., copper or copper alloy or aluminum or aluminum alloy. An insulation layer can be disposed over the electrically conductive strip, the edge and/or the second electrically conductive element. The second electrically conductive element can have a thickness of greater than 50 microns. In some embodiments, the edge can have a smooth, rounded, shaped. The optically transparent substrate of aspect E can be included as an optically transparent substrate in an EC device such as any of the EC devices of the present disclosure. In some embodiments, an electrochromic device having the optically transparent substrate of aspect E, can further comprise a second optically transparent substrate and an electrochromic layer between the optically transparent substrate and the second optically transparent substrate. Such an electrochromic layer can have a thickness and the second conductive element can have a thickness that is greater than the thickness of the electrochromic layer.

F. An electrochromic device comprising: a first optically transparent substrate with a first electrode on a surface thereon; a second optically transparent substrate; an electrochromic composition disposed between the first and second substrates and in contact with the first electrode and configured to change light transmission from one state to another state in response to an input signal; a sealing element to seal the electrochromic composition between the first and second substrates; and a passivation layer disposed between the first electrode and the sealing element, wherein the passivation layer directly contacts the first electrode and the sealing element. In some embodiments, the passivation layer directly contacts the first electrode, the sealing element and the electrochromic composition. The passivation layer can prevent the sealing element from simultaneously contacting at any one location the first electrode and electrochromic composition. The second optically transparent substrate can have a second electrode on a surface thereon and the electrochromic device can further comprise a second passivation layer disposed between the second electrode and the sealing element; the second passivation layer can directly contact the second electrode and the sealing element and optionally the electrochromic composition. The second passivation layer can prevent the sealing element from simultaneously contacting at any one location the second electrode and electrochromic composition. The device can further comprise an electrically conductive strip in direct and electrical contact with the first and/or second electrode, wherein the passivation layer can extend over the electrically conductive strip. The first optically transparent substrate can have an opposite surface from the surface with the first electrode and an edge between the surfaces and the electrically conductive strip can be disposed over the edge and optionally on the second surface of the first substrate. The second optically transparent substrate can have an opposite surface from the surface with the second electrode and an edge between the surfaces and the second electrically conductive strip can be disposed over the edge and optionally on the second surface of the second substrate. The passivation layer can comprise a silicon oxide. The sealing element comprises an elastomer, fluoropolymer, a silicone, a polyamide, a butyl rubber, a polysulfide, an epoxy or combinations thereof. The device can comprise a secondary seal between the first optically transparent substrate and the second optically transparent substrate and/or disposed around at least part of a perimeter of the first and second substrates, wherein the secondary seal does not contact the electrochromic composition.

G. A system for controlling an electrochromic device comprising a first substrate having a first electrode, a second substrate having a second electrode, and an electrochromic composition disposed between the first and the second substrates, the system comprising: a controller operably connected to the first and second electrodes of the electrochromic device; and voltage read-out terminals disposed on each of the first and second substrates, the voltage read-out terminals being operably connected to the controller. The controller can further comprise a processor configured to determine an electrical signal to be applied to the electrodes using a feedback algorithm, such algorithm using a difference between a desired open circuit voltage across the voltage read-out terminals and an open circuit voltage measured at the voltage read-out terminals as a control variable. In some embodiments, the feedback algorithm is a proportional-integral-derivative (PID) feedback algorithm, and the proportional (P), integral (I) and derivative (D) coefficient values used in the PID algorithm are dependent on physical and chemical characteristics of the electrochromic composition. In other embodiments, the feedback algorithm is a proportional-integral-derivative (PID) feedback algorithm, and the proportional (P), integral (I) and derivative (D) coefficient values used in the PID algorithm are dependent on physical and chemical characteristics of the first and the second electrodes. The electrical signal can be selected among a constant current, constant voltage, a current function, a voltage function, or a combination thereof. The desired open circuit voltage can be determined based on a desired optical state of the electrochromic composition. The desired open circuit voltage can be determined based on a selected wavelength band within an optical spectrum. For example, the desired optical state of the electrochromic composition can be determined based on a desired wavelength band within an infrared spectrum. In still further embodiments, such systems can further comprise a sensor configured to measure energy consumption of a structure in which the electrochromic device is disposed, wherein the processor is further configured to determine the desired open circuit voltage based on the measured energy consumption. Alternatively, or in combination, such systems can further comprise a sensor configured to measure luminance in an interior space of a structure in which the electrochromic device is disposed, wherein the processor is further configured to determine the desired open circuit voltage based on the measured luminance. In other embodiments, the desired open circuit voltage can be determined based on ambient light luminance or ambient temperature at a geographical location at which the electrochromic device is present. Further, the electrical signal can comprise a charging sequence including one selected from constant current with overvoltage control, constant voltage with overcurrent control, a current function, and a voltage function.

H. A method for controlling an electrochromic device comprising a first substrate having a first electrode, a second substrate having a second electrode, and an electrochromic composition disposed between the first and the second substrates, the method comprising:
applying an electrical signal across the electrochromic composition using the first and second electrodes; measuring an open circuit voltage across the electrochromic composition; determining an error signal based on a difference between the measured open circuit voltage and a desired open circuit voltage, the desired open circuit voltage being predetermined based on a desired optical state of the electrochromic composition; using a feedback algorithm, determining a corrected electrical signal to be applied across the electrochromic composition based on the error signal until the error signal reaches a threshold value. The open circuit voltage can be measured at the voltage read-out terminals disposed on each of the first and second substrates, the voltage read-out terminals being operably connected to the controller, for example. The feedback algorithm can comprise a proportional-integral-derivative (PID) feedback algorithm, and the proportional (P), integral (I) and derivative (D) coefficient values used in the PID algorithm are dependent on physical and chemical characteristics of the electrochromic composition. Alternatively or in combination, the feedback algorithm can be a proportional-integral-derivative (PID) feedback algorithm, and the proportional (P), integral (I) and derivative (D) coefficient values used in the PID algorithm are dependent on physical and chemical characteristics of the first and second electrodes. The set point of the feedback algorithm can be determined, for example, based on desired optical state of the electrochromic composition or a selected wavelength band within an optical or infrared spectrum of the electrochromic composition. Alternatively, the set point of the feedback algorithm can be determined based on ambient light luminance or ambient temperature at a geographical location at which the electrochromic device is present. The electrical signal can comprise a charging sequence including one selected from constant current with overvoltage control, constant voltage with overcurrent control, a current function, and a voltage function. In another embodiment, the set point of the feedback algorithm can determined based on a measured energy consumption of a structure in which the electrochromic device is disposed. In a still further embodiment, the set point of the feedback algorithm can be determined based on a measured luminance in an interior space of a structure in which the electrochromic device is disposed. In a still further embodiment, the electrochromic composition is configured to change visible and/or infrared light transmission from one state to another state in response to the electrical signal.

I. An electrochromic material comprising a compound of formula (I):

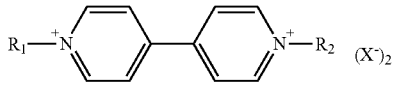

wherein $R_1$ and $R_2$ are the same and represent a $C_{1-7}$ alkyl, benzyl, phenyl, or phenyl having one or more substituents, wherein the one or more substituent are a $C_{1-4}$ alkyl, a $C_{1-4}$ perfluoroalkoxy, trifluoromethoxy, or a halogen atom and $X^-$ represents an organic anion. In some embodiments, $R_1$ and $R_2$ represent a $C_{1-7}$ alkyl. In other embodiments, $R_1$ and $R_2$ represent phenyl having one or more substituents on a 3, 4, and/or 5 position of the phenyl. For example, $R_1$ and $R_2$ can represent phenyl having two or more substituents, e.g., two or more $C_{1-7}$ alkyl substituents, on a 3, 4, and/or 5 position of the phenyl; $R_1$ and $R_2$ can represent phenyl having the substituent on a 4 position of the phenyl, e.g., $R_1$ and $R_2$ can represent phenyl having a $C_{1-4}$ alkyl, a $C_{1-4}$ perfluoroalkoxy, trifluoromethoxy, or a halogen atom substituent on a 4 position of the phenyl. $X^-$ can be or comprise the organic anion of $(CF_3SO_2)_2N^-$. Such electrochromic materials can be included in an electrochromic device.

J. An electrochromic material comprising a compound of formula (I)

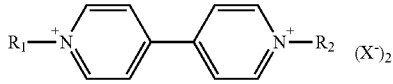

wherein $R_1$ and $R_2$ are different and individually represent an alkyl, unsubstituted or substituted with one or more of phenyl, halogen atom, a 4,4'-bipyridinium, which can be substituted with an alkyl, a benzyl, phenyl, or phenyl substituted with one or more of an alkyl, a haloalkyl, a halogen atom, an alkoxy, a halogenated alkoxy, a pentafluorosulfanyl, or a cyano, and $X^-$ represents an anion. In some embodiments, $R_1$ can represent a $C_{1-7}$ alkyl and $R_2$ represents a phenyl or a phenyl substituted with one or more of an alkyl, a haloalkyl, a halogen atom, an alkoxy, a halogenated alkoxy, a pentafluorosulfanyl, or a cyano. In other embodiments, $R_1$ can represent a $C_{1-7}$ alkyl and $R_2$ can represent a phenyl or a phenyl having one or more substituents on a 3, 4, and/or 5 position of the phenyl. For example, $R_2$ can represent a phenyl having two or more substituents on a 3, 4, and/or 5 position of the phenyl; $R_2$ can represent a phenyl having two substituents, e.g., two $C_{1-7}$ alkyl substituents, on a 3 and 5 position of the phenyl; $R_2$ can represent a phenyl having the substituent on a 4 position of the phenyl. Such electrochromic materials can be included in an electrochromic device.

K. An electrochromic composition comprising: a cathodic material comprising one or more compounds of formula (I)

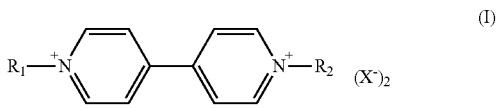

wherein $R_1$ and $R_2$ are the same or different and individually represent a substituted or unsubstituted alkyl, a benzyl, substituted or unsubstituted phenyl, and $X^-$ represents an anion; a solvent; and optionally a polymeric material. The cathodic material can include two or more compounds that are matched to produce gray scale visible light. In some embodiments, $R_1$ can represent a $C_{1-7}$ alkyl and $R_2$ represents a phenyl or a phenyl substituted with one or more of an alkyl, a haloalkyl, a halogen atom, an alkoxy, a halogenated alkoxy, a pentafluorosulfanyl, or a cyano. In other embodiments, $R_1$ can represent a $C_{1-7}$ alkyl and $R_2$ can represent a phenyl or a phenyl having one or more substituents on a 3, 4, and/or 5 position of the phenyl. For example, $R_2$ can represent a phenyl having two or more substituents on a 3, 4, and/or 5 position of the phenyl; $R_2$ can represent a phenyl having two substituents, e.g., two $C_{1-7}$ alkyl substituents, on a 3 and 5 position of the phenyl; $R_2$ can represent a phenyl having the substituent on a 4 position of the phenyl. $X^-$ can represent trifluoromethanesulfonylimide $(CF_3SO_2)_2N^{--}$. The composition can further include an anodic material comprising one or more of a ferrocene, a 5,10-dihydrophenazine, a polyarylamine, tritolylamine, a phenothiazine, methyl-phenyl-thiazine, or a benzidine. Such electrochromic compositions can be included in an electrochromic device.

L. An electrochromic composition in the form of a gel comprising a solid network phase and a liquid phase, wherein the electrochromic composition can change light transmission from one state to another state in response to an input signal. The gel can be sufficiently pliable to readily conforms to a curved surface. In certain aspects, the gel exhibits effectively no flow under steady state at one atmospheric pressure and 20° C. In some embodiments, the gel can have a transmittance of less than 1% in the one state and a transmittance of at least 50% in the other state over a visible spectrum. In other embodiments, the electrochromic composition can continuously change light transmission from one state to one or more other states in response to one or more input signals. In further embodiments, the change in light transmission occurs at UV and/or IR wavelengths. In still further embodiments, the electrochromic composition can include one or more components that can change light transmission from one state to another state in response to an input signal and one or more of a radiation filter, additive element, supporting electrolyte, or a combination thereof. In certain respects, the one or more radiation filter, additive, or electrolyte comprise an organic material. In other embodiments, the gel can be operational within a temperature range of −40° C. to 110° C.; or can absorb no less than about 50% of UV or IR wavelengths; or can attenuate sound by at least 50%; or can have low haze.

The gel can have an electrical property set to a predetermined value. For example, the gel changes light transmittance from one state to another state with a current consumption of less than about 50 uA/cm², or with a power consumption of less than about 0.25 W/m². In other embodiments, the gel can change light transmittance from one state to another state in response to an input signal as a voltage of less than about 1.5V. The gel can be substantially bistable. The gel can change light transmittance from one state to another state in response to an input signal at one or more current, voltage, or power values below a predetermined value during the transition from one state the other state.

In other embodiments, the electrochromic composition can change light transmission from the one state to the another state in less than or equal to 30 seconds. In some embodiments, the solid network phase includes groups that can react with an electrode surface to adhere the gel to the surface. In other embodiments, the solid network phase can include groups that can react with an electrode surface to adhere the gel to the surface. In still further embodiments, the gel is formed from a composition including a liquid phase and precursors to form the solid network phase. In certain aspects, the precursors can include UV or thermally curable organic compounds or curable alkoxysilanes. The gel can be an EC preform layer such as an EC layer in the form of a gel disposed on one or more films, e.g., an optically transparent film and/or disposed between two or more films. Such electrochromic gels can be included in an electrochromic device.

M. A process for making an electrochromic gel, the process comprising: forming a solid network phase within a liquid phase; wherein the liquid phase or solid network phase includes one or more components that can change light transmission from one state to another state in response to an input signal. Forming the solid network phase can include crosslinking a composition comprising components to form the solid network phase. Such components can include UV or thermally curable organic compounds or curable alkoxysilanes. In some embodiments, the electrochromic gel can be formed in a layer having electrical properties that are substantially different in different areas of the layer. For example, the formed layer can have electrical properties that are substantially higher in a center area than a periphery area of the layer. The change in electrical conductivity from the center area to the periphery area can be abrupt or continuous. Additional embodiments include forming the gel as a preform layer, .e.g., introducing an electrochromic composition, which includes polymer network forming components in a solvent, on one or more flexible substrates to form a preform layer on a flexible substrate or between multiple flexible substrates. A preform layer can be disposed between a first optically transparent substrate and a second optically transparent substrate. In other embodiment, the preform layer can be cured to form a gel such as by exposing the preform to any one or more of time, temperature, pressure, UV exposure, exposure to chemical or physical agents, etc. or combinations thereof.

N. An electrochromic device comprising: a first optically transparent substrate with a first electrode; a second optically transparent substrate; an electrochromic composition in the form of a gel or layer disposed between the first and second substrates and configured to change light transmission from one state to another state in response to an input signal. The electrochromic composition can include the components and features described for aspect I, J and/or K in any combination. In some embodiments, the electrochromic composition can be in the form of a gel. The gel or layer can include all of the elements and features of aspect L in any combination. In some embodiments, the electrochromic gel or layer can be chemically bonded to either the first or second substrate or both. In other embodiments, at least either the first substrate or second substrate can be chemically functionalized to promote bonding of the electrochromic gel or layer thereto. In still further embodiments, the electrochromic gel or layer can be chemically functionalized to promote bonding to at least either the first substrate or second substrate. Further, an electrochromic composition in the form of a gel or layer in an electrochromic device can have compositional properties, e.g., electrical conductivity, that are different in different areas of the gel or layer in a lateral direction of the gel or layer. The compositional properties, e.g., electrical conductivity, can change step-wise in the different areas and/or can change continuously in the different areas. In addition, the electrochromic composition can include electrochromic materials that are spectrally matched to produce substantially gray scale color of transmitted or reflected light through or from the electrochromic composition such as when the color deviations of the transmitted or reflected light through or from the electrochromic composition are less than 10 units, e.g., less than 5 units, of a* and b* axis for CIELAB color space.

O. A method of fabricating an electrochromic device comprising: disposing an electrochromic layer between a first optically transparent substrate and a second optically transparent substrate, wherein the electrochromic layer is configured to change light transmission from one state to another state in response to an input signal; and bonding the electrochromic layer to either the first or second substrate or both. The electrochromic composition can include the components and features described for aspect I, J and/or K in any combination. In some embodiments, the electrochromic composition can be in the form of a gel. The gel or layer can include all of the elements and features of aspect L in any combination. In some embodiments, the electrochromic gel or layer can be chemically bonded to either the first or second substrate or both. In other embodiments, at least either the first substrate or second substrate can be chemically functionalized to promote bonding of the electrochromic gel or layer thereto. In still further embodiments, the electrochromic gel or layer can be chemically functionalized to promote bonding to at least either the first substrate or second substrate. In other embodiments, disposing the electrochromic layer between the first and second optically transparent substrates can include dispensing a metered amount of an electrochromic composition on the first optically transparent substrate which includes a dam thereon substantially around a perimeter thereof, placing the second optically transparent substrate on the electrochromic composition and curing the electrochromic composition to form an electrochromic layer. In some embodiments, disposing the electrochromic layer between the first and second optically transparent substrates can include dispensing a metered amount of an electrochromic composition having an area on the first optically transparent substrate, placing the second optically transparent substrate on the electrochromic composition and forcing the electrochromic composition to spread over the first optically transparent to form the electrochromic layer having an area that is significantly greater than the area of the dispensed electrochromic composition. In still further embodiments, disposing the electrochromic layer between the first and second optically transparent substrates can include disposing an EC preform layer on the first optically transparent substrate, placing the second optically transparent substrate on the EC preform layer.

Each of the forgoing aspects can include one or more of the following additional elements in any combination.

Element 1: wherein either or both of the first or second electrode, e.g., the cathode or anode electrode, comprises a semiconductor material at an interface with the electrochromic composition. Element 2: wherein one or more electrochromic materials undergo electron exchange only at either the first electrode or at the second electrode. Element 3: wherein the electrochromic composition can be disposed between and/or in contact with the first and second electrode. Element 4: wherein the electrochromic composition is configured to change visible and/or infrared light transmission from one state to another state in response to an input signal. Element 5: an EC device can include a selectively permeable membrane within an electrochromic composition and disposed between a first and second electrode, e.g., an cathode electrode and anode electrode. Element 6: wherein the membrane substantially allows permeation of small molecules, e.g. small ions, but substantially prohibits permeation of large molecules, e.g., ions. Element 7: wherein the membrane substantially allows permeation of protons but substantially prohibits permeation of ions larger than protons. Element 8: wherein the membrane has a center portion and a peripheral portion and wherein the center portion has a higher permeability than the peripheral portion. Element 9: an electrochromic layer or gel has electrical properties that are substantially different in a center area of the layer or gel than in a periphery area of the layer or gel. In certain aspects, the change in electrical conductivity can be abrupt, e.g., change in step-wise fashion, or continuous. Such an electrochromic layer or gel can be included in an EC device. Element 10: wherein an EC device includes a first and second electrode, e.g., a cathode electrode, anode electrode, and an electrochromic composition, layer or gel, to define a variable transmittance layer (VTL), and wherein the VTL has electrical properties that are substantially different in a center of the VTL than in a periphery of the VTL. In certain aspects, the change in electrical conductivity of the VTL can be abrupt, e.g., change in step-wise fashion, or continuous.

Element 11: wherein the electrochromic composition is in the form of a layer and/or gel. This element can also include all of the components and features set out for aspects I, J, K, L and/or can be included in an EC device. Element 12: wherein one or more optically transparent electrodes have a sheet resistance of below 100 Ohms/square such as below about 50 Ohms/square and below about 20 Ohms/square, e.g., below about 5 Ohms/square. Element 13: wherein the first or second optically transparent substrate, or the electrochromic composition, layer or gel, has low haze. Element 14: wherein an electrochromic device further includes a heating element to defog the substrate. Element 15: wherein an electrochromic device further comprises a controller to apply an input signal to cause an electrochromic composition to change light transmission from one state to another state. The controller can be electrically connected to electrodes of an EC device by distributed, multi-point electrical connections to minimize ohmic drops across the electrodes and/or the controller can be configured to operate both electrodes at ion-transfer limiting conditions of the electrochromic composition. Element 16: wherein the first and/or the second optically transparent substrate can be in the form of a flexible film. Element 17: wherein the first and/or the second optically transparent substrate comprises a first tempered or heat treated glass sheet laminated to a second tempered or heat treated glass sheet with peaks of the first tempered or heat treated glass sheet matched generally against valleys of the second tempered or heat treated glass sheet. Element 18: wherein the first and/or the second optically transparent substrate polarizes light or includes a layer thereon that polarizes light. Element 19: wherein the thickness of an electrochromic layer in an EC device is greater than 50 microns.

Element 20: wherein the controller is configured to operate in a reagent mass-transfer limiting mode. Element 21: wherein the first and/or second electrode have a multilayered arrangement. Element 22: wherein the first and/or second optically transparent electrode is configured to reflect IR radiation. Element 23: wherein the first or second substrate includes an over-the-edge bus bar, e.g., an electrically conductive strip in electrical contact with an optically transparent electrode and disposed over the edge and optionally on the second surface of the substrate. Element 24: wherein the input signal can include, for example, a certain voltage, e.g., less than about 1.5V, preferably below about 1.3V and more preferably below about 1.2V, such that light transmission of the electrochromic layer changes from one state (e.g., a high light transmission state) to another state (e.g., a low light transmission state). Element 25: wherein an electrochromic composition is configured to provide a specific solar heat gain coefficient value for the electrochromic device in a colored state or in a clear state. Element 26: wherein the electrochromic composition can include electrochromic materials that are spectrally matched to produce substantially gray scale color of transmitted or reflected light through or from the electrochromic composition such as when the color deviations of the transmitted or reflected light through or from the electrochromic composition are less than 10 units, e.g., less than 5 units, of a* and b* axis for CIELAB color space. Element 27: wherein an electrochromic device further comprises the components and features of aspect A, B, C, D, E, F, G, H, I, J, K, L, M, N, and/or 0 in any combination.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. An electrochromic device comprising:
   a first electrode, second electrode and an electrochromic composition including one or more electrochromic materials;
   wherein at least one of the one or more electrochromic materials undergoes electron exchange only at either the first electrode or at the second electrode,
   wherein the electrochromic device further comprises a selectively permeable membrane within the electrochromic composition and disposed between the first electrode and the second electrode, and
   wherein the selectively permeable membrane has a center portion and a peripheral portion and wherein the center portion has permeability different than that of the peripheral portion thereby causing regions of the electrochromic device immediately adjacent to the center portion and the peripheral portion to have different switching speeds.

2. The electrochromic device of claim 1, wherein either or both of the first electrode or the second electrode comprise a semiconductor material at an interface with the electrochromic composition.

3. The electrochromic device of claim 1, wherein the first electrode includes a material that is different than a material of the second electrode.

4. The electrochromic device of claim 1, wherein the electrochromic composition is disposed between and in contact with the first electrode and second electrode and configured to change light transmission from one state to another state in response to an input signal between the electrodes.

5. The electrochromic device of claim 1, wherein the electrochromic composition is configured to change light transmission from one state to another state in response to an input signal.

6. The electrochromic device of claim 1, wherein the electrochromic composition is configured to change visible light transmission from one state to another state in response to an input signal.

7. The electrochromic device of claim 1, wherein the electrochromic composition includes a cathodic compound and an anodic compound as the one or more electrochromic materials and wherein either or both of the first electrode or the second electrode selectively allows reducing and oxidizing substantially only the cathodic compound and/or its reduced forms, while substantially prohibiting reduction and oxidation of the anodic compound.

8. The electrochromic device of claim 1, wherein the electrochromic composition includes a cathodic compound and an anodic compound as the one or more electrochromic materials and wherein either or both of the first electrode or the second electrode selectively allows reducing and oxidizing substantially only the anodic compound and/or its oxidized forms, while substantially prohibiting reduction and oxidation of the cathodic compound.

9. The electrochromic device of claim 1, wherein the center portion has permeability higher than that of the peripheral portion.

10. The electrochromic device of claim 1, wherein the first electrode, second electrode, and electrochromic composition define a variable transmittance layer (VTL), and wherein the VTL has electrical properties that are different in a central portion of the VTL than in a periphery of the VTL.

11. The electrochromic device of claim 1, wherein the electrochromic composition is in the form of a gel.

12. The electrochromic device of claim 11, wherein the electrochromic layer in the form of the gel has electrical properties that are substantially different in different areas of the gel in a lateral direction of the gel.

13. The electrochromic device of claim 1, further comprising a controller to apply the input signal, wherein the controller is electrically connected to the first and second electrodes by distributed, multi-point electrical connections to minimize ohmic drops across the electrodes and/or wherein the controller is configured to operate both electrodes at ion-transfer limiting conditions of the electrochromic composition.

* * * * *